US008738245B2

(12) United States Patent
Yasui

(10) Patent No.: US 8,738,245 B2
(45) Date of Patent: May 27, 2014

(54) CONTROL APPARATUS

(75) Inventor: Yuji Yasui, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 194 days.

(21) Appl. No.: 13/272,992

(22) Filed: Oct. 13, 2011

(65) Prior Publication Data

US 2012/0095658 A1 Apr. 19, 2012

(30) Foreign Application Priority Data

Oct. 18, 2010 (JP) ................................. 2010/234055

(51) Int. Cl.

| | |
|---|---|
| ***B60W 10/11*** | (2012.01) |
| ***G05B 13/00*** | (2006.01) |
| ***B60W 30/18*** | (2012.01) |
| ***F02D 41/30*** | (2006.01) |
| ***F02D 28/00*** | (2006.01) |

(52) U.S. Cl.
USPC ............................................... 701/51; 701/58

(58) Field of Classification Search
USPC ................. 701/51, 58–60, 99, 103–105, 275; 477/107, 110
See application file for complete search history.

(56) References Cited

U.S. PATENT DOCUMENTS

| | | | | |
|---|---|---|---|---|
| 5,343,700 | A * | 9/1994 | Fujimoto et al. | 60/276 |
| 6,840,214 | B2 * | 1/2005 | Yasui | 123/344 |
| 7,493,207 | B2 * | 2/2009 | Yasui et al. | 701/103 |
| 2003/0125865 | A1 * | 7/2003 | Yasui | 701/109 |
| 2003/0144747 | A1 * | 7/2003 | Shakespeare | 700/28 |
| 2006/0103339 | A1 * | 5/2006 | Yamada et al. | 318/623 |

FOREIGN PATENT DOCUMENTS

| | | | |
|---|---|---|---|
| EP | 0 908 801 | A2 | 4/1999 |
| EP | 1 279 819 | A2 | 1/2003 |
| EP | 1 279 820 | A2 | 1/2003 |
| JP | 2000-234550 | A | 8/2000 |

OTHER PUBLICATIONS

Lazar C et al. "Modelling and Predictive Control of an Electro-Hydraulic Actuated Wet Clutch for Automatic Transmission", Industrial Electronics (ISIE), 2010 IEEE International Symposium on, IEE Piscataway, NJ, USA, Jul. 4, 2010, pp. 256-261, XP031884534.
Chris Manzie et al., "Model Predictive Control of a Fuel Injection System with a Radial Basis Function Network Observer" Journal of Dynamic Systems, Measurement and Control, vol. 124, Dec. 2002, XP002667293.
Internatonal Search Report; European Patent Application No. 11 185 533.4-1606, Apr. 12, 2013.
Model Predicitive Control, University of Texas. Source: http//ww.cc.ntut.edu.tw/~jceng/Model%20Predicitive%20Control.pdf, Feb. 6, 2009, pp. 1-50.

* cited by examiner

*Primary Examiner* — Fadey Jabr
*Assistant Examiner* — Martin Weeks
(74) *Attorney, Agent, or Firm* — Arent Fox LLP

(57) ABSTRACT

A control apparatus which is capable of enhancing the accuracy of control of a controlled object having characteristics that dead time and response delay thereof vary. The control apparatus includes an ECU. The ECU calculates four predicted values as values of a controlled variable associated with respective times when four dead times elapse, respectively, calculates four weight function values associated with an exhaust gas volume, and calculates four products by multiplying the predicted values by the weight function values, respectively. The ECU sets the total sum of the four products as a predicted equivalent ratio and calculates an air-fuel ratio correction coefficient such that the predicted equivalent ratio becomes equal to a target equivalent ratio.

20 Claims, 40 Drawing Sheets

CONTROL APPARATUS

FIELD OF THE INVENTION

The present invention relates to a control apparatus for controlling a controlled variable of a controlled object having characteristics that dead time thereof changes, using a control input.

DESCRIPTION OF THE RELATED ART

Conventionally, the present applicant has already proposed a control apparatus disclosed in Japanese Laid-Open Patent Publication (Kokai) No. 2000-234550 as a control apparatus for controlling the air-fuel ratio of an air-fuel mixture supplied to an internal combustion engine. The control apparatus includes a LAF sensor, an oxygen concentration sensor, a state predictor, an onboard identifier, a sliding mode controller, a target air-fuel ratio-calculating section, and so forth. Both the LAF sensor and the oxygen concentration sensor detect a value indicative of the concentration of oxygen in exhaust gases, i.e. an air fuel ratio, in an exhaust passage of the engine and are provided in the exhaust passage at locations downstream of a collector thereof. Further, the engine is a gasoline engine powered by gasoline, and comprises a first catalytic device disposed in the exhaust passage at a location downstream of the collector, and a second catalytic device disposed downstream of the first catalytic device. The LAF sensor is disposed upstream of the first catalytic device, and the oxygen concentration sensor is disposed between the first and second catalytic devices.

This control apparatus calculates a target air-fuel ratio KCMD as a control input, with a predetermined control algorithm, by using a discrete-time system model in which a difference kact between an air-fuel ratio KACT detected by the LAF sensor and an air-fuel ratio reference value FLAFBASE (hereinafter referred to as the "air-fuel ratio difference kact") is used as an input and a difference VO2 between an output VOUT from the oxygen concentration sensor and a predetermined target value VOUT_TARGET (hereinafter referred to as the "output difference VO2") is used as an output, a dead time d1 before the air-fuel ratio of exhaust gases detected by the LAF sensor is detected by the oxygen concentration sensor, and a dead time d2 before the target air-fuel ratio KCMD is reflected on the results of detection by the LAF sensor. Both the dead times d1 and d2 are set to fixed values.

In the case of the engine configured as disclosed in Japanese Laid-Open Patent Publication (Kokai) No. 2000-234550, actual values of the above-described two dead times d1 and d2 vary due to changes in the operating conditions of the engine, aging of the engine, and variation between individual products of the engine. In this case, according to the control apparatus disclosed in Japanese Laid-Open Patent Publication (Kokai) No. 2000-234550, the fixed set values are used as the dead times d1 and d2, which results in the degraded accuracy of control. Such a problem occurs, not only when the air-fuel ratio is controlled as disclosed in Japanese Laid-Open Patent Publication (Kokai) No. 2000-234550, but also when a controlled object having characteristics that dead time and response delay thereof vary is controlled. For example, it occurs also when a clutch of an automatic transmission is controlled for engagement and disengagement thereof.

SUMMARY OF THE INVENTION

It is an object of the present invention to provide a control apparatus which is capable of enhancing the accuracy of control when a controlled object having characteristics that dead time and response delay thereof vary.

To attain the above object, in a first aspect of the present invention, there is provided a control apparatus for controlling a controlled variable of a controlled object by a control input, the controlled object having characteristics that dynamic characteristics including dead time change under a predetermined condition, and being modeled such that the dead time sequentially changes between M integer values (M represents an integer not smaller than 2) including a maximum value and a minimum value thereof as a reference parameter changes within a predetermined range, comprising target controlled variable-setting means for setting a target controlled variable which serves as a target of the controlled variable, reference parameter-detecting means for detecting the reference parameter, predicted value-calculating means for calculating M predicted values of the controlled variable in association with respective times when M dead times elapse, using a controlled object model defining a relationship between the controlled variable and the control input, weight function value-calculating means for calculating, based on the detected reference parameter, M weight function values associated with the reference parameter, predicted controlled variable-setting means for calculating M first products by multiplying the calculated M predicted values by the calculated M weight function values, respectively, and setting a total sum of the M first products as a predicted controlled variable which is a predicted value of the controlled variable, and control input-calculating means for calculating the control input such that the predicted controlled variable becomes equal to the target controlled variable, wherein the M weight function values are associated with M regions within the predetermined range of the reference parameter, respectively, the M weight function values each being set to values other than 0 in an associated region and set to 0 in regions other than the associated region, wherein adjacent ones of the M regions overlap each other, and wherein the M weight function values are set such that an absolute value of a total sum of weight function values associated with each value of the reference parameter in an overlapping region becomes equal to a predetermined value.

With the configuration of this control apparatus, M predicted values of the controlled variable associated with respective times when M dead times elapse are calculated using a controlled object model defining the relationship between the controlled variable and the control input, and M weight function values associated with the reference parameter are calculated based on the detected reference parameter. Then, the M predicted values calculated as above are multiplied by the calculated M weight function values, respectively, whereby M first products are calculated. Further, the total sum of the M first products is set as a predicted controlled variable which is a predicted value of the controlled variable, and the control input is calculated such that the predicted controlled variable becomes equal to the target controlled variable. In this case, the M weight function values are associated with M regions within the predetermined range of the reference parameter, respectively, and are each set to values other than 0 in an associated region and set to 0 in regions other than the associated region. Further, adjacent ones of the M regions overlap each other, and the M weight function values are set such that the absolute value of the total sum of weight function values associated with each value of the reference parameter in an overlapping region becomes equal to a predetermined value.

Therefore, the M first products, which are obtained by multiplying the M predicted values by the M weight function values calculated as above, respectively, are calculated as values weighted such that the M predicted values are sequential with each other, and the total sum of the M first products calculated as above is set as the predicted controlled variable. Therefore, it is possible to calculate the predicted controlled variable as a value obtained by sequentially combining the M predicted values. Thus, even when the dead time changes with a change in the reference parameter, it is possible to accurately calculate the predicted controlled variable while properly compensating for such changes in the dead time. Particularly, even when the dead time suddenly changes with a sudden change in the reference parameter, it is possible to calculate the predicted controlled variable such that it changes steplessly and smoothly while properly compensating for the sudden change in the dead time. Thus, the predicted controlled variable can be calculated accurately. Further, the control input is calculated such that the predicted controlled variable calculated as above becomes equal to the target controlled variable. Therefore, the control input makes it possible to accurately control the controlled variable to the target controlled variable. Particularly, when a feedback control algorithm is used as an algorithm for calculating the control input, it is possible to maintain a high feedback gain, thereby making it possible to cause the controlled variable to follow up the target controlled variable while ensuring high accuracy and high response.

In the first aspect of the invention, preferably, the control apparatus further comprises modified control input-setting means for calculating M second products by multiplying M values of the control input associated with respective times earlier by the M dead times, by the M weight function values, respectively, and setting a total sum of the M second products as a modified control input, and identification means for identifying onboard a model parameter of a modified model with a predetermined identification algorithm that is derived using the modified model defining a relationship between the controlled variable and the modified control input, wherein the predicted value-calculating means uses the identified model parameter as a model parameter of the controlled object model.

With the configuration of the preferred embodiment, M second products are calculated by multiplying M values of the control input associated with respective times earlier by the M dead times, by the M weight function values, respectively, and the total sum of the M second products is set as a modified control input. In this case, the M weight function values are set in relation to the reference parameter, as described above, and hence even when the dead time sequentially changes with changes in the reference parameter, it is possible to accurately calculate the modified control input while properly compensating for such changes in the dead time. Particularly, even when the dead time suddenly changes with a sudden change in the reference parameter, it is possible to calculate the modified control input such that it changes steplessly and smoothly while properly compensating for the sudden change in the dead time. Further, the model parameter of the modified model is identified onboard with a predetermined identification algorithm that is derived using a modified model defining the relationship between the controlled variable and the modified control input. Therefore, even when the dead time changes with a change in the reference parameter, it is possible to accurately identify the model parameter of a control input model, while suppressing the adverse influence of the change in the reference parameter. Further, such a model parameter is used as the model parameter of the controlled object model, and hence it is possible to make a dramatic improvement in controllability, and the robustness of the control against the adverse influence of variation between individual products of the control apparatus, and aging of the same.

In the preferred embodiment of the first aspect of the present invention, more preferably, the control input-calculating means calculates the control input using a control algorithm derived based on one of a sensitivity function, a complementary sensitivity function, and a transfer function that are set such that a predetermined frequency characteristic can be obtained.

With the configuration of the more preferred embodiment, the control input is calculated with a control algorithm derived based on one of a sensitivity function, a complementary sensitivity function, and a transfer function that are set such that a predetermined frequency characteristic can be obtained. Therefore, it is possible to directly specify (set) a disturbance suppression characteristic and the robustness of the control apparatus on a frequency axis while properly compensating for changes in the dead time. This makes it possible to make a dramatic improvement in the ability of suppressing a disturbance and the robustness, in a frequency range within which a change in the controlled variable due to the disturbance is desired to be suppressed.

In the more preferred embodiment, further preferably, the controlled variable is a value indicative of an air-fuel ratio of an air-fuel mixture of an internal combustion engine, and the control input is a correction coefficient for correcting an amount of fuel to be supplied to the engine.

With the configuration of the further preferred embodiment, in the case of controlling a value indicative of the air-fuel ratio of an air-fuel mixture of the engine as the controlled variable, using a correction coefficient for correcting the amount of fuel to be supplied to the engine as the control input, it is possible to obtain the same advantageous effects as described above.

In the more preferred embodiment, further preferably, the controlled variable is a value indicative of an output rotational speed of a transmission torque-regulating mechanism of an automatic transmission, and the control input is an input to an actuator of the transmission torque-regulating mechanism.

With the configuration of the further preferred embodiment, in the case of controlling a value indicative of an output rotational speed of a transmission torque-regulating mechanism of an automatic transmission as the controlled variable, using an input to an actuator of the transmission torque-regulating mechanism as the control input, it is possible to obtain the same advantageous effects as described above.

In the first aspect of the invention, preferably, the control input-calculating means calculates the control input using a control algorithm derived based on one of a sensitivity function, a complementary sensitivity function, and a transfer function that are set such that a predetermined frequency characteristic can be obtained.

With the configuration of this preferred embodiment, it is possible to obtain the same advantageous effects as described above.

In this preferred embodiment, more preferably, the controlled variable is a value indicative of an air-fuel ratio of an air-fuel mixture of an internal combustion engine, and the control input is a correction coefficient for correcting an amount of fuel to be supplied to the engine.

With the configuration of the more preferred embodiment, in the case of controlling a value indicative of the air-fuel ratio of an air-fuel mixture of the engine as the controlled variable, using a correction coefficient for correcting the amount of fuel to be supplied to the engine as the control input, it is possible to obtain the same advantageous effects as described above.

In the preferred embodiment, more preferably, the controlled variable is a value indicative of an output rotational speed of a transmission torque-regulating mechanism of an automatic transmission, and the control input is an input to an actuator of the transmission torque-regulating mechanism.

With the configuration of the further preferred embodiment, in the case of controlling a value indicative of an output rotational speed of a transmission torque-regulating mechanism of an automatic transmission as the controlled variable, using an input to an actuator of the transmission torque-regulating mechanism as the control input, it is possible to obtain the same advantageous effects as described above.

In the first aspect of the invention, preferably, the controlled variable is a value indicative of an air-fuel ratio of an air-fuel mixture of an internal combustion engine, and the control input is a correction coefficient for correcting an amount of fuel to be supplied to the engine.

With the configuration of the more preferred embodiment, in the case of controlling a value indicative of the air-fuel ratio of an air-fuel mixture of the engine as the controlled variable, using a correction coefficient for correcting the amount of fuel to be supplied to the engine as the control input, it is possible to obtain the same advantageous effects as described above.

In the first aspect of the invention, preferably, the controlled variable is a value indicative of an output rotational speed of a transmission torque-regulating mechanism of an automatic transmission, and the control input is an input to an actuator of the transmission torque-regulating mechanism.

With the configuration of the further preferred embodiment, in the case of controlling a value indicative of an output rotational speed of a transmission torque-regulating mechanism of an automatic transmission as the controlled variable, using an input to an actuator of the transmission torque-regulating mechanism as the control input, it is possible to obtain the same advantageous effects as described above.

In the first mentioned preferred embodiment of the first aspect of the invention, more preferably, the controlled variable is a value indicative of an air-fuel ratio of an air-fuel mixture of an internal combustion engine, and the control input is a correction coefficient for correcting an amount of fuel to be supplied to the engine.

With the configuration of the more preferred embodiment, in the case of controlling a value indicative of the air-fuel ratio of an air-fuel mixture of the engine as the controlled variable, using a correction coefficient for correcting the amount of fuel to be supplied to the engine as the control input, it is possible to obtain the same advantageous effects as described above.

In the first mentioned preferred embodiment of the first aspect of the invention, more preferably, the controlled variable is a value indicative of an output rotational speed of a transmission torque-regulating mechanism of an automatic transmission, and the control input is an input to an actuator of the transmission torque-regulating mechanism.

With the configuration of the further preferred embodiment, in the case of controlling a value indicative of an output rotational speed of a transmission torque-regulating mechanism of an automatic transmission as the controlled variable, using an input to an actuator of the transmission torque-regulating mechanism as the control input, it is possible to obtain the same advantageous effects as described above.

To attain the above object, in a second aspect of the present invention, there is provided a control apparatus for controlling a controlled variable of a controlled object by a control input, the controlled object having characteristics that dynamic characteristics including dead time change under a predetermined condition, and being modeled such that the dead time sequentially changes between M integer values (M represents an integer not smaller than 2) including a maximum value and a minimum value thereof as a reference parameter changes within a predetermined range, comprising reference parameter-detecting means for detecting the reference parameter, weight function value-calculating means for calculating, based on the detected reference parameter, M weight function values associated with the reference parameter, modified control input-setting means for calculating M products by multiplying M values of the control input associated with respective times earlier by M dead times, by the calculated M weight function values, respectively, and setting a total sum of the M products as a modified control input, identification means for identifying onboard a model parameter of a modified model with a predetermined identification algorithm that is derived using the modified model defining a relationship between the controlled variable and the modified control input, and control input-calculating means for calculating the control input using a predetermined control algorithm and a control target model, the control input-calculating means using the identified model parameter as a model parameter of the control target model, wherein the M weight function values are associated with M regions within the predetermined range of the reference parameter, respectively, the M weight function values each being set to values other than 0 in an associated region and set to 0 in regions other than the associated region, wherein adjacent ones of the M regions overlap each other, and wherein the M weight function values are set such that an absolute value of a total sum of weight function values associated with each value of the reference parameter in an overlapping region becomes equal to a predetermined value.

With the configuration of this control apparatus, M weight function values associated with the reference parameter are calculated based on the detected reference parameter. M products are calculated by multiplying M values of the control input associated with respective times earlier by M dead times, by the M weight function values, respectively, and the total sum of the M products is set as a modified control input. In this case, the M weight function values are associated with M regions within the predetermined range of the reference parameter, respectively, and are each set to values other than 0 in an associated region and set to 0 in regions other than the associated region. Further, adjacent ones of the M regions overlap each other, and the M weight function values are set such that the absolute value of the total sum of the M weight function values associated with each value of the reference parameter in an overlapping region becomes equal to a predetermined value (value of 1). Accordingly, the total sum of the M products obtained by multiplying the M values of the control input associated with respective times earlier by the H dead times, by the M weight function values set as above, respectively, is set as the modified control input. Therefore, even when the dead time sequentially changes with changes in the reference parameter, it is possible to accurately calculate the modified control input while properly compensating for such changes in the dead time. Particularly, even when the dead time suddenly changes with a sudden change in the reference parameter, it is possible to calculate the modified control input such that it changes steplessly and smoothly while properly compensating for the sudden change in the dead time.

Further, the model parameter of the modified model is identified onboard with a predetermined identification algorithm that is derived using a modified model defining the relationship between the controlled variable and the modified control input, and hence even when the dead time changes with a change in the reference parameter, it is possible to accurately identify the model parameter of the control input model while suppressing the adverse influence of the change in the reference parameter. Furthermore, the control input is calculated using a predetermined control algorithm and a controlled object model, and the model parameter identified as described above is used as the model parameter of the controlled object model. This makes it possible to make a dramatic improvement in controllability, and the robustness of control against the adverse influence of variation between individual products of the control apparatus and aging of the same.

In the second aspect of the present invention, preferably, the predetermined control algorithm is an algorithm derived based on one of a sensitivity function, a complementary sensitivity function, and a transfer function that are set such that a predetermined frequency characteristic can be obtained.

With the configuration of this preferred embodiment, the control input is calculated with a control algorithm derived based on one of a sensitivity function, a complementary sensitivity function, and a transfer function that are set such that a predetermined frequency characteristic can be obtained. Therefore, it is possible to directly specify (set) a disturbance suppression characteristic and robustness of the control apparatus on a frequency axis. This makes it possible to make a dramatic improvement in the ability of suppressing a disturbance and the robustness in a frequency range within which fluctuation in the controlled variable caused by the disturbance is desired to be suppressed.

In this preferred embodiment, more preferably, the controlled variable is a value indicative of an air-fuel ratio of an air-fuel mixture of an internal combustion engine, and the control input is a correction coefficient for correcting an amount of fuel to be supplied to the engine.

With the configuration of the more preferred embodiment, in the case of controlling a value indicative of the air-fuel ratio of an air-fuel mixture of the engine as the controlled variable, using a correction coefficient for correcting the amount of fuel to be supplied to the engine as the control input, it is possible to obtain the same advantageous effects as described above.

In the preferred embodiment, more preferably, the controlled variable is a value indicative of an output rotational speed of a transmission torque-regulating mechanism of an automatic transmission, and the control input is an input to an actuator of the transmission torque-regulating mechanism.

With the configuration of the further preferred embodiment, in the case of controlling a value indicative of an output rotational speed of a transmission torque-regulating mechanism of an automatic transmission as the controlled variable, using an input to an actuator of the transmission torque-regulating mechanism as the control input, it is possible to obtain the same advantageous effects as described above.

To attain the above object, in a third aspect of the present invention, there is provided a control apparatus for controlling a controlled variable of a controlled object by a control input, the controlled object having characteristics that dynamic characteristics including dead time change under a predetermined condition, and being modeled such that the dead time sequentially changes between M integer values (M represents an integer not smaller than 2) including a maximum value and a minimum value thereof as a reference parameter changes within a predetermined range, comprising target controlled variable-setting means for setting a target controlled variable which serves as a target of the controlled variable, reference parameter-detecting means for detecting the reference parameter, weight function value-calculating means for calculating, based on the detected reference parameter, M weight function values associated with the reference parameter, modified control input-setting means for calculating M products by multiplying M values of the control input associated with respective times earlier by M dead times, by the calculated M weight function values, respectively, and setting a total sum of the M products as a modified control input, disturbance estimated value-calculating means for calculating a disturbance estimated value using the modified control input and the controlled variable, and control input-calculating means for calculating the control input, using the calculated disturbance estimated value, such that the controlled variable becomes equal to the target controlled variable, wherein the M weight function values are associated with M regions within the predetermined range of the reference parameter, respectively, the M weight function values each being set to values other than 0 in an associated region and set to 0 in regions other than the associated region, wherein adjacent ones of the M regions overlap each other, and wherein the M weight function values are set such that an absolute value of a total sum of weight function values associated with each value of the reference parameter in an overlapping region becomes equal to a predetermined value.

With the configuration of this control apparatus, M weight function values associated with the reference parameter are calculated based on the detected reference parameter. M products are calculated by multiplying M values of the control input associated with respective times earlier by M dead times, by the N weight function values, respectively, and the total sum of the M products is set as a modified control input. In this case, the M weight function values are associated with M regions within the predetermined range of the reference parameter, respectively, and are each set to values other than 0 in an associated region and set to 0 in regions other than the associated region. Further, adjacent ones of the M regions overlap each other, and the M weight function values are set such that the absolute value of the total sum of weight function values associated with each value of the reference parameter in an overlapping region becomes equal to a predetermined value. Accordingly, the total sum of the M products obtained by multiplying the M values of the control input at the respective times earlier by the M dead times, by the M weight function values set as above, respectively, is set as a modified control input. Therefore, even when the dead time sequentially changes with changes in the reference parameter, it is possible to accurately calculate the modified control input while properly compensating for such changes in the dead time. Particularly, even when the dead time suddenly changes with a sudden change in the reference parameter, it is possible to calculate the modified control input such that it changes steplessly and smoothly while properly compensating for the sudden change in the dead time.

Further, a disturbance estimated value is calculated using the modified control input calculated as above and the controlled variable, and therefore even when the dead time sequentially changes with changes in the reference parameter, it is possible to accurately calculate the disturbance estimated value as a value accurately representing a disturbance while properly compensating for such changes in the dead time. In addition to this, the control input is calculated using the disturbance estimated value thus calculated such that the controlled variable becomes equal to the target controlled variable. Therefore, even when the dead time sequentially changes with changes in the reference parameter, it is possible to accurately calculate the control input while properly compensating for such changes in the dead time, and improve the ability of suppressing a disturbance suppression, i.e. the robustness. From the above, even when the control input is calculated with a control algorithm that uses an integral of the difference between the controlled variable and the target controlled variable, it is possible to accurately control the controlled variable to the target controlled variable while avoiding occurrence of the oscillating behavior and the overshoot behavior of the controlled variable. Particularly, when a feedback control algorithm is used as the algorithm for calculating the control input, it is possible to maintain a high feedback gain, whereby it is possible to cause the controlled variable to follow up the target controlled variable while ensuring high accuracy and high response.

In the third aspect of the present invention, preferably, the disturbance estimated value-calculating means calculates an estimated controlled variable, which is an estimated value of the controlled variable, using a model defining a relationship between the estimated controlled variable, the modified control input, the disturbance estimated value, and the controlled variable, and calculating the disturbance estimated value such that a difference between the estimated controlled variable and the controlled variable is minimized.

With the configuration of this preferred embodiment, an estimated controlled variable, which is an estimated value of the controlled variable, is calculated using a model defining the relationship between the estimated controlled variable, the modified control input, the disturbance estimated value, and the controlled variable. In this case, the modified control input and the disturbance estimated value are accurately calculated, as described above, while properly compensating for a change in the dead time, and hence even when the dead time sequentially changes with changes in the reference parameter, it is possible to accurately calculate the estimated controlled variable while properly compensating for such changes in the dead time. In addition to this, the disturbance estimated value is calculated such that the difference between the estimated controlled variable calculated as described above and the controlled variable is minimized. This makes it possible to further improve the accuracy of calculation of the disturbance estimated value, thereby making it possible to further improve the accuracy of control of the controlled variable to the target controlled variable.

In this preferred embodiment, more preferably, In this preferred embodiment, more preferably, the controlled variable is a value indicative of an air-fuel ratio of an air-fuel mixture of an internal combustion engine, and the control input is a correction coefficient for correcting an amount of fuel to be supplied to the engine.

With the configuration of the more preferred embodiment, in the case of controlling a value indicative of the air-fuel ratio of an air-fuel mixture of the engine as the controlled variable, using a correction coefficient for correcting the amount of fuel to be supplied to the engine as the control input, it is possible to obtain the same advantageous effects as described above.

In the preferred embodiment, more preferably, the controlled variable is a value indicative of an output rotational speed of a transmission torque-regulating mechanism of an automatic transmission, and the control input is an input to an actuator of the transmission torque-regulating mechanism.

With the configuration of the further preferred embodiment, in the case of controlling a value indicative of an output rotational speed of a transmission torque-regulating mechanism of an automatic transmission as the controlled variable, using an input to an actuator of the transmission torque-regulating mechanism as the control input, it is possible to obtain the same advantageous effects as described above.

The above and other objects, features, and advantages of the present invention will become more apparent from the following detailed description taken in conjunction with the accompanying drawings.

DETAILED DESCRIPTION OF PREFERRED EMBODIMENTS

Figure 1:
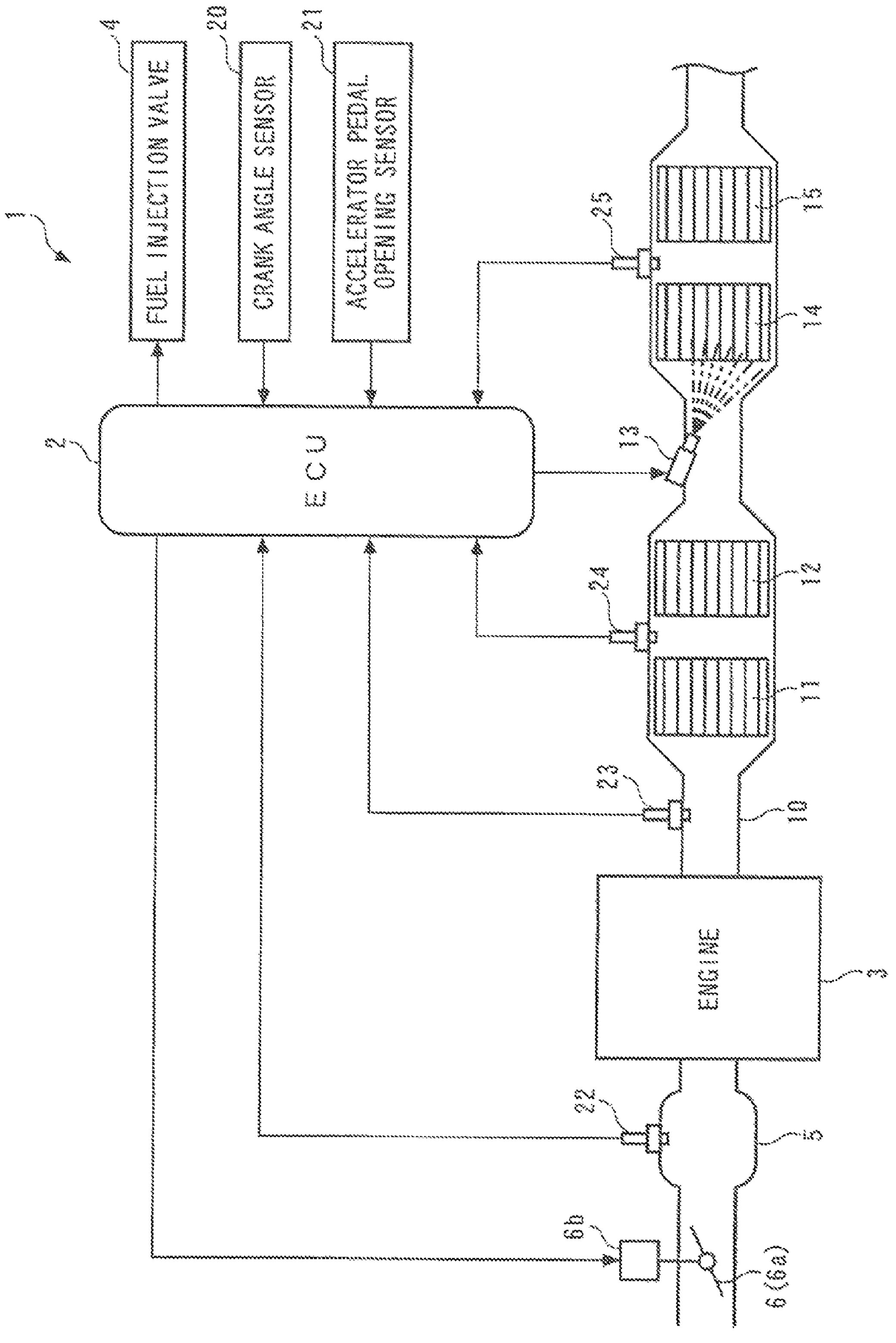
FIG. 1 is a schematic diagram of a control apparatus according to a first embodiment of the present invention, and an internal combustion engine to which is applied the control apparatus.

Hereafter, a control apparatus according to a first embodiment of the invention will be described with reference to drawings. The control apparatus according to the present embodiment, denoted by reference numeral 1 as illustrated in FIG. 1, controls the air-fuel ratio of an air-fuel mixture supplied to an internal combustion engine (hereinafter simply referred to as the "engine") 3, and includes an ECU 2.

The engine 3 is a direct injection gasoline engine installed on a vehicle, not shown, and includes fuel injection valves 4 (only one of which is shown) provided for respective cylinders. Each fuel injection valve 4 is electrically connected to the ECU 2, and a valve-opening time period and a valve-opening timing thereof are controlled by the ECU 2, whereby fuel injection control is performed. In this case, under normal operating conditions, the fuel injection control is executed such that the air-fuel ratio of the air-fuel mixture is controlled to a leaner value than a stoichiometric air-fuel ratio, whereby the engine 3 is subjected to a lean-burn operation.

A crank angle sensor 20 and an accelerator pedal opening sensor 21 are connected to the ECU 2. The crank angle sensor 20 (reference parameter-detecting means) is constituted by a magnet rotor and an MRE pickup, and delivers a CRK signal and a TDC signal, which are both pulse signals, to the ECU 2 along with rotation of a crankshaft (not shown).

Each pulse of the CRK signal is generated whenever the crankshaft rotates through a predetermined crank angle (e.g. 1°). The ECU 2 calculates the rotational speed NE of the engine 3 (hereinafter referred to as "the engine speed NE") based on the CRK signal. Further, the TDC signal indicates that a piston (not shown) in one of the cylinders is in a predetermined crank angle position slightly before the TDC position of the intake stroke, and each pulse thereof is delivered whenever the crankshaft rotates through a predetermined crank angle.

The accelerator pedal opening sensor 21 detects a stepped-on amount AP of an accelerator pedal, not shown, (hereinafter referred to as the "accelerator pedal opening AP"), and delivers a signal indicative of the detected accelerator pedal opening AP to the ECU 2.

On the other hand, a throttle valve mechanism 6 and an intake pressure sensor 22 are provided at respective locations of an intake passage 5 of the engine 3 from upstream to downstream in the mentioned order. The throttle valve mechanism 6 includes a throttle valve 6*a*, and a TH actuator 6*b* that actuates the throttle valve 6*a* to open and close the same. The throttle valve 6*a* is pivotally disposed in an intermediate portion of the intake passage 5 such that the degree of opening thereof is changed by the pivotal motion thereof to thereby change the amount of air passing through the throttle valve 6*a*. The TH actuator 6*b* is a combination of a motor (not shown) connected to the ECU 2, and a gear mechanism (not shown), and is controlled by a control signal input from the ECU 2, to thereby change the degree of opening of the throttle valve 6*a*.

Further, the intake pressure sensor 22 (reference parameter-detecting means) is inserted into a surge tank portion of the intake passage 5 at a location downstream of the throttle valve 6*a*, and detects a pressure PB within the intake passage 5 (hereinafter referred to as the "intake pressure PB"), to deliver a signal indicative of the detected intake pressure to the ECU 2. The ECU 2 calculates the intake pressure PB based on the detection signal output from intake pressure sensor 22. Note that the intake pressure PB is calculated as absolute pressure.

On the other hand, a LAF sensor 23, an upstream three-way catalyst 11, an oxygen concentration sensor 24, a downstream three-way catalyst 12, a urea injection valve 13, an upstream selective reduction catalyst 14, an NH3 concentration sensor 25 and a downstream selective reduction catalyst 15 are provided at respective locations of an exhaust passage 10 of the engine 3 from upstream to downstream in the mentioned order.

The LAF sensor 23 comprises zirconia and platinum electrodes, and linearly detects the concentration of oxygen in exhaust gases flowing through the exhaust passage 10, in a broad air-fuel ratio range from a rich region richer than the stoichiometric air-fuel ratio to a very lean region, to deliver a signal indicative of the detected oxygen concentration to the ECU 2. The ECU 2 calculates a detected equivalent ratio KACT indicative of an equivalent ratio of exhaust gases, based on the value of the detection signal from the LAF sensor 23. In the present embodiment, the detected equivalent ratio KACT corresponds to a controlled variable and a value indicative of the air-fuel ratio.

Further, the upstream three-way catalyst 11 is activated in a region where the temperature thereof is higher than a predetermined activation temperature, and purifies harmful unburned components of exhaust gases. The downstream three-way catalyst 12 is of the same type as that of the upstream three-way catalyst 11, and is disposed on the upstream side of the upstream selective reduction catalyst 14 in order to adjust components of exhaust gases flowing into the upstream selective reduction catalyst 14 such that they are optimum for purifying NOx, to ensure a high NOx purification ratio in the upstream selective reduction catalyst 14. A three-way catalyst of a type different from the upstream three-way catalyst 11, such as a three-way catalyst having an increased ability of oxidizing HC and CO during lean burn operation, or a three-way catalyst having an increased ability of oxidizing NO into NO2, may be used.

Furthermore, the oxygen concentration sensor 24 comprises zirconia and platinum electrodes, and delivers an output based on the oxygen concentration of exhaust gases having passed through the upstream three-way catalyst 11. The output from the oxygen concentration sensor 24 has a high voltage value (e.g. 0.8 v) when an air-fuel mixture having a richer air-fuel ratio than the stoichiometric air-fuel ratio has been burned, whereas when an air-fuel mixture having a leaner air-fuel ratio than the stoichiometric air-fuel ratio has been burned, the output has a low voltage value (e.g. 0.2 v). Further, when the air-fuel ratio of the mixture is close to the stoichiometric air-fuel ratio, the sensor output has a predetermined target value (e.g. 0.6 V) between the high-level and low voltage values.

On the other hand, the urea injection valve 13 is electrically connected to the ECU 2. When the urea injection valve 13 is actuated by a control input signal from the ECU 2, to open, the urea injection valve 13 injects urea water supplied from a urea tank (not shown) into the exhaust passage 10. At this time, part of urea of the urea water injected from the urea injection valve 13 is changed into ammonia by heat of exhaust gases and contact with the upstream selective reduction catalyst 14.

Further, the upstream selective reduction catalyst 14 selectively reduces nitrogen oxide ($NO_x$) in exhaust gases under an atmosphere in which urea exists as a reducing agent. In the upstream selective reduction catalyst 14, ammonia that is changed from urea during injection of urea water is also consumed together with the urea by a NOx reducing action of the catalyst 14, and ammonia that is not consumed is stored in the upstream selective reduction catalyst 14.

Further, the downstream selective reduction catalyst 15 is of the same type as that of the upstream selective reduction catalyst 14, and is disposed at a location downstream of the upstream selective reduction catalyst 14 in order not only to purify NOx in exhaust gases but also to trap ammonia having passes through the upstream selective reduction catalyst 14.

In the present embodiment, a urea SCR (selective catalytic reduction) system is constituted by the above described urea injection valve 13 and the upstream and downstream selective reduction catalysts 14 and 15. Here, a selective reduction catalyst, which is increased in NOx purification performance at low temperature in comparison with the upstream selective reduction catalyst 14, such as a Cu-zeolite catalyst or a catalyst having a rear side thereof zone-coated with an oxidation catalyst, may be used as the downstream selective reduction catalyst 15.

Furthermore, the NH3 concentration sensor 25 detects the concentration of ammonia in exhaust gases having passed through the upstream selective reduction catalyst 14, and delivers a signal indicative of the detected ammonia concentration to the ECU 2. The ECU 2 controls the amount of urea injection via the urea injection valve 13 based on the detection signal from the NH3 concentration sensor 25 to thereby control the ratio or amount of NOx purification by the urea SCR system.

On the other hand, the ECU 2 is implemented by a microcomputer comprising a CPU, a RAM, a ROM, an I/O interface and a drive circuit (none of which are specifically shown). The ECU 2 determines operating conditions of the engine 3 based on the detection signals from the aforementioned sensors 20 to 25, and carries out an air-fuel ratio control process, described hereinafter, and the like, based on the determined operating conditions.

In the present embodiment, the ECU 2 corresponds to target controlled variable-setting means, reference parameter-detecting means, predicted value-calculating means, weight function value-calculating means, predicted controlled variable-setting means, control input-calculating means, modified control input-setting means, identification means, and disturbance estimated value-calculating means.

Next, the control apparatus 1 according to the present embodiment will be described. First, a description will be given of a control target model used in the control apparatus 1 of the present embodiment. If the control target model is one formed by regarding a system of the engine 3 from the fuel injection valves 4 to the LAF sensor 23 as a controlled object of a first-order lag system, in which an air-fuel ratio correction coefficient KAF is a control input and the detected equivalent ratio KACT is a controlled variable, there is obtained the following equation (1). In this case, the air-fuel ratio correction coefficient KAF is calculated with a control algorithm, described hereinafter, as a value having the same dimension as that of the equivalent ratio.

$$KACT(k+1)=(1-\alpha)\cdot KACT(k)+\alpha\cdot KAF(k) \tag{1}$$

In this equation (1), a represents a model parameter. Further, in the equation (1), data with a symbol (k) indicates that it is discrete data sampled or calculated at a predetermined control period ΔT (repetition period at which the TDC signal is generated in the present embodiment). The symbol k (k is a positive integer) indicates a position in the sequence of sampling or calculating cycles of respective discrete data. This also applies to discrete data referred to hereinafter. Further, in the following description, the symbol (k) provided for the discrete data is omitted as deemed appropriate.

In the case of the above-mentioned equation (1), dead time d occurring between input of the air-fuel ratio correction coefficient KAF and output of the detected equivalent ratio KACT is not taken into account, so that if the dead time d is reflected on the equation (1), there is obtained the following equation (2). The reason for using the equation (2) as the control target model will be described hereinafter.

$$KACT(k+1)=(1-\alpha)\cdot KACT(k)+\alpha\cdot KAF(k-d) \tag{2}$$

Figure 2:
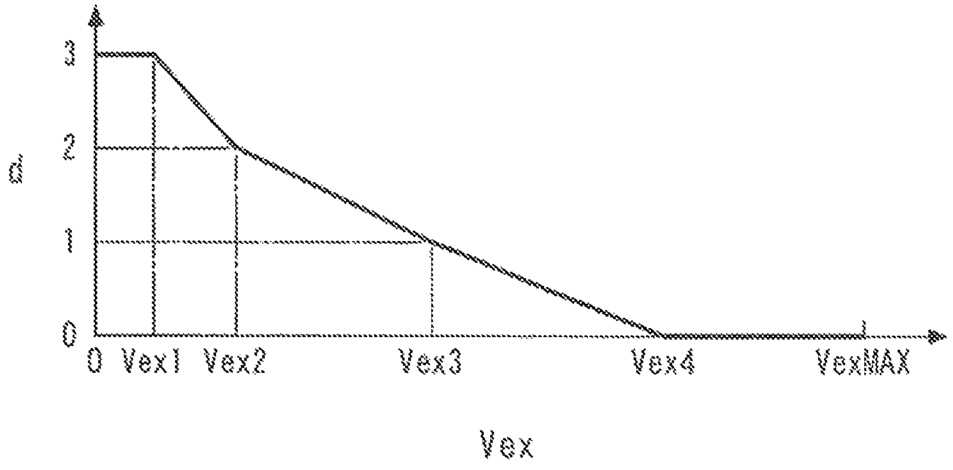
FIG. 2 is a diagram obtained by modeling the relationship between dead time d and an exhaust gas volume Vex.

In the above equation, the dead time d is changed according to the operating conditions of the engine 3, and when the relationship between the dead time d and a volume Vex of exhaust gases is modeled (mapped), a model (map) shown in FIG. 2 is obtained. The exhaust gas volume Vex (reference parameter) is a value corresponding to the space velocity of exhaust gases. Specifically, the exhaust gas volume Vex is calculated by searching a map (not shown) according to the engine speed NE and the intake pressure PB.

In FIG. 2, Vex1 to Vex4 and Vex MAX represent predetermined values of the exhaust gas volume Vex, which are set such that 0<Vex1<Vex2<Vex3<Vex4<VexMAX holds. Further, the predetermined value VexMAX is set to the maximum value of the exhaust gas volume Vex in a range within which the exhaust gas volume Vex can change during operation of the engine 3. In other words, the exhaust gas volume Vex has characteristics that it varies within the range of 0 to VexMAX.

Figure 3:
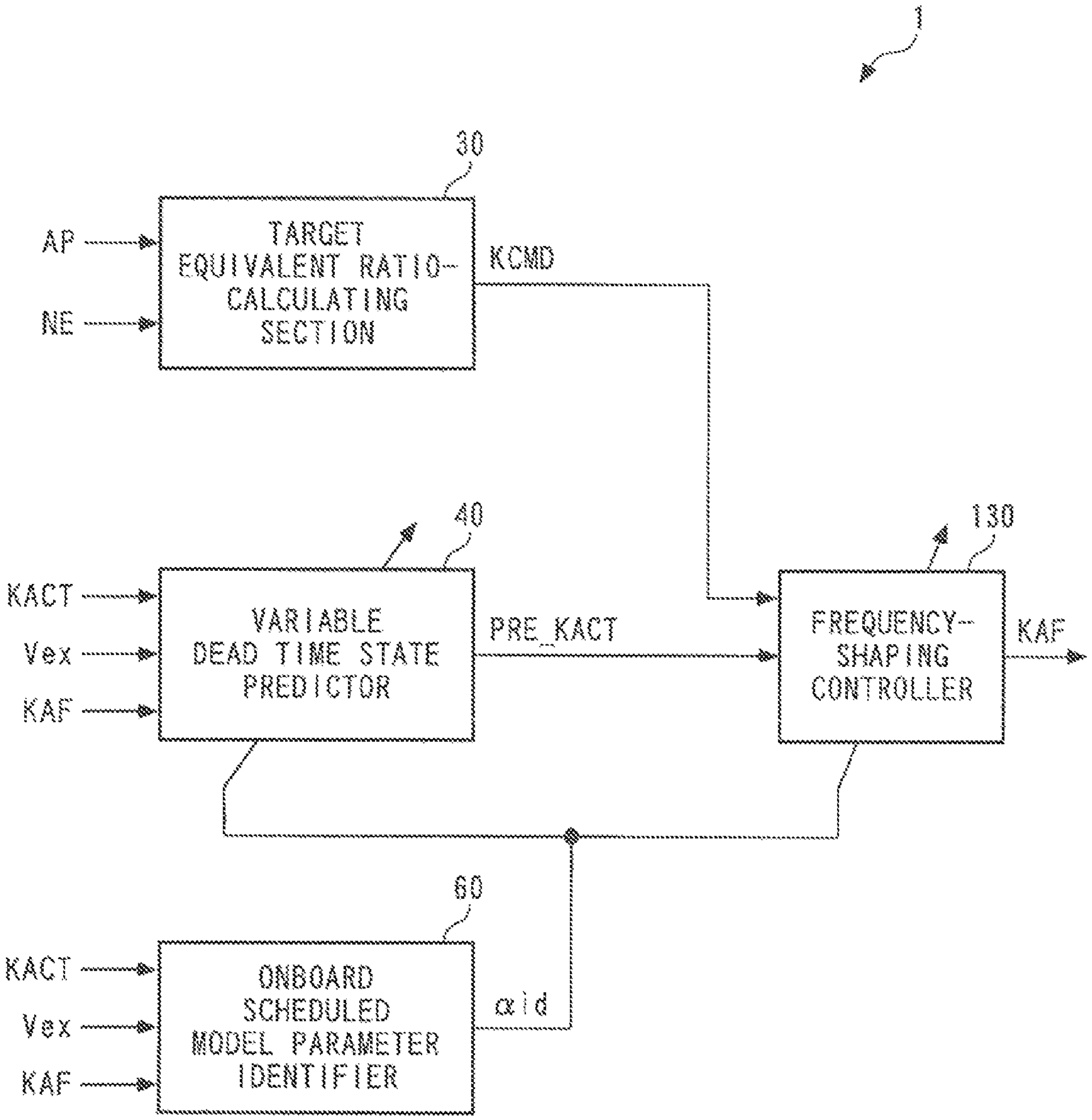
FIG. 3 is a block diagram of the control apparatus according to the first embodiment.

In the control apparatus 1 of the present embodiment, various calculated values, such as the air-fuel ratio correction coefficient KAF, are calculated using the control target model expressed by the equation (2) including the above-described dead time d, as described hereinafter. As shown in FIG. 3, the control apparatus 1 includes a target equivalent ratio-calculating section 30, a variable dead time state predictor (hereinafter referred to as the "state predictor") 40, an onboard scheduled model parameter identifier (hereinafter referred to as the "onboard identifier") 60, and a frequency shaping controller 130, all of which are implemented by the ECU 2.

Figure 4:
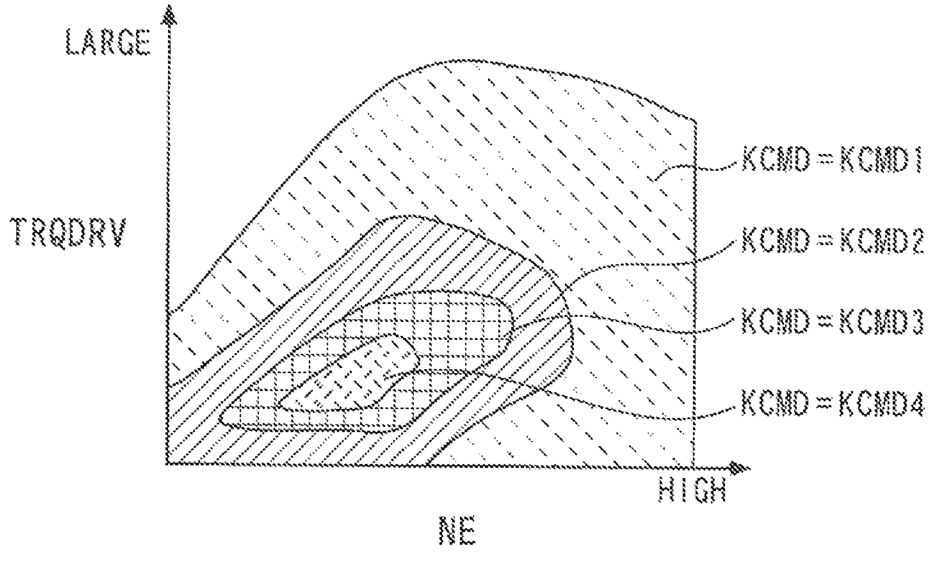
FIG. 4 is a diagram showing an example of a map for use in calculating a demanded torque TRQDRV.

The target equivalent ratio-calculating section 30 calculates a target equivalent ratio KCMD as a value which serves as the target of the above-described detected equivalent ratio KACT. Specifically, the target equivalent ratio-calculating section 30 calculates a demanded torque TRQDRV by searching a map, not shown, according to the engine speed NE and the accelerator pedal opening AP, and then calculates the target equivalent ratio KCMD by searching a map shown in FIG. 4 according to the demanded torque TRQDRV and the engine speed NE. In FIG. 4, KCMD 1 to KCMD 4 represent predetermined values of the target equivalent ratio KCMD, and are set such that KCMD 1=1 and KCMD 1>KCMD 2>KCMD 3>KCMD 4 hold.

The state predictor 40 calculates a predicted equivalent ratio PRE_KACT as a predicted value of the detected equivalent ratio KACT with a prediction algorithm, described hereinafter. The onboard identifier 60 calculates an identified value αid with an identification algorithm, described hereinafter, as a value obtained through onboard identification of the above-mentioned model parameter α. Further, the frequency shaping controller 130 calculates the air-fuel ratio correction coefficient KAF as a control input with a control algorithm, described hereinafter.

In the present embodiment, the target equivalent ratio-calculating section 30 corresponds to target controlled variable-setting means, and the target equivalent ratio KCMD corresponds to a target controlled variable. Further, the state predictor 40 corresponds to the predicted value-calculating means, the weight function value-calculating means, and the predicted controlled variable-setting means, and the predicted equivalent ratio PRE_KACT corresponds to a predicted controlled variable. Furthermore, the onboard identifier 60 corresponds to modified control input-setting means, identification means, and the weight function value-calculating means, and the frequency shaping controller 130 corresponds to control input-calculating means.

Next, a description will be given of the above-mentioned state predictor 40. The state predictor 40 calculates the predicted equivalent ratio PRE_KACT with the prediction algorithm, described hereinafter. The predicted equivalent ratio PRE_KACT corresponds to a value which the detected equivalent ratio KACT is predicted to assume at a control time when the dead time d in the current control system elapses.

Figure 5:
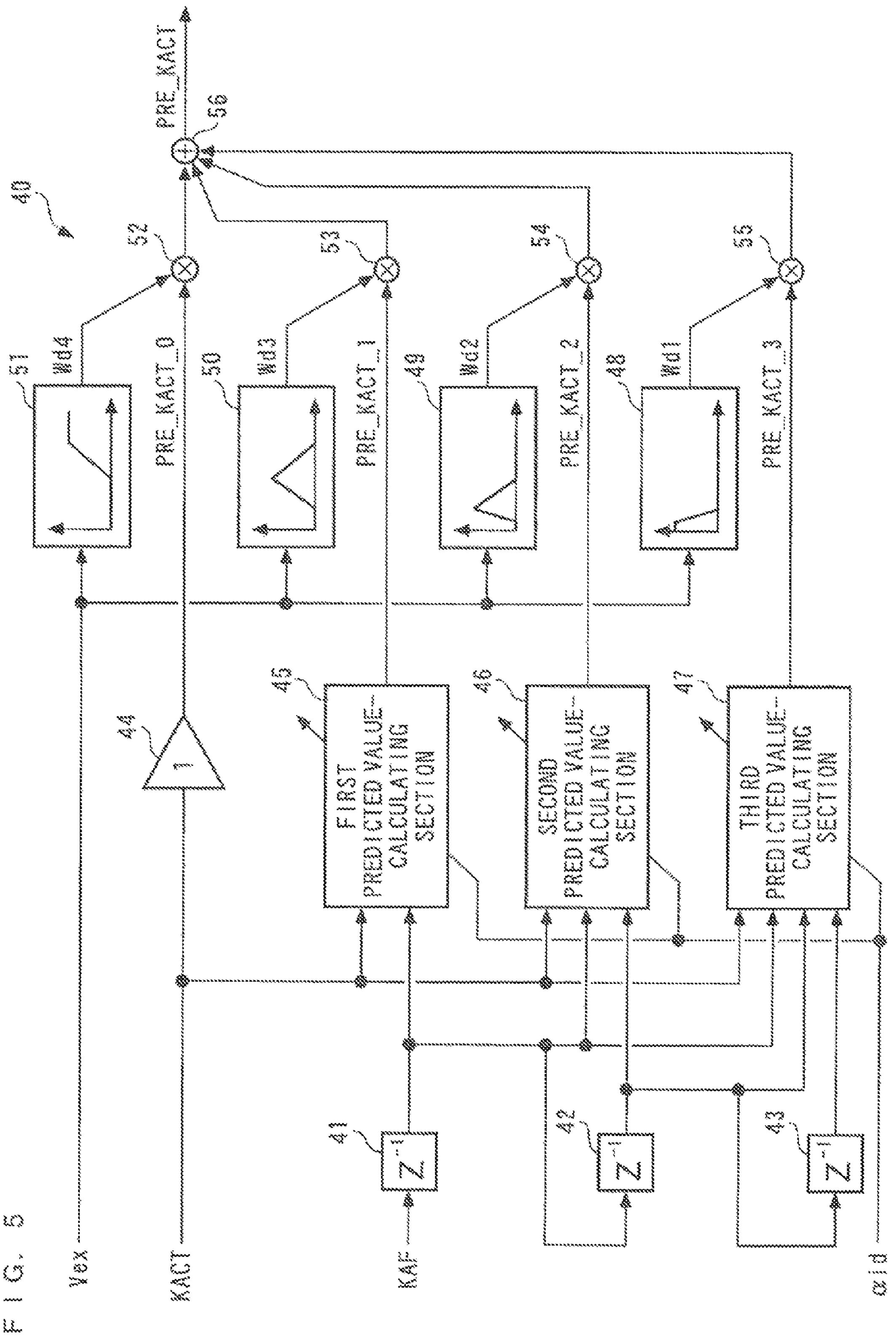
FIG. 5 is a block diagram of a variable dead time state predictor.

Referring to FIG. 5, the state predictor 40 includes three delay elements 41 to 43, an amplifier 44, three predicted value-calculating sections 45 to 47, four weight function value-calculating sections 48 to 51, four multipliers 52 to 55, and an adder 56.

First, the amplifier 44 calculates a zeroth predicted value PRE_KACT_0 by the following equation (3). That is, the zeroth predicted value PRE_KACT_0 is calculated as a detected equivalent ratio KACT(k) when the dead time d=0 holds.

$$PRE\_KACT\_0(k)=KACT(k) \tag{3}$$

Further, the first predicted value-calculating sections 45 calculates a first predicted value PRE_KACT_1 using a value KAF(k−1) of the air-fuel ratio correction coefficient, delayed by one control cycle by the delay element 41, by the following equation (4):

$$PRE\_KACT\_1(k)=(1\alpha id(k))\cdot KACT(k)+\alpha id(k)\cdot KAF(k-1) \tag{4}$$

The first predicted value PRE_KACT_1 corresponds to a value which the detected equivalent ratio KACT is predicted to assume at a time when the dead time d=1 elapses. A method of deriving the above equation (4) will be described hereinafter.

Further, the second predicted value-calculating sections 46 calculates a second predicted value PRE_KACT_2 using the value KAF(k−1) and a value KAF(k−2) of the air-fuel ratio correction coefficient, delayed by one and two control cycles by the delay element 41 and a delay element 42, respectively, by the following equation (5):

$$PRE\_KACT\_2(k)=(1-\alpha id(k))^2\cdot KACT(k)+(1-\alpha id(k))\cdot\alpha id(k)\cdot KAF(k-2)+\alpha id(k)\cdot KAF(k-1) \tag{5}$$

The second predicted value PRE_KACT_2 corresponds to a value which the detected equivalent ratio KACT is predicted to assume at a time when the dead time d=2 elapses. A method of deriving the above equation (5) will be described hereinafter.

Further, the third predicted value-calculating sections 47 calculates a third predicted value PRE_KACT_3 using the above-described values KAF(k−1) and KAF(k−2), and a value KAF(k−3) of the air-fuel ratio correction coefficient, delayed by one to three control cycles by the delay elements 41 and 42 and a delay element 43, respectively, by the following equation (6):

$$PRE\_KACT\_3(k)=(1-\alpha id(k))^3\cdot KACT(k)+(1-\alpha id(k))^2\cdot\alpha id(k)\cdot KAF(k-3)+(1-\alpha id(k))\cdot\alpha id(k)\cdot KAF(k-2)+\alpha id(k)\cdot KAF(k-1) \tag{6}$$

The third predicted value PRE_KACT_3 corresponds to a value which the detected equivalent ratio KACT is predicted to assume at a time when the dead time d=3 elapses. A method of deriving the above equation (6) will be described hereinafter.

Figure 6:
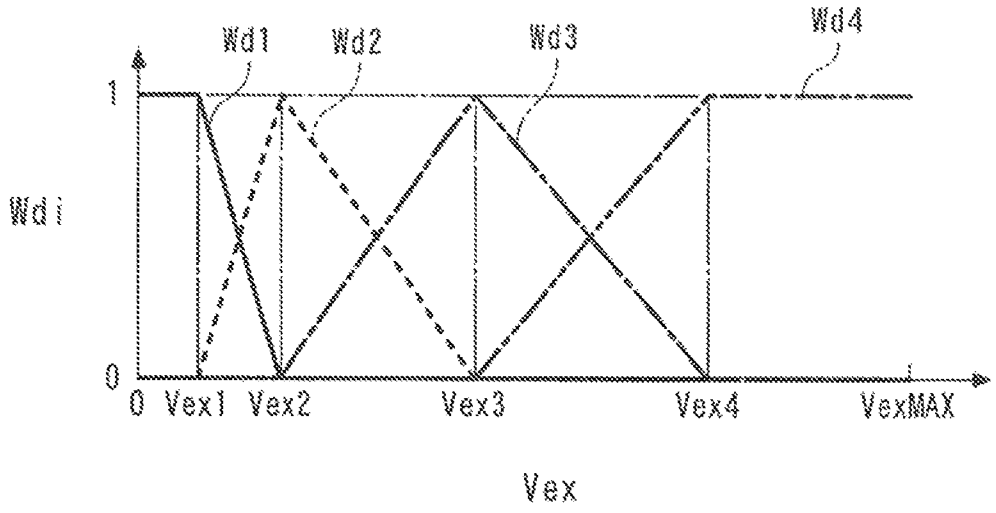
FIG. 6 is a diagram showing an example of a map for use in calculating a weight function value Wdi.

The four weight function value-calculating sections 48 to 51 calculate four weight function values Wd1 to Wd4, respectively, by searching a map shown in FIG. 6 according to the exhaust gas volume Vex. As shown in FIG. 6, when a range within which the exhaust gas volume Vex can change is divided into the four ranges of 0≤Vex≤Vex2, Vex1≤Vex≤Vex3, Vex2≤Vex≤Vex4, and Vex3≤Vex≤VexMAX, the four weight function values Wd1 to Wd4 are set such that they are associated with the above four ranges, respectively, and are set to positive values not larger than 1 in the ranges associated therewith, whereas in ranges other than the associated ranges, they are set to 0.

Specifically, the weight function value Wd1 is set, in the range associated therewith ($0 \le Vex \le Vex2$), to a maximum value of 1 when $Vex \le Vex1$ holds and to a smaller positive value as the exhaust gas volume Vex is larger in the range $Vex1 < Vex$, while in the other ranges, it is set to 0. The weight function value Wd2 is set, in the range associated therewith ($Vex1 \le Vex \le Vex3$), to such a value as changes along the inclined sides of a triangle with a maximum value of 1 when Vex=Vex2 holds, and while in the other ranges, it is set to 0.

The weight function value Wd3 is set, in the range associated therewith ($Vex2 \le Vex \le Vex4$), to such a value as changes along the inclined sides of a triangle with a maximum value of 1 when Vex=Vex3 holds, while in the other ranges, it is set to 0. The weight function value Wd4 is set, in the range associated therewith ($Vex3 \le Vex \le VexMAX$), to a larger positive value as the exhaust gas volume Vex is larger with a maximum value of 1 when $Vex4 \le Vex$ holds, while in the other ranges, it is set to 0.

Further to the above, the four ranges with which the respective four weight function values Wdi (i=1 to 4) are associated are set such that adjacent ones thereof overlap each other, as described above, and the sum of the values of the weight function values Wdi associated with each value of the exhaust gas volume Vex in the overlapping ranges becomes equal to the maximum value of 1 of each of the weight function values Wdi.

As is clear from a comparison between FIG. 6 and FIG. 2, referred to hereinabove, the three ranges overlapping each other are set such that they correspond to three ranges, respectively, within which the slope of the dead time d is held constant. In addition, the weight function values Wd1, WD2, WD3, and Wd4 are set such that the respective weights determined thereby are maximized at the dead time d=3, the dead time d=2, the dead time d=1, and the dead time d=0, respectively.

The multiplier 52 calculates a product Wd4·PRE_KACT__0 by multiplying the weight function value Wd4 by the zeroth predicted value PRE_KACT__0. The multiplier 53 calculates a product Wd3·PRE_KACT__1 by multiplying the weight function value Wd3 by the first predicted value PRE_KACT__1. The multiplier 54 calculates a product Wd2·PRE_KACT__2 by multiplying the weight function value Wd2 by the second predicted value PRE_KACT__2 and the multiplier 55 calculates a product Wd1·PRE_KACT__3 by multiplying the weight function value Wd1 by the third predicted value PRE_KACT__3.

The adder 56 calculates the predicted equivalent ratio PRE_KACT by adding the four products calculated as above to each other. That is, the predicted equivalent ratio PRE_KACT is calculated by the following equation (7):

$$\mathrm{PRE\_KACT}(k) = \sum_{i=1}^{4} Wdi(k) \cdot \mathrm{PRE\_KACT\_4} - i(k) \tag{7}$$

As described above, the predicted equivalent ratio PRE_KACT is calculated as the total sum of products obtained by multiplying four predicted values PRE_KACT__4−i by the above-mentioned four weight function values Wdi, respectively, and hence even when the dead time d sequentially changes between 0 to 3, as shown in FIG. 2, according to changes in the exhaust gas volume Vex, it is possible to calculate the predicted equivalent ratio PRE_KACT as a value that changes smoothly and steplessly, while properly causing such changes in the dead time d to be reflected thereon.

The equations (4) to (6) for calculating the aforementioned first to third predicted values PRE_KACT__1 to 3 are derived as described hereinafter. First, in the aforementioned equation (2), assuming that d=1 holds, there is obtained the following equation (8):

$$KACT(k+1) = (1-\alpha) \cdot KACT(k) + \alpha \cdot KAF(k-1) \tag{8}$$

In the above equation (8), by replacing KACT(k+1) on the right side thereof with PRE_KACT__1(k), and α on the left side thereof with αid(k), respectively, the aforementioned equation (4) is obtained.

Further, in the aforementioned equation (2), if d=2 holds, there is obtained the following equation (9):

$$KACT(k+1) = (1-\alpha) \cdot KACT(k) + \alpha \cdot KAF(k-2) \tag{9}$$

In the above equation (9), if the variables are shifted by one control cycle toward the future, there is obtained the following equation (10):

$$KACT(k+2) = (1-\alpha) \cdot KACT(k+1) + \alpha \cdot KAF(k-1) \tag{10}$$

If the equation (9) is substituted into the equation (10), there is obtained the following equation (11):

$$\begin{aligned} KACT(k+2) &= (1-\alpha) \cdot \{(1-\alpha) \cdot KACT(k) + \\ &\quad \alpha \cdot KAF(k-2)\} + \alpha \cdot KAF(k-1) \\ &= (1-\alpha)^2 \cdot KACT(k) + (1-\alpha) \cdot \alpha \cdot KAF(k-2) + \\ &\quad \alpha \cdot KAF(k-1) \end{aligned} \tag{11}$$

By replacing KACT(k+2) on the right side of the above equation (11) with PRE_KACT__2(k), and α on the left side thereof with αid(k), the aforementioned equation (5) is obtained.

Further, in the aforementioned equation (2), if d=3 holds, there is obtained the following equation (12):

$$KACT(k+1) = (1-\alpha) \cdot KACT(k) + \alpha \cdot KAF(k-3) \tag{12}$$

In the above equation (12), if the variables are shifted by one control cycle toward the future, there is obtained the following equation (13):

$$KACT(k+2) = (1-\alpha) \cdot KACT(k+1) + \alpha \cdot KAF(k-2) \tag{13}$$

If the equation (12) is substituted into the equation (13), there is obtained the following equation (14):

$$\begin{aligned} KACT(k+2) &= (1-\alpha) \cdot \{(1-\alpha) \cdot KACT(k) + \alpha \cdot \\ &\quad KAF(k-2)\} + \alpha \cdot KAF(k-1) \\ &= (1-\alpha)^2 \cdot KACT(k) + (1-\alpha) \cdot \alpha \cdot KAF(k-3) + \\ &\quad \alpha \cdot KAF(k-2) \end{aligned} \tag{14}$$

Furthermore, in the above equation (13), if the variables are shifted by one control cycle toward the future, there is obtained the following equation (15):

$$KACT(k+3) = (1-\alpha) \cdot KACT(k+2) + \alpha \cdot KAF(k-1) \tag{15}$$

If the equation (14) is substituted into the equation (15), there is obtained the following equation (16):

$$\begin{aligned} KACT(k+3) &= (1-\alpha)\cdot\{(1-\alpha)^2\cdot KACT(k) + (1-\alpha)\cdot\alpha\cdot KAF(k-3) + \alpha\cdot KAF(k-2)\} + \alpha\cdot KAF(k-1) \\ &= (1-\alpha)^3\cdot KACT(k) + (1-\alpha)^2\cdot\alpha\cdot KAF(k-3) + (1-\alpha)\cdot\alpha\cdot KAF(k-2) + \alpha\cdot KAF(k-1) \end{aligned} \quad (16)$$

When KACT(k+3) on the right side of the above equation (16) and $\alpha$ on the left side thereof are replaced by PRE_KACT_3(k) and $\alpha$id(k), respectively, the aforementioned equation (6) is obtained.

Next, the above-mentioned onboard identifier 60 will be described. When the dead time d sequentially changes according to the exhaust gas volume Vex, as in the controlled object of the present embodiment, the onboard identifier 60 calculates the identified value $\alpha$id with a scheduled modification-type identification algorithm with restraint conditions, referred to hereinafter, while causing such changes in the dead time d to be reflected on the identified value $\alpha$id. The identification algorithm for the onboard identifier 60 is derived, as described hereinafter, based on a modified model (equation (30), referred to hereinafter) obtained by replacing a value KAF(k−d) on the right side of the aforementioned equation (2) with a modified control input KAF_mod(k), referred to hereinafter.

Figure 7:
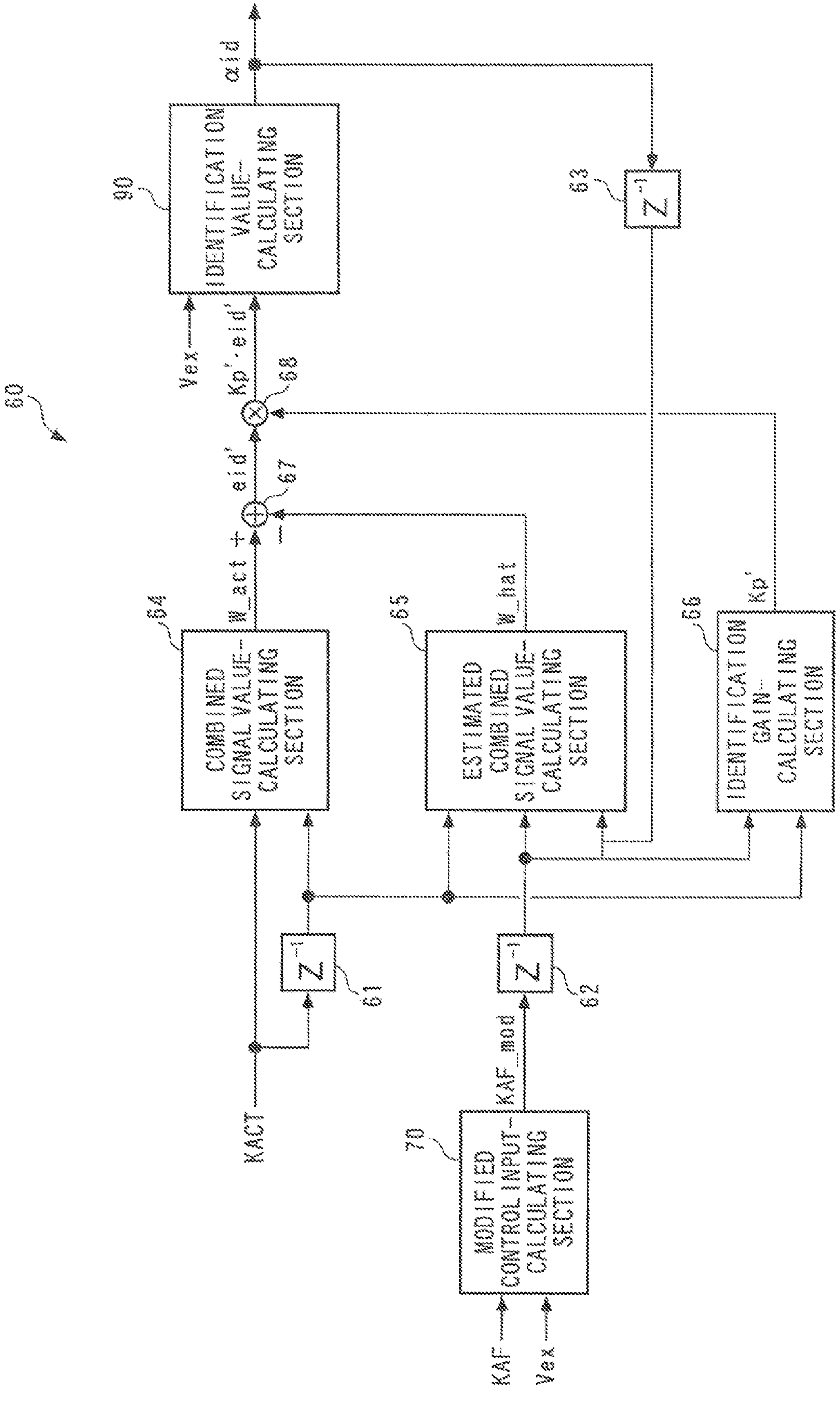
FIG. 7 is a block diagram of an onboard scheduled model parameter identifier.

As shown in FIG. 7, the onboard identifier 60 includes a modified control input-calculating section 70, three delay elements 61 to 63, a combined signal value-calculating section 64, an estimated combined signal value-calculating section 65, an identification gain-calculating section 66, a subtractor 67, a multiplier 68, and an identified value-calculating section 90.

Figure 8:
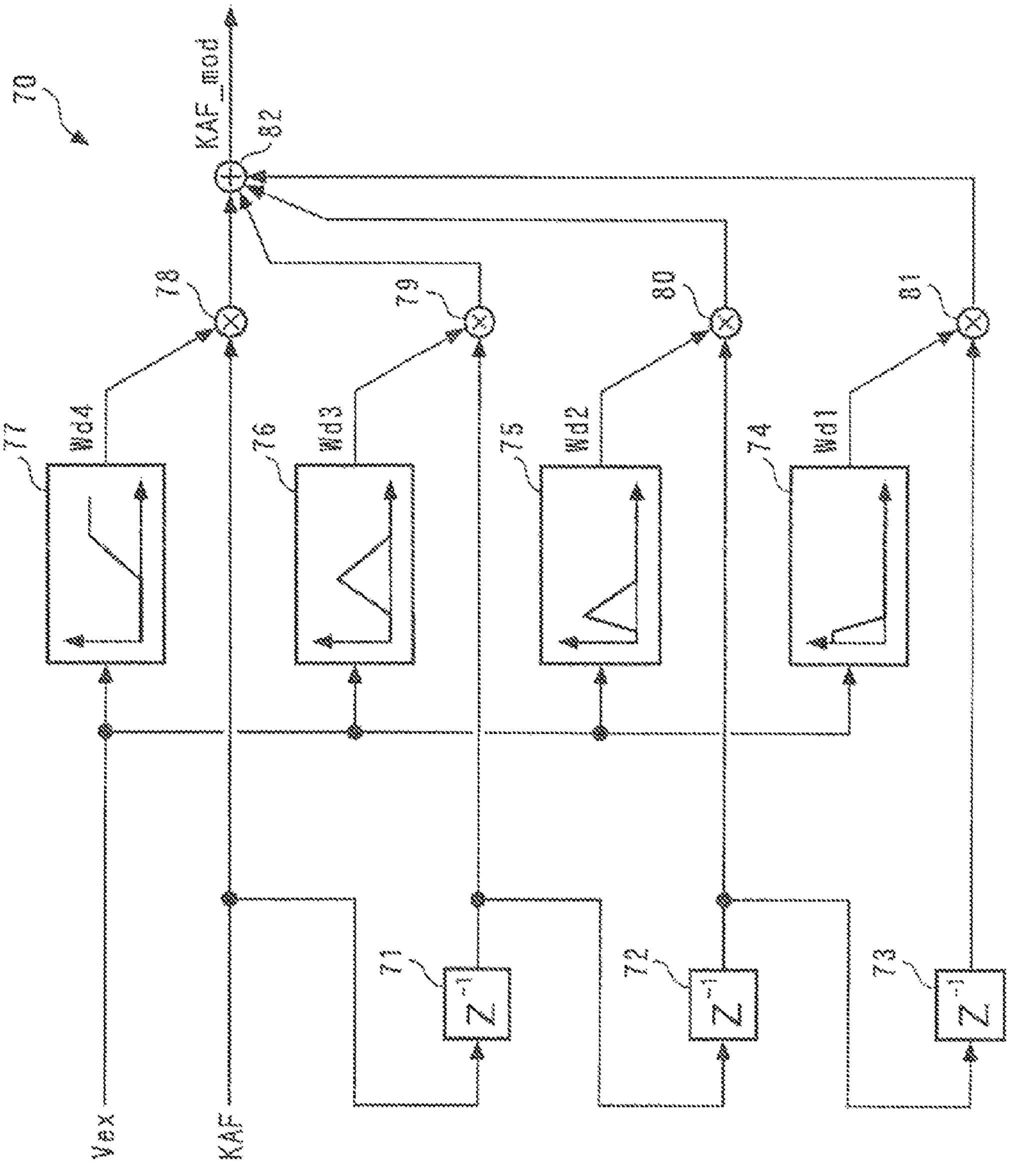
FIG. 8 is a block diagram of a modified control input-calculating section.

First, a description will be given of the modified control input-calculating section 70. The modified control input-calculating section 70 calculates the modified control input KAF_mod, and as shown in FIG. 8, includes three delay elements 71 to 73, four weight function value-calculating sections 74 to 77, four multipliers 78 to 81, and an adder 82.

First, similarly to the above-mentioned four weight function value-calculating sections 48 to 51, the four weight function value-calculating sections 74 to 77 calculate four weight function values Wd1 to Wd4 by searching the map shown in FIG. 6, respectively, according to the exhaust gas volume Vex.

The multiplier 78 calculates a product Wd4(k)·KAF(k) by multiplying a weight function value Wd4(k) by the current value KAF(k) of the air-fuel ratio correction coefficient. The multiplier 79 calculates a product. Wd3(k)·KAF(k−1) by multiplying a weight function value Wd3(k) by the value KAF(k−1) of the air-fuel ratio correction coefficient, delayed by one control cycle by the delay element 71.

The multiplier 80 calculates a product Wd2(k)·KAF(k−2) by multiplying a weight function value Wd2(k) by the value KAF(k−2) of the air-fuel ratio correction coefficient, delayed by two control cycles by the two delay element 71 and 72, and the multiplier 81 calculates a product Wd1(k)·KAF(k−3) by multiplying a weight function value Wd1(k) by the value KAF(k−3) of the air-fuel ratio correction coefficient, delayed by three control cycles by the three delay elements 71 to 73.

The adder 82 calculates the modified control input KAF_mod using the above-described four products by the following equation (17):

$$\mathrm{KAF\_mod}(k) = \sum_{i=1}^{4} Wdi(k)\cdot KAF(k-4+i) \quad (17)$$

Referring again to FIG. 7, the combined signal value-calculating section 64 calculates a combined signal value W_act using the detected equivalent ratio KACT and a value KACT(k−1) of the detected equivalent ratio delayed by one control cycle by the delay element 61, by the following equation (18):

$$W\_act(k)=KACT(k)-KACT(k-1) \quad (18)$$

The estimated combined signal value-calculating section 65 calculates a difference ζ' (k−1) by the following equation (19) using the value KACT(k−1) of the detected equivalent ratio delayed by one control cycle by the delay element 61 and a value KAF_mod(k−1) of the modified control input delayed by one control cycle by the delay element 62, and then calculates an estimated combined signal value W_hat using the difference ζ' (k−1) and an identified value $\alpha$id(k−1) delayed by one control cycle by the delay element 63, by the following equation (20):

$$\zeta'(k-1)=KAF\_\mathrm{mod}(k)-KACT(k-1) \quad (19)$$

$$W\_hat(k)=\alpha id(k-1)\cdot\zeta'(k-1) \quad (20)$$

The subtractor 67 calculates an identification error eid' by the following equation (21):

$$eid'(k)=W\_act(k)-W\_hat(k) \quad (21)$$

On the other hand, the identification gain-calculating section 66 calculates an identification gain Kp' by the following equations (22) and (23). The identification gain Kp' defines a direction (positive or negative) and amount of modification of the identified value $\alpha$id.

$$P'(k) = \frac{1}{\lambda 1}\cdot\left(1-\frac{\lambda 2\cdot P'(k-1)\cdot\zeta'(k-1)}{\lambda 1+\lambda 2\cdot P'(k-1)\cdot\zeta'(k-1)}\right)P'(k-1) \quad (22)$$

$$Kp'(k) = \frac{P'(k)\cdot\zeta'(k-1)}{1+P'(k)\cdot\zeta'(k-1)} \quad (23)$$

In the above equation (22), an initial value P'(0) of a gain P'(k) is defined by the following equation (24):

$$P'(0)=P0 \quad (24)$$

wherein P0 is set to a predetermined value.

Further, in the above equation (22), λ1 and λ2 represent weight parameters. By setting the values of the weight parameters λ1 and λ2 as described below, is possible to select one of the following three algorithms as an identification algorithm.

λ1=1, λ2=0: fixed gain algorithm;

λ1=1, λ2=1: least-squares method algorithm; and

λ1=1, λ2=1: weighted least-squares method algorithm, wherein represents a predetermined value set such that 0<λ<1 holds. In the present embodiment, the weighted least-squares method algorithm is employed so as to properly secure identification accuracy of and control accuracy.

The multiplier 68 calculates a product Kp'·eid' obtained by multiplying the identification gain Kp' by the identification error eid'.

Figure 9:
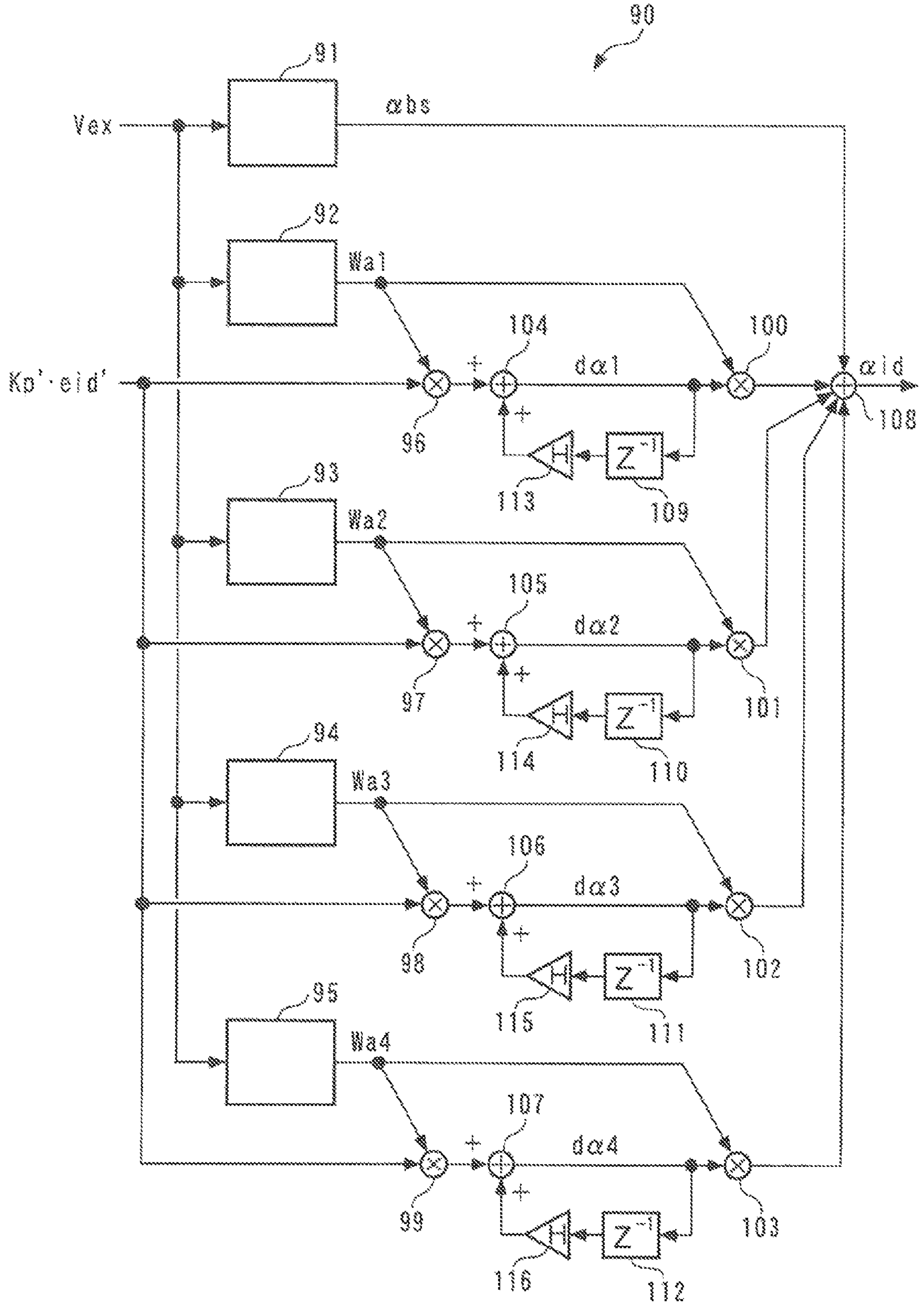
FIG. 9 is a block diagram of an identified value-calculating section.

Then, the identified value-calculating section 90 calculates the identified value $\alpha id$ using the above-mentioned product $Kp' \cdot eid'$ and the exhaust gas volume Vex, as described hereinafter. As shown in FIG. 9, the identified value-calculating section 90 includes a reference model parameter-calculating section 91, four weight function value-calculating sections 92 to 95, eight multipliers 96 to 103, five adders 104 to 108, four delay elements 109 to 112, and four amplifiers 113 to 116.

Figure 10:
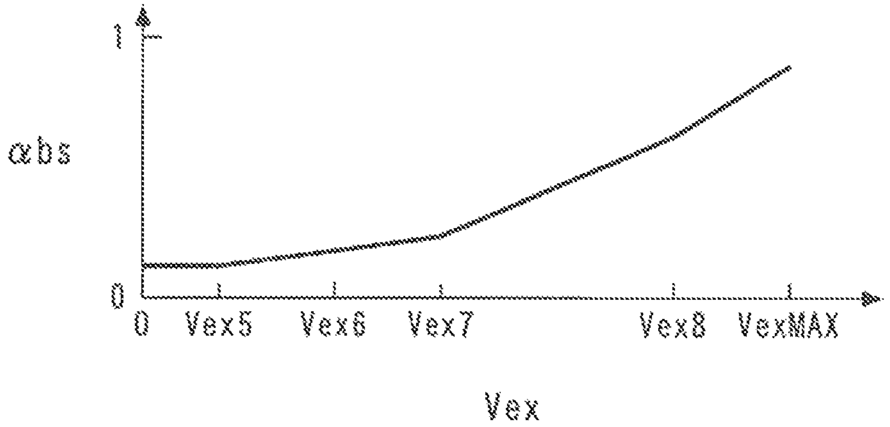
FIG. 10 is a diagram showing an example of a map for use in calculating a reference model parameter αbs.

First, the reference model parameter-calculating section 91 calculates a reference model parameter $\alpha bs$ by searching a map shown in FIG. 10 according to the exhaust gas volume Vex. In FIG. 10, Vex 5 to Vex 8 are predetermined values of the exhaust gas volume Vex, and are set such that $0<Vex5<Vex6<Vex7<Vex8<VexMAX$ holds. In this map, the reference model parameter $\alpha bs$ is set to a larger value as the exhaust gas volume Vex is larger. This is because as the exhaust gas volume Vex is larger, the exchange of exhaust gases via the holes of a sensor cover of the LAF sensor 23 is promoted to make the delay characteristic of the LAF sensor 23 smaller, to thereby increase the degree of influence of the air-fuel ratio correction coefficient KAF on the detected equivalent ratio KACT.

Figure 11:
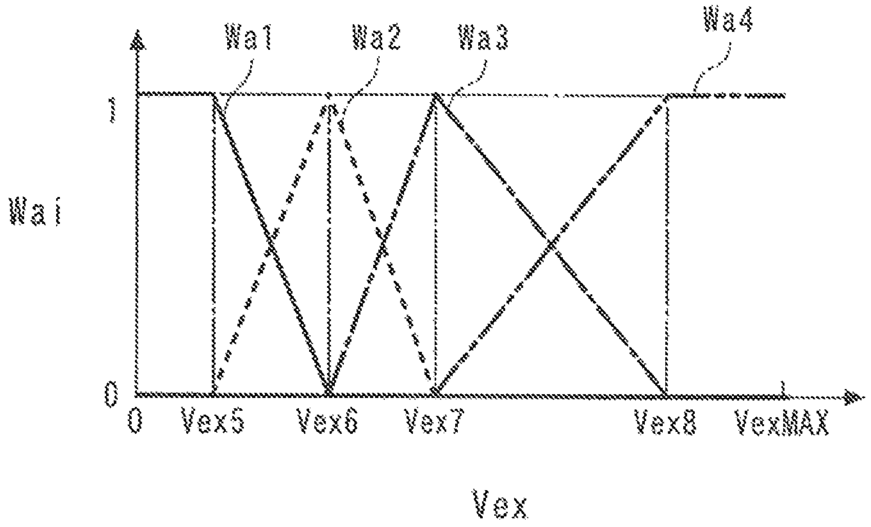
FIG. 11 is a diagram showing an example of a map for use in calculating a weight function value Wai.

Further, the four weight function value-calculating sections 92 to 95 calculate four weight function values Wa1 to Wa4, respectively, by searching a map shown in FIG. λ1 according to the exhaust gas volume Vex. As shown in FIG. 11, when a range within which the exhaust gas volume Vex can change is divided into the four ranges of $0 \le Vex \le Vex6$, $Vex5 \le Vex \le Vex7$, $Vex6 \le Vex \le Vex8$, and $Vex7 \le Vex \le VexMAX$, the four weight function values Wa1 to Wa4 are set such that they are associated with the above four ranges, respectively, and are set to positive values not larger than 1 in the ranges associated therewith, whereas in ranges other than the associated ranges, they are set to 0.

More specifically, the weight function value Wa1 is set, in the range ($0 \le Vex \le Vex6$) associated therewith, to a maximum value of 1 when $Vex \le Vex5$ holds and to a smaller positive value as the exhaust gas volume Vex is larger, while in the other ranges, it is set to 0. The weight function value Wa2 is set, in the range ($Vex5 \le Vex \le Vex7$) associated therewith, to such a value as changes along the inclined sides of a triangle with a maximum value of 1 when $Vex=Vex6$ holds, while in the other ranges, it is set to 0.

The weight function value Wa3 is set, in the range ($Vex6 \le Vex \le Vex8$) associated therewith, to such a value as changes along the inclined sides of a triangle with a maximum value of 1 when $Vex=Vex7$ holds, while in the other ranges, it is set to 0. The weight function value Wa4 is set, in the range ($Vex7 \le Vex \le VexMAX$) associated therewith, to a larger positive value as the exhaust gas volume Vex is larger with a maximum value of 1 when $Vex8 \le Vex$ holds, while in the other ranges, it is set to 0.

Further to the above, the four ranges with which the respective four weight function values Wai (i=1 to 4) are associated are set such that adjacent ones thereof overlap each other, as described above, and the sum of the values of the weight function values Wai associated with each value of the exhaust gas volume Vex in the overlapping ranges becomes equal to the maximum value of 1 of each of the weight function values Wai. As is clear from a comparison between FIG. 11 and FIG. 10, referred to hereinabove, the three ranges overlapping each other are set such that they correspond to three ranges, respectively, within which the slope of the reference model parameter $\alpha bs$ is held constant.

The multiplier 96 calculates a product $Wa1 \cdot Kp' \cdot eid'$ by multiplying the weight function value Wa1 by the value $Kp' \cdot eid'$, and the amplifier 113 calculates a product $H(k) \cdot d\alpha 1(k-1)$ by multiplying a modification term $d\alpha 1(k-1)$ delayed by one cycle by the delay element 109 by a gain coefficient H(k). The gain coefficient H(k) will be described hereinafter. Then, the adder 104 calculates a modification term $d\alpha 1$ by adding the value $H(k) \cdot d\alpha 1(k-1)$ to the value $Wa1 \cdot Kp' \cdot eid'$.

The multiplier 97 multiplies the weight function value Wa2 by the value $Kp' \cdot eid'$, to thereby calculate a product $Wa2 \cdot Kp' \cdot eid'$, and the amplifier 114 multiplies a modification term $d\alpha 2(k-1)$ delayed by one cycle by the delay element 110 by the gain coefficient H(k), to thereby calculate a product $H(k) \cdot d\alpha 2(k-1)$. Then, the adder 105 adds the value $H(k) \cdot d\alpha 2(k-1)$ to the value $Wa2 \cdot Kp' \cdot eid'$, to thereby calculate a modification term $d\alpha 2$.

The multiplier 98 multiplies the weight function value Wa3 by the value $Kp' \cdot eid'$, to thereby calculate a product $Wa3 \cdot Kp' \cdot eid'$, and the amplifier 115 multiplies a modification term $d\alpha 3(k-1)$ delayed by one cycle by the delay element 111 by the gain coefficient H(k), to thereby calculate a product $H(k) \cdot d\alpha 3(k-1)$. Then, the adder 106 adds the value $H(k) \cdot d\alpha 3(k-1)$ to the value $Wa3 \cdot Kp' \cdot eid'$, to thereby calculate a modification term $d\alpha 3$.

The multiplier 99 multiplies the weight function value Wa4 by the value $Kp' \cdot eid'$, to thereby calculate a product $Wa4 \cdot Kp' \cdot eid'$, and the amplifier 116 multiplies a modification term $d\alpha 4(k-1)$ delayed by one cycle by the delay element 112 by the gain coefficient H(k), to thereby calculate a product $H(k) \cdot d\alpha 4(k-1)$. Then, the adder 107 adds the value $H(k) \cdot d\alpha 4(k-1)$ to the value $Wa4 \cdot Kp' \cdot eid'$, to thereby calculate a modification term $d\alpha 4$.

The above-described amplifiers 113 to 116 calculate the gain coefficient H as shown in the following equations (25) to (27):

When $\alpha\_H < \alpha id(k-1)$ holds, $$H(k)=\eta' \tag{25}$$

When $\alpha\_L \le \alpha id(k-1) \le \alpha\_H$ holds, $$H(k)=1 \tag{26}$$

When $\alpha id(k-1) < \alpha\_L$ holds, $$H(k)=\eta' \tag{27}$$

In the above equations (25) to (27), represents a predetermined lower limit value, and $\alpha_H$ represents a predetermined upper limit value. Further, $\eta'$ represents a forgetting coefficient set such that $0<\eta' \le 1$ holds. The forgetting coefficient $\eta'$ is used for calculating the identified value $\alpha id$ because when the engine 3 continues to be in a steady operating condition for a long time period, there is a fear that the identified value $\alpha id$ increases to become inappropriate. To avoid this inconvenience, the forgetting coefficient $\eta'$ is used. Further, as expressed by the above equation (26), when the identified value $\alpha id$ is between the lower limit value $\alpha_L$ and the upper limit value $\alpha_H$, a forgetting effect provided by the forgetting coefficient $\eta'$ is suspended, because in the case of the identification algorithm used by the onboard identifier 60, it is possible to always identify the identified value $\alpha id$ such that an identification condition 1 (restraint condition), described hereinafter, is satisfied, so that it is unnecessary to forcibly restrain the identified value $\alpha id$ in the vicinity of the reference model parameter $\alpha bs$, described hereinafter, so as to satisfy the restraint condition.

Calculation performed by the above-described four adders 104 to 107 is expressed by the following equation (28):

$$d\alpha i(k)=H(k) \cdot d\alpha i(k-1)+Wai(k) \cdot Kp'(k) \cdot eid'(k) \tag{28}$$

The multipliers 100 to 103 multiply the four modification terms $d\alpha i$ by the four weight function values Wai, to thereby calculate the four products $Wai \cdot d\alpha i$, respectively.

Then, the adder 108 finally calculates the identified value αid by the following equation (29):

$$\alpha id(k) = \alpha bs(k) + \sum_{i=1}^{4} Wai(k) + d\alpha i(k) \tag{29}$$

As described hereinabove, in the onboard identifier 60, the modified control input KAF_mod is calculated as the total sum of products obtained by multiplying the detected equivalent ratio KACT by the four weight function values Wdi associated with four control times, respectively, and the four modification terms dαi are calculated as the total sum of products obtained by multiplying the product Kp'·eid' of the identification error eid' calculated using the modified control input KAF_mod and the identification gain Kp' by the four weight function values Wai, respectively. Then, the identified value αid is calculated by adding the total sum to the reference model parameter αbs. Therefore, even when the delay characteristic and the dead time d sequentially change according to changes in the exhaust gas volume Vex, it is possible to identify the identified value αid as a value that changes smoothly while suppressing adverse influences of the sequential changes in the delay characteristic and the dead time d, by virtue of the effects of the two types of the weight function values Wdi and Wai.

In calculating the identified value αid, the identification algorithm expressed by the above-described equations (17) to (29) is used for the following reason: First, the control system of the control apparatus 1 according to the present embodiment is a system in which the air-fuel ratio correction coefficient KAF is a control input and the detected equivalent ratio KACT is a controlled variable, and in which no steady-state error is generated in a state where there is no disturbance. Therefore, in the case of the control target model expressed by the aforementioned equation (2), in order to prevent generation of a steady-state error between the input and the output, the respective multiplication coefficients of an input term and an output term, i.e. the model parameters α and 1−α, are set such that the sum thereof becomes equal to 1.

In this case, the two model parameters α and 1−α have a mutually-restraining relationship in which they cannot take values independent of each other, but as one increases, the other decreases. Therefore, to identify the two model parameters α and 1−α, it is necessary to identify them such that a condition for restraining each other, in which as one increases, the other decreases, (hereinafter referred to the "restraint condition") is satisfied. Hereinafter, this condition will be referred to the "identification condition 1". Here, when a general identification algorithm, such as the least-squares method, is directly employed, it is difficult to satisfy the identification condition 1.

In addition to this, as described hereinabove, the delay characteristic and the dead time d have a characteristic that they change according to the exhaust gas volume Vex, and therefore when the general identification algorithm, such as the least-squares method, is directly employed, it is impossible to identify the two model parameters α and 1−α while causing the changes in the delay characteristic and the dead time d to be reflected on the model parameters, which results in the degraded accuracy of identification of the model parameters α and 1−α. Therefore, even when the delay characteristic and the dead time d have changed with a view of enhancing the identification accuracy, it is necessary to identify the model parameters α and 1−α under the condition of properly causing the changes in the delay characteristic and the dead time d to be reflected on the model parameters. Hereinafter, this condition is referred to as the "identification condition 2".

First, to satisfy the above-described identification condition 2, in place of the aforementioned equation (2), the following equation (30) is used as a control target model.

$$KACT(k+1)=(1-\alpha)\cdot KACT(k)+\alpha\cdot KAF\_mod(k) \tag{30}$$

This equation (30) corresponds to one obtained by replacing the value KAF(k−d) on the right side of the aforementioned equation (2) with the value KAF_mod(k). As expressed by the equation (17), this modified control input KAF_mod(k) is calculated as the sum of products of the four weight function values Wdi and the four air-fuel ratio correction coefficients KAF, respectively, and the four weight function values Wdi are calculated by the aforementioned method, so that even when the dead time d has changed, it is possible to calculate the modified control input KAF_mod while properly causing the change in the dead time d to be reflected on the same. In addition thereto, by using the weight function values Wai, it is possible to calculate the four modification terms dαi while causing the change in the delay characteristic to be reflected on the same. This makes it possible to satisfy the above-described identification condition 2.

When the above equation (30) is transformed, there is obtained the following equation (31):

$$KACT(k+1)-KACT(k)=\alpha\cdot(KAF\_mod(k)-KACT(k)) \tag{31}$$

The left side and the right side of the above equation (31) are defined as the combined signal value W_act and the estimated combined signal value W_hat, respectively, as expressed by the following equations (32) and (33):

$$W\_act(k+1)=KACT(k+1)-KACT(k) \tag{32}$$

$$W\_hat(k+1)=\alpha\cdot(KAF\_mod(k)-KACT(k)) \tag{33}$$

When the left side and the right side of the above equation (31) are defined as above, to satisfy the above-mentioned identification condition 1, it is only required to identify the model parameters of the control target model such that the combined signal value W_act and the estimated combined signal value W_hat become equal to each other. That is, it is only required to identify (calculate) the identified value αid such that the aforementioned identification error eid' becomes equal to 0. For the above reason, the identified value αid is calculated with the identification algorithm expressed by the aforementioned equations (17) to (29).

Further, when the model parameter α of the control target model and the exhaust gas volume Vex have the relationship described with reference to FIG. 10, it is impossible to identify the model parameter α with reference to the FIG. 10 relationship, with the general identification algorithm, such as the least-squares method. In contrast, in the case of the onboard identifier 60 according to the present embodiment, the reference model parameter αbs is calculated by searching the map shown in FIG. 10 according to the exhaust gas volume Vex, and the identified value αid is calculated by modifying the reference model parameter αbs with the total sum of the products of the aforementioned weight function values Wai and associated ones of the modification terms dαi, which makes it possible to ensure high accuracy of identification.

Next, a description will be given of the frequency shaping controller 130. This frequency shaping controller 130 calculates the air-fuel ratio correction coefficient KAF such that the predicted equivalent ratio PRE_KACT converges to the target equivalent ratio KCMD, in other words, the detected equivalent ratio KACT converges to the target equivalent ratio KCMD. In the frequency shaping controller 130, first, a predicted follow-up error PRE_e is calculated by subtracting the target equivalent ratio KCMD from the predicted equivalent ratio PRE_KACT, as expressed by the following equation (34):

$$PRE\_e(k)=PRE\_KACT(k)-KCMD(k) \quad (34)$$

Then, the air-fuel ratio correction coefficient KAF as a control input is calculated by the following equation (35):

$$KAF(k)=\frac{1}{\alpha id(k)}\{\beta\cdot \mathrm{PRE\_e}(k)-(1-\alpha id(k))\cdot\beta\cdot\mathrm{PRE\_e}(k-1)-\alpha id(k)\cdot KAF(k-1)\} \quad (35)$$

In this equation (35), β represents a sensitivity-setting parameter, and is set to a predetermined value (e.g. 0.6) by a method, described hereinafter.

Next, a description will be given of the deriving principles of the control algorithm of the above-described frequency shaping controller 130. In the present embodiment, the control apparatus 1 is configured such that in order to ensure excellent reduction of exhaust emissions and excellent fuel economy in a compatible manner, the air-fuel ratio of the gasoline engine 3 is controlled to the leaner side for lean burn operation, and NOx in exhaust gases is purified by a urea SCR system.

When the control apparatus 1 is configured as above, since the gasoline engine is low in combustion stability during the lean-burn operation, limiting the air-fuel ratio of a burnable air-fuel mixture within a predetermined range, it is necessary to suppress a phenomenon that the air-fuel ratio is temporarily excessively leaned. This phenomenon is liable to occur particularly when the engine is in a transient operating condition. In addition to this, during the lean-burn operation, a surging phenomenon is liable to occur due to combustion fluctuation, and hence, to prevent occurrence of the surging phenomenon, it is necessary to control the fuel amount such that it is not excessively fluctuated. To satisfy these requirements, it is necessary to control the air-fuel ratio such that the ability of suppressing a low-frequency disturbance becomes low and at the same time ability of suppressing a high-frequency disturbance becomes high. Hereinafter, this necessity is referred to as the "control condition ϕ".

Figure 12:
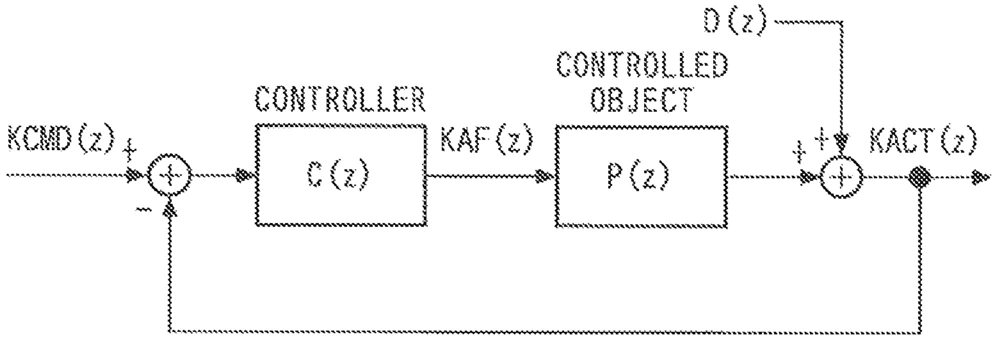
FIG. 12 is a Z-domain block diagram representing the configuration of a feedback control system of the control apparatus.

Now, FIG. 12 is a Z-domain block diagram representing the configuration of a feedback control system, such as the control apparatus 1 of the present invention, that is, the configuration of a system in which the air-fuel ratio correction coefficient KAF as a control input is input to the controlled object, whereby the detected equivalent ratio KACT is feedback-controlled such that it converges to the target equivalent ratio KCMD. In FIG. 12, C(z) represents a transfer function of the controller, P(z) represents a transfer function of the controlled object, and D(z) represents a disturbance. In the following description, the symbol (z) provided for each data item is omitted as deemed appropriate.

In the case of the above control system, the transfer function, i.e. a sensitivity function S between the disturbance D and the detected equivalent ratio KACT is expressed by the following equation (36):

$$S(z)=\frac{KACT(z)}{D(z)}=\frac{1}{1+C(z)\cdot P(z)} \quad (36)$$

Figure 13:
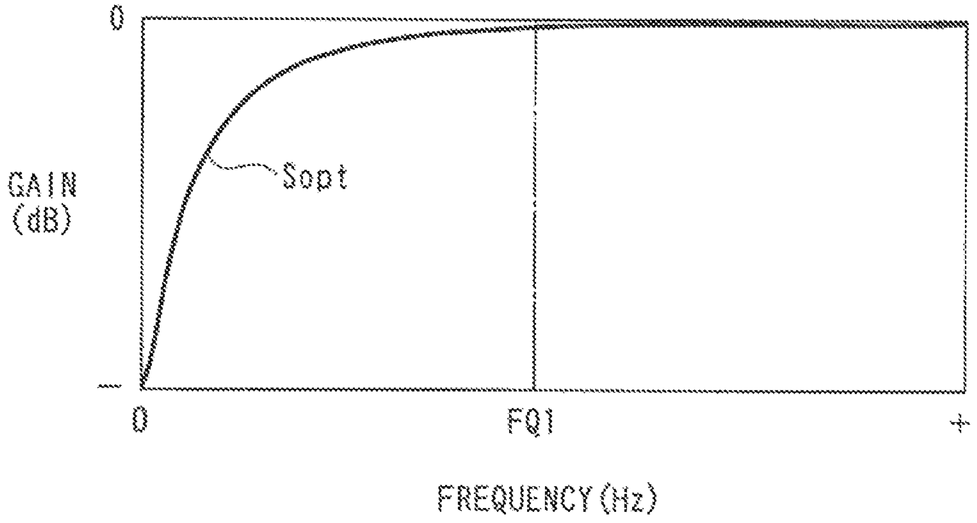
FIG. 13 is a diagram illustrating a gain curve of an optimum sensitivity function Sopt.

In this case, to satisfy the above-described control condition ϕ, a gain curve showing a gain characteristic (i.e. frequency response characteristic) of the sensitivity function S is required to be one as shown in FIG. 13. Hereinafter, a sensitivity function that provides the FIG. 13 gain curve satisfying the control condition ϕ will be referred to as the "optimum sensitivity function Sopt". In FIG. 13, FQ1 represents a predetermined frequency, which is set in advance by experiment. As shown in FIG. 13, the optimum sensitivity function Sopt is set to a high gain in a high-frequency range which is not lower than the predetermined frequency FQ1 and in which the necessity of suppressing the disturbance is high (hereinafter referred to as the "disturbance suppression range"), whereas in a frequency range which is lower than the predetermined frequency FQ1 and in which the necessity of suppressing the disturbance is low (hereinafter referred to as the "disturbance non-suppression range", the optimum sensitivity function Sopt is set to a lower gain than in the disturbance suppression range. More specifically, the optimum sensitivity function Sopt is configured such that in the disturbance suppression range, it has a gain characteristic that the gain is high and flat and in the disturbance non-suppression range, it has a gain characteristic that the gain is continuously sharply reduced as the frequency of a disturbance is lower. In the present embodiment, the optimum sensitivity function Sopt configured to satisfy the control condition ϕ corresponds to a sensitivity function configured such that a predetermined frequency characteristic can be obtained.

Here, when the sliding mode control algorithm disclosed in Japanese Laid-Open Patent Publication (Kokai) No. 2000-234550 is applied to the FIG. 12 control system, the following is obtained. In the sliding mode control algorithm, a follow-up error e and a switching function σ are defined by the following equations (37) and (38):

$$e(k)=KACT(k)-KCMD(k) \quad (37)$$

$$\sigma(k)=e(k)+POLE\_E\cdot e(k-1) \quad (38)$$

wherein POLE_E represents a switching function-setting parameter set such that $-1<POLE\_E<0$ holds.

The sliding mode control algorithm is a control method for restraining the dynamic characteristics of the controlled object such that σ=0 holds. When σ=0 is applied to the above equation (38), there is obtained the following equation (39), and by arranging the equation (39), there is obtained the following equation (40):

$$\sigma(k)=e(k)+POLE\_E\cdot e(k-1)=0 \quad (39)$$

$$e(k)=-POLE\_E\cdot e(k-1) \quad (40)$$

Figure 14:
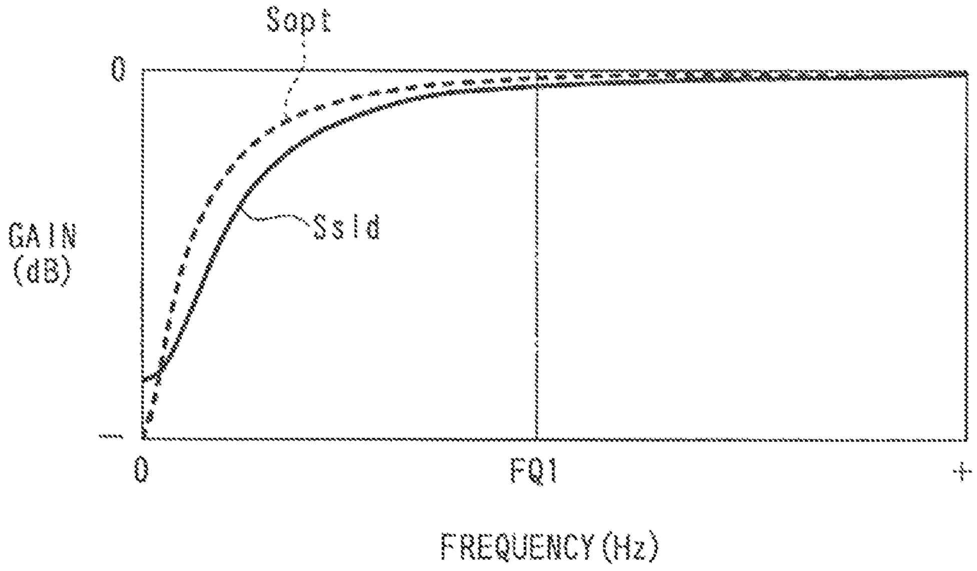
FIG. 14 is a diagram illustrating a gain curve of a sensitivity function Ssld of a sliding mode control algorithm.

The above equation (40) represents a first-order lag system with no input. More specifically, the sliding mode control algorithm is a control algorithm for restraining the dynamic characteristics of the controlled object in the first-order lag system with no input, and the gain curve of a sensitivity function Ssld of such a first-order lag system is indicated by a solid line in FIG. 14. As is clear from FIG. 14, it is understood that the gain curve of the sensitivity function Ssld considerably approximates the gain curve of the optimum sensitivity function Sopt indicated by a broken line in FIG. 14, and satisfies the above-described control condition ϕ.

Now, in the case of the sliding mode control algorithm, there are a reaching mode before the follow-up error e reaches a value on a switching straight line (i.e. σ becomes equal to 0), and a sliding mode after the follow-up error e has reached the value on the switching straight line (i.e. after the dynamic characteristics of the controlled object have been restrained in the first-order lag system with no input). Therefore, although the control condition ϕ can be satisfied in the sliding mode, it cannot be satisfied in the reaching mode. That is, in the sliding mode control algorithm, it is impossible to always satisfy the control condition ϕ.

To avoid this inconvenience, in the present embodiment, as a control algorithm that always satisfies the control condition ϕ, a control algorithm is employed which sets a sensitivity function Sd in advance such that the sensitivity function Sd always satisfies the control condition ϕ, as described hereinafter. First, assuming that a system in which the air-fuel ratio correction coefficient KAF having a dimension of the equivalent ratio is a control input and the detected equivalent ratio KACT is a controlled variable is a first-order lag system, a control target model of the system is expressed by the aforementioned equation (1), and a transfer function P in the Z-domain of the control target model is expressed by the following equation (41):

$$P(z) = \frac{KACT(z)}{KAF(z)} = \frac{\alpha}{z-(1-\alpha)} = \frac{\alpha \cdot z^{-1}}{1-(1-\alpha)\cdot z^{-1}} \tag{41}$$

On the other hand, the sensitivity function Sd satisfying the control condition ϕ is defined as expressed by the following equation (42):

$$Sd(z) = 1 - \frac{\beta}{z-(1-\beta)} \tag{42}$$

In the above equation (42), β represents a sensitivity function-setting parameter, and is set to a predetermined value satisfying 0<β<1. In the above equation (42), the gain curve of the sensitivity function Sd, obtained when β=0.6, is indicated by a solid line in FIG. 15. As is clear from FIG. 15, it is understood that the gain curve of the sensitivity function Sd considerably approximates the gain curve of the optimum sensitivity function Sopt indicated by a broken line in FIG. 15, and satisfies the aforementioned control condition ϕ.

The relationship between the sensitivity function Sd, a transfer function C of the controller, and the transfer function P of the controlled object is expressed by the following equation (43):

$$Sd(z) = \frac{1}{1+C(z)\cdot P(z)} \tag{43}$$

When the above equation (43) is transformed, and the definition equation of the sensitivity function Sd is solved for the controller C, there is obtained the following equation (44):

$$C(z) = \frac{1-Sd(z)}{Sd(z)} \cdot \frac{1}{P(z)} \tag{44}$$

If the equation (42) is substituted into the equation (44), there is obtained the following equation (45):

$$\begin{aligned} C(z) &= \frac{\beta z-(1-\alpha)\cdot\beta}{\alpha(z-1)} \\ &= \frac{\beta-(1-\alpha)\cdot\beta\cdot Z^{-1}}{\alpha(1-z^{-1})} \end{aligned} \tag{45}$$

When this equation (45) is expressed by a recurrence formula of a discrete-time system, there is obtained the following equation (46):

$$KAF(k) = \frac{1}{\alpha}\{\beta\cdot e(k)-(1-\alpha)\cdot\beta\cdot c(k-1)-\alpha\cdot KAF(k-1)\} \tag{46}$$

As is clear from this equation (46), it is understood that the feedback gain of the controller can be specified (set) by the model parameter α of the control target model and the sensitivity function-setting parameter β for determining the frequency response characteristic (gain characteristic) of the sensitivity function Sd.

On the other hand, in the case of the above-described FIG. 12 control system, a complementary sensitivity function T is expressed by the following equation (47):

$$T(z) = \frac{C(z)\cdot P(z)}{1+C(z)\cdot P(z)} = \frac{KACT(z)}{KCMD(z)} \tag{47}$$

Here, it is known that the relationship between the complementary sensitivity function T and the sensitivity function S is expressed by the following equation (48):

$$T(z)+S(z)=1 \tag{48}$$

As is clear from the above equations (47) and (48), the method of deriving the above-mentioned equation (46) determines a frequency response characteristic (gain characteristic) between the disturbance D and the detected equivalent ratio KACT, and at the same time a frequency response characteristic (gain characteristic) between the target equivalent ratio KCMD and the detected equivalent ratio KACT.

Figure 15:
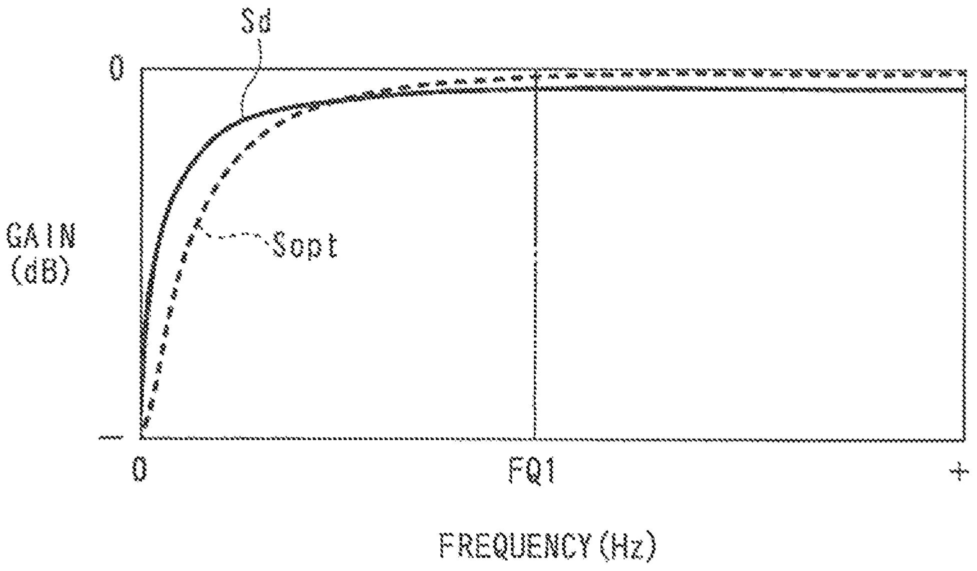
FIG. 15 is a diagram illustrating a gain curve of a sensitivity function Sd of an equation (42)
Figure 16:
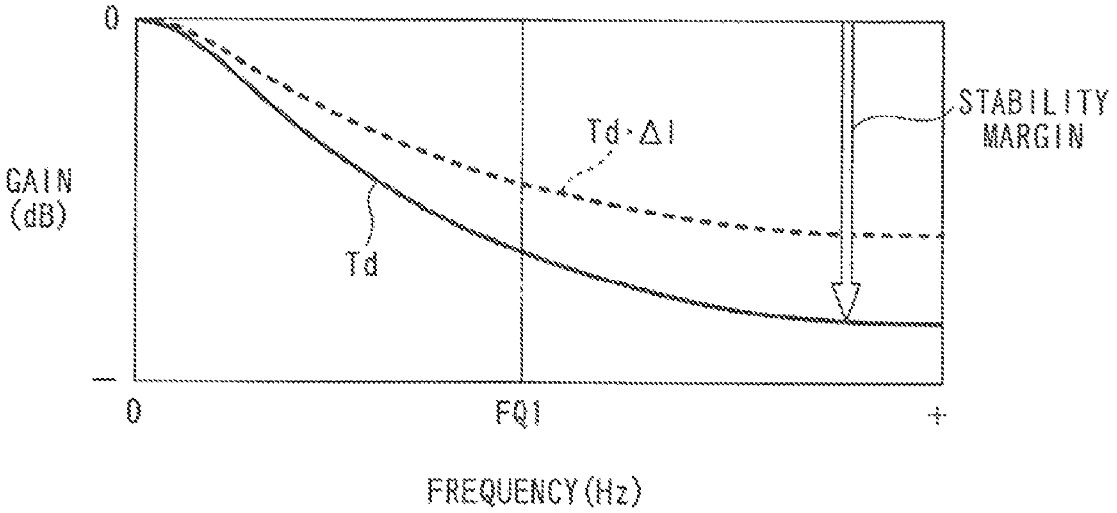
FIG. 16 is a diagram illustrating a gain curve of a complementary sensitivity function Td.

Now, assuming that a complementary sensitivity function corresponding to the FIG. 15 sensitivity function Sd is represented by Td, the gain curve of complementary sensitivity function Td is as illustrated in FIG. 16. In FIG. 16, a curve indicated by a broken line is a gain curve obtained when a modeling error Δl is caused to be reflected on the complementary sensitivity function Td.

As described above, the algorithm expressed by the equation (46) is derived using the sensitivity function Sd satisfying the control condition ϕ. When the control is attempted to be executed by directly using the equation (46), there occur problems 1 and 2, described hereinafter.

<Problem 1>: It is impossible to cope with fluctuation and variation in the model parameter α of the control target model, which makes it impossible to ensure high robustness. For example, only the same robustness as provided by the conventional PID control algorithm and optimum control algorithm can be ensured.

<Problem 2>: In a case where the controlled object has dead-time characteristics, it is impossible to cope with the dead-time characteristics, which can result in degraded control accuracy.

First, a detailed description will be given of <Problem 1>. Assuming that a model equation error between the control target model expressed by the equation (1) and an actual controlled object is represented by Δl(z), it is known that as a condition for stabilizing the control system, the following equation (49) needs to be satisfied.

$$|\Delta l(z)\cdot T(z)|<1 \quad (49)$$

Figure 17:
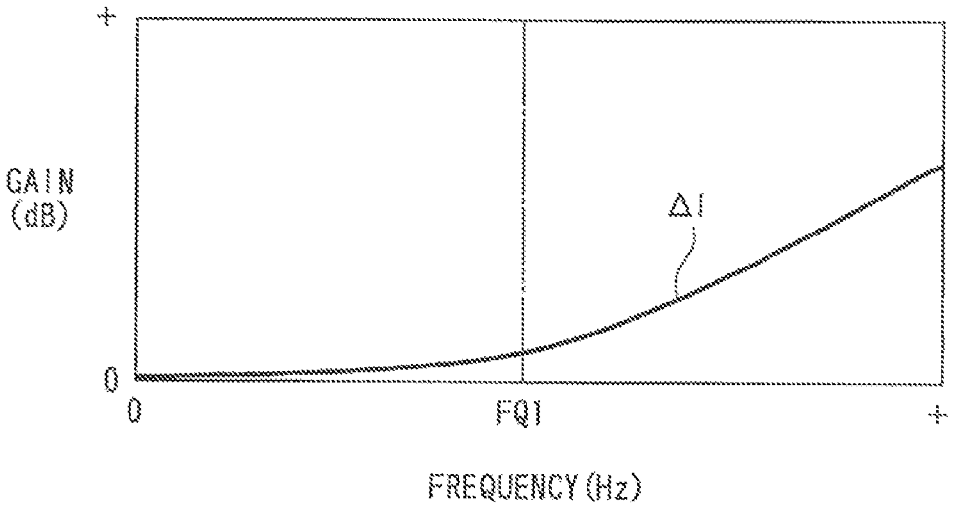
FIG. 17 is a diagram illustrating a gain curve of modeling error Δl in a first-order lag system.

Here, a lag system model, such as the first-order lag system model expressed by the equation (1), has a characteristic that the modeling error Δl therein increases as the frequency range becomes higher, as shown in FIG. 17, and hence when the modeling error Δl is reflected on the above-mentioned complementary sensitivity function Td, a gain curve indicated by a broken line in FIG. 16 is obtained. As is clear from the above-mentioned equation (49), the condition for stabilizing the control system is that a value of Td·Δl is smaller than 0 dB, and hence the degree by which the gain of the complementary sensitivity function Td is smaller than 0 dB provides a margin of the stability of the control system, which represents robustness.

However, the relationship of Td(z)+Sd(z)=1 exists between the sensitivity function Sd and the complementary sensitivity function Td, as described above, whereby it is impossible to set the frequency response characteristic and robustness against disturbance suppression independently of each other. Therefore, to improve the robustness against the modeling error Δl in the lag system model in a state where the frequency response characteristic against disturbance suppression is specified, another control algorithm is required which is capable of compensating for the modeling error Δ(z).

Note that when the degree of the equation (42) is increased and the sensitivity function Sd is modified into a complicated shape so as to cope with the modeling error Δl(z), in the transfer function C(z) of the equation (45), the degree of z in a numerator thereof becomes larger than the degree of z in a denominator thereof, which makes the controller unrealizable. Further, when a method of tuning the sensitivity-setting parameter β by try and error is employed, it is not different from a method of tuning the gain of the PID control or the weight functions Q and R of the optimum control, and the merit of the control method which uses the aforementioned equation (46) which directly specifies the frequency response characteristic of disturbance suppression is lost.

Next, a description will be given of the above-described <Problem 2>. In the control system of the present embodiment, the dead time d exists between the air-fuel ratio correction coefficient KAF and the detected equivalent ratio KACT, and the aforementioned equation (2) is used as the control target model of the control system. In this case, the transfer function P(z) in the Z-domain of the control target of the equation (2) is expressed by the following equation (50):

$$P(z)=\frac{KACT(z)}{KAF(z)}=\frac{\alpha}{z^d\cdot(z-(1-\alpha))}=\frac{\alpha\cdot z^{-(d+1)}}{1-(1-\alpha)\cdot z^{-1}} \quad (50)$$

Figure 18:
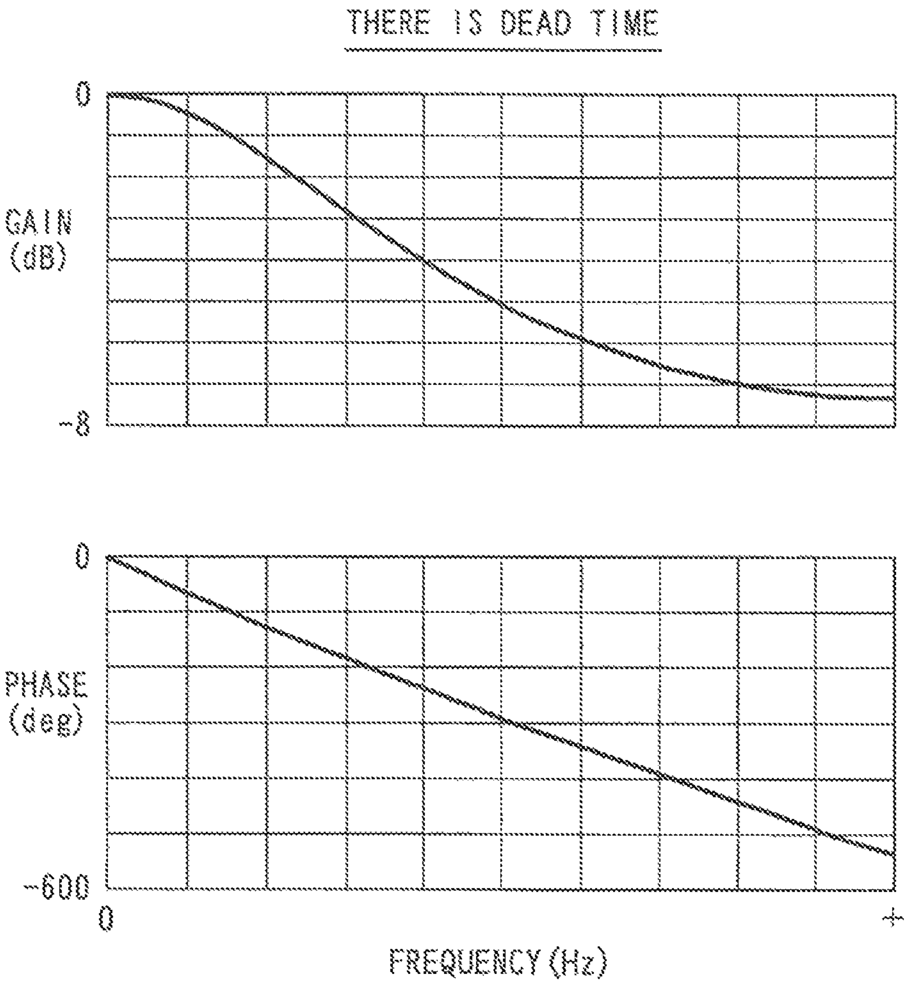
FIG. 18 is a Bode diagram of a transfer function P of an equation (50)
Figure 19:
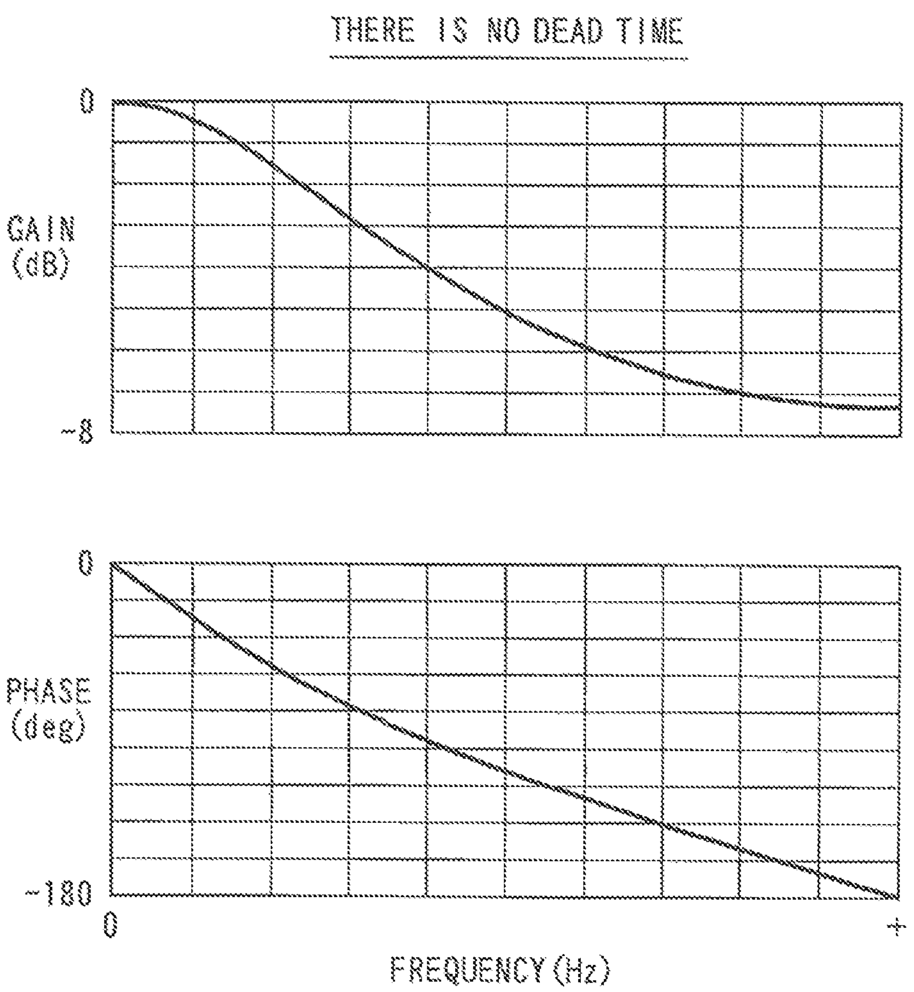
FIG. 19 is a Bode diagram of a transfer function P of an equation (41)

A Bode diagram of the transfer function P(z) in the equation (50) obtained by setting d=2 is shown in FIG. 18, and a Bode diagram of the transfer function P(z) of the control system with no dead time d in the aforementioned equation (41) is shown in FIG. 19. As is clear from a comparison between FIGS. 18 and 19, existence or non-existence of the dead time d does not appear as a difference between gain characteristics, which makes it impossible to represent the dead time as the above-described modeling error Δl. Therefore, the control method of using the above-mentioned equation (46), i.e. the control method of specifying the gain of the controller by the gain characteristics of the sensitivity function Sd and the complementary sensitivity function Td makes it impossible to take into account and compensate for robustness against the dead time.

On the other hand, it is well known that when dead time exists in the control system, the stability of the control system is markedly reduced, and to avoid this inconvenience, if the above-described control method is applied to the control system with the dead time, there is a fear that the control system diverges.

Further, if the aforementioned equations (42) and (50) are substituted into the aforementioned equation (44) to thereby derive the transfer function C(z) for the controller, there is obtained the following equation (51):

$$\begin{aligned}C(z)&=\frac{1-Sd(z)}{Sd(z)}\cdot\frac{1}{P(z)}\\&=\frac{(\beta\cdot z-(1-\alpha)\cdot\beta)\cdot z^d}{\alpha(z-1)}\\&=\frac{\beta\cdot z^d-(1-\alpha)\cdot\beta\cdot z^{d-1}}{\alpha(1-z^{-1})}\end{aligned} \quad (51)$$

When this equation (51) is expressed by a recurrence formula of a discrete-time system, there is obtained the following equation (52):

$$KAF(k)=\frac{1}{\alpha}\{\beta\cdot e(k+d)-(1-\alpha)\cdot\beta\cdot e(k+d-1)-\alpha\cdot KAF(k-1)\} \quad (52)$$

In this equation (52), future values e(k+d) and e(k+d−1) of the follow-up error e are included in the right side of the equation (52), so that it is impossible to realize the control algorithm for the controller.

Further, in the case of the controlled object of the present embodiment, the dead time d between the air-fuel ratio correction coefficient KAF as a control input and the detected equivalent ratio KACT as a controlled variable has a characteristic that it sequentially changes according to the exhaust gas volume Vex, as shown in FIG. 2, referred to hereinabove, and hence the above-described control method in which the frequency response characteristic of disturbance suppression is directly specified is naturally not applicable to a control system in which the dead time d changes, since the control method is not applicable to the controlled object with the dead time.

As described above, to solve the above-mentioned problems 1 and 2, it is required to construct a control algorithm which is capable of coping with fluctuation and variation in the model parameter α of the control target model, and at the same time coping with the characteristic of the controlled object that the dead time d thereof changes, while using the controller which uses the above-described sensitivity function Sd or complementary sensitivity function Td, i.e. the control algorithm which directly specifies the frequency response characteristic of disturbance suppression.

To meet the requirements, according to the control apparatus 1 of the present embodiment, first, the onboard identifier 60 calculates the identified value αid of the model parameter α with the above-described identification algorithm, and then the state predictor 40 calculates, with the above-described prediction algorithm, values of the predicted equivalent ratio PRE_KACT corresponding to respective values of the detected equivalent ratio KACT associated with respective times when the dead time d elapses.

Then, the predicted equivalent ratio PRE_KACT is used in place of the detected equivalent ratio KACT, as the control algorithm for the frequency shaping controller 130, and further the following equation (53) obtained by replacing the model parameter $\alpha$ of the aforementioned equation (2) with the identified value $\alpha id$ is used as a control target model, whereby the aforementioned equations (34) and (35) are derived by the same method as used for deriving the aforementioned equation (46).

$$KACT(k+1)=(1-\alpha id(k))\cdot KACT(k)+\alpha id(k)\cdot KAF(k) \quad (53)$$

This equation (53) is obtained by replacing $\alpha$ of the aforementioned equation (1) with $\alpha id$. In other words, it corresponds to an equation obtained by removing the dead time characteristic from the aforementioned equation (2) as the control target model (equation in which the dead time characteristic is not taken into account).

Figure 20:
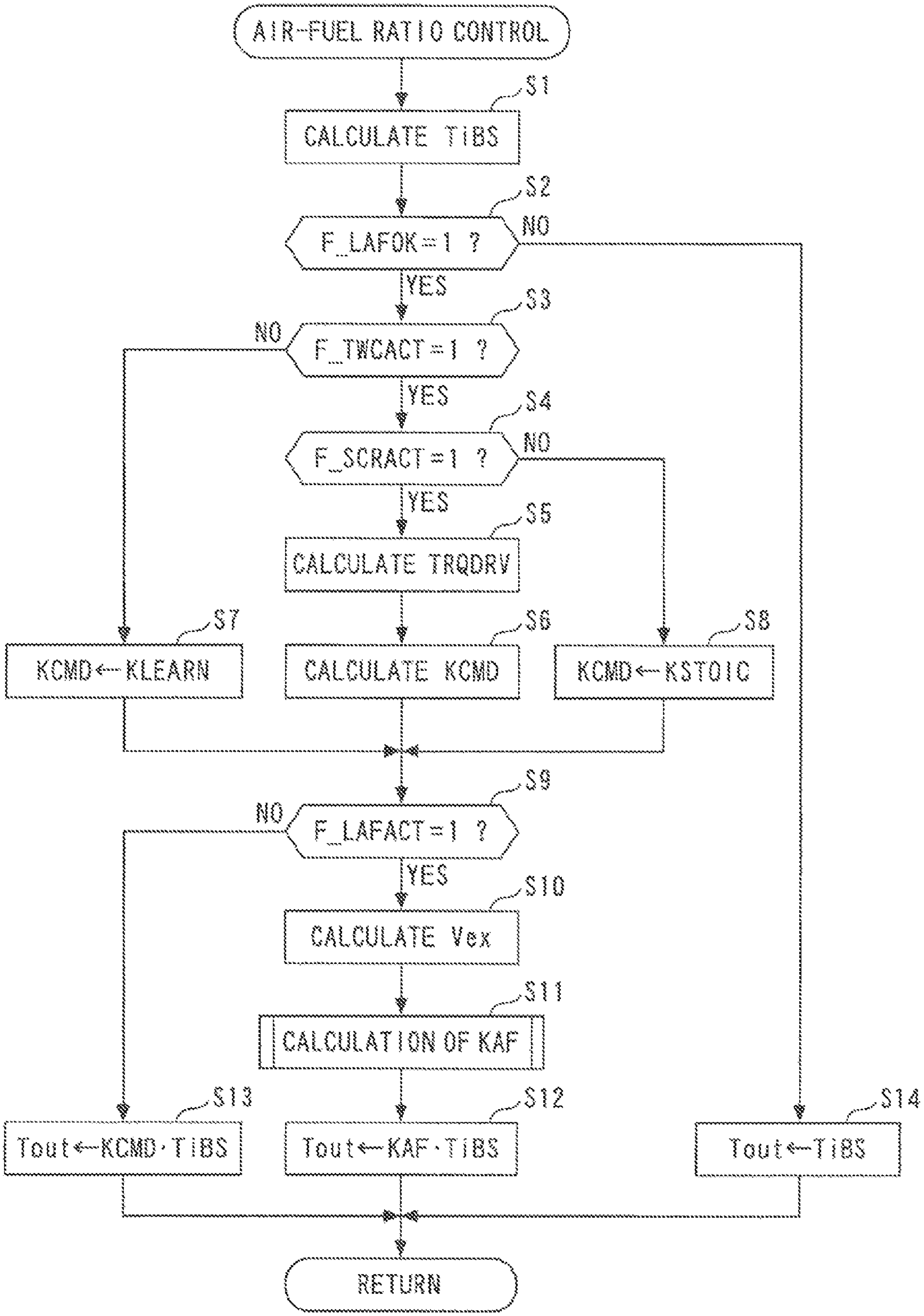
FIG. 20 is a flowchart of an air-fuel ratio control process.

Next, the air-fuel ratio control process executed by the ECU 2 will be described with reference to FIG. 20. As described hereinafter, the air-fuel ratio control process calculates a fuel injection amount Tout of fuel to be injected from the fuel injection valves 4, and is executed at the aforementioned predetermined control period $\Delta T$.

In the air-fuel ratio control process, first, in a step 1 (shown as S1 in abbreviated form in FIG. 21; the following steps are also shown in abbreviated form), a basic injection amount TiBS is calculated by searching a map, not shown, according to the engine speed NE and the intake pressure PB.

Then, the process proceeds to a step 2, wherein it is determined whether or not a LAF sensor normality flag F_LAFOK is equal to 1. When it is determined in a determination process, not shown, that the LAF sensor 23 is normal, the LAF sensor normality flag F_LAFOK is set to 1, and otherwise set to 0.

If the answer to the question of the step 2 is negative (NO), i.e. if the LAF sensor 23 is faulty, the process proceeds to a step 14, wherein the fuel injection amount Tout is set to the basic injection amount TiBS, followed by terminating the present process.

On the other hand, if the answer to the question of the step 2 is affirmative (YES), i.e. if the LAF sensor 23 is normal, the process proceeds to a step 3, wherein it is determined whether or not a three-way catalyst activation flag F_TWCACT is equal to 1. When it is determined in a determination process, not shown, that the two three-way catalysts 11 and 12 are both activated, the three-way catalyst activation flag F_TWCACT is set to 1, and otherwise set to 0.

If the answer to the question of the step 3 is negative (NO), i.e. if at least one of the two three-way catalysts 11 and 12 is not activated, the process proceeds to a step 7, wherein the target equivalent ratio KCMD is set to a predetermined leaning control value KLEARN. The predetermined leaning control value KLEARN is set to such a value (e.g. 0.9) as will make it possible to suppress generation of HC immediately after the start of the engine 3.

On the other hand, if the answer to the question of the step 3 is affirmative (YES), i.e. if the two three-way catalysts 11 and 12 are both activated, the process proceeds to a step 4, wherein an SCR activation flag F_SCRACT is equal to 1. When it is determined in a determination process, not shown, that at least one of the two selective reduction catalysts 14 and 15 is activated, the SCR activation flag F_SCRACT is set to 1, and otherwise set to 0.

If the answer to the question of the step 4 is negative (NO), i.e. if neither of the two selective reduction catalysts 14 and 15 is activated, the process proceeds to a step 8, wherein the target equivalent ratio KCMD is set to a predetermined stoichiometric control value KSTOIC. The stoichiometric control value KSTOIC is set to a value (=1) corresponding to the stoichiometric air-fuel ratio.

On the other hand, if the answer to the question of the step 4 is affirmative (YES), i.e. if at least one of the two selective reduction catalysts 14 and 15 is activated, the process proceeds to a step 5, wherein the demanded torque TRQDRV is calculated by searching a map, not shown, according to the engine speed NE and the accelerator pedal opening AP.

Then, the process proceeds to a step 6, wherein the target equivalent ratio KCMD is calculated by searching the above-described FIG. 4 map according to the engine speed NE and the demanded torque TRQDRV.

In a step 9 following one of the above-described steps 6 to 8, it is determined whether or not, a LAF sensor activation flag F_LAFACT is equal to 1. When it is determined in a determination process, not shown, that the LAF sensor 23 is activated, the LAF sensor activation flag F_LAFACT is set to 1, and otherwise set to 0.

If the answer to the question of the step 9 is negative (NO), i.e. if the LAF sensor 23 is not activated, the process proceeds to a step 13, wherein the fuel injection amount Tout is set to the product KCMD·TiBS of the target equivalent ratio and the basic injection amount TiBS, followed by terminating the present process.

On the other hand, if the answer to the question of the step 9 is affirmative (YES), i.e. if the LAF sensor 23 is activated, the process proceeds to a step 10, wherein the exhaust gas volume Vex is calculated by searching a map, not shown, according to the engine speed NE and the intake pressure PB.

Next, the process proceeds to a step 11, wherein the air-fuel ratio correction coefficient KAF is calculated with the aforementioned control algorithm. Specifically, first, the predicted equivalent ratio PRE_KACT is calculated using the prediction algorithm expressed by the aforementioned equations (3) to (7) and the weight function values Wdi calculated by searching the FIG. 6 map. Further, the identified value $\alpha id$ is calculated using the identification algorithm expressed by the aforementioned equations (17) to (29), the reference model parameter $\alpha bs$ calculated by searching the FIG. 10 map and the weight function values Wai calculated by searching the FIG. 11 map. Then, the air-fuel ratio correction coefficient KAF is finally calculated using the calculated predicted equivalent ratio PRE_KACT and the identified value $\alpha id$, by the aforementioned equations (34) and (35).

In a step 12 following the step 11, the fuel injection amount Tout is set to the product KAF·TiBS of the air-fuel ratio correction coefficient and the basic injection amount, followed by terminating the present process.

The control apparatus 1 according to the present embodiment calculates the fuel injection amount Tout by the above-described air-fuel ratio control process, and although not shown, calculates fuel injection timing according to the fuel injection amount Tout and the engine speed NE. Further, the control apparatus 1 drives the fuel injection valves 4 by a control input signal generated based on the fuel injection amount Tout and the fuel injection timing, to thereby control the air-fuel ratio of the mixture.

Figure 21:
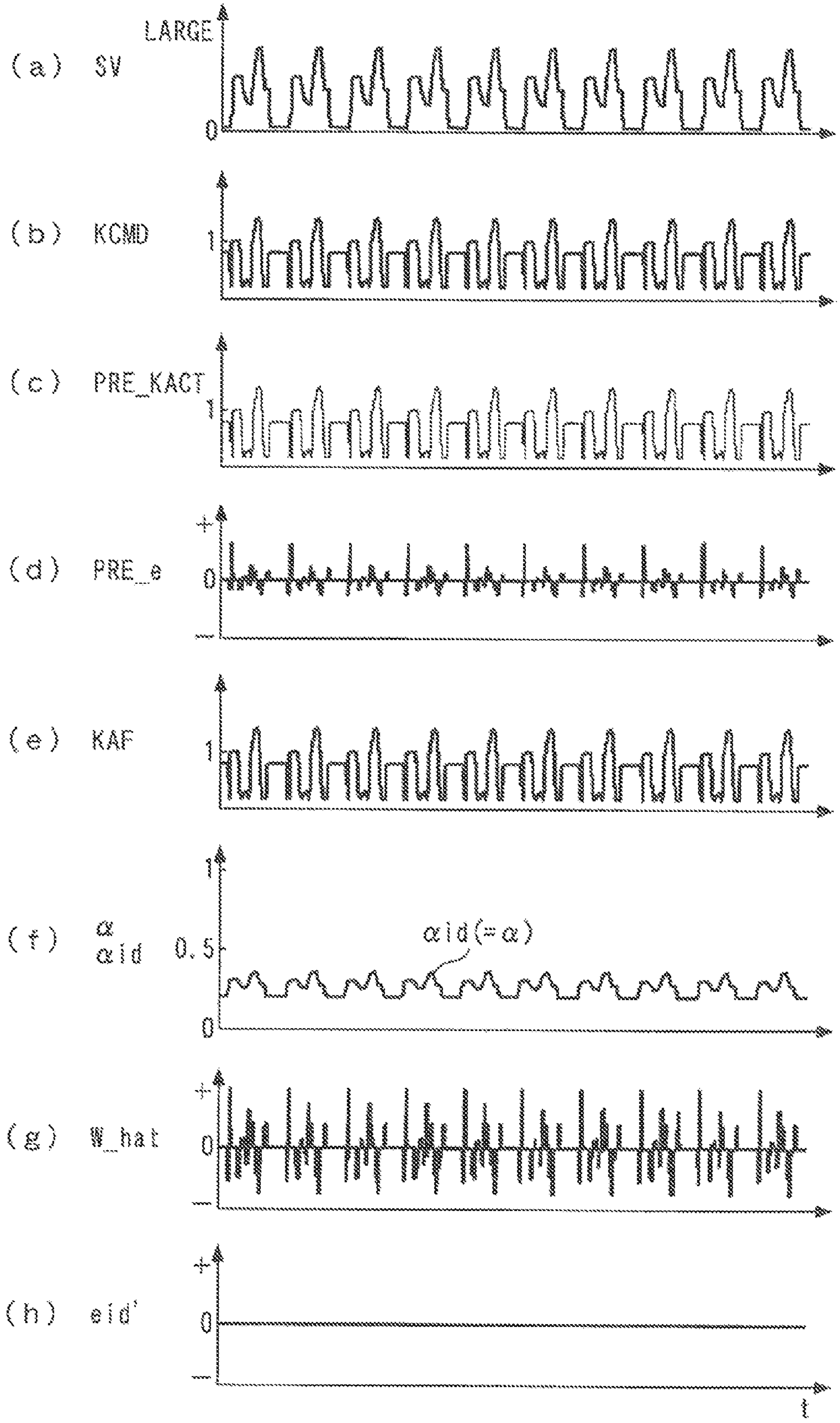
FIG. 21 is a timing diagram of an example of results of a simulation of air-fuel ratio control performed by the control apparatus according to the first embodiment, under simulation conditions that there is no modeling error.
Figure 22:
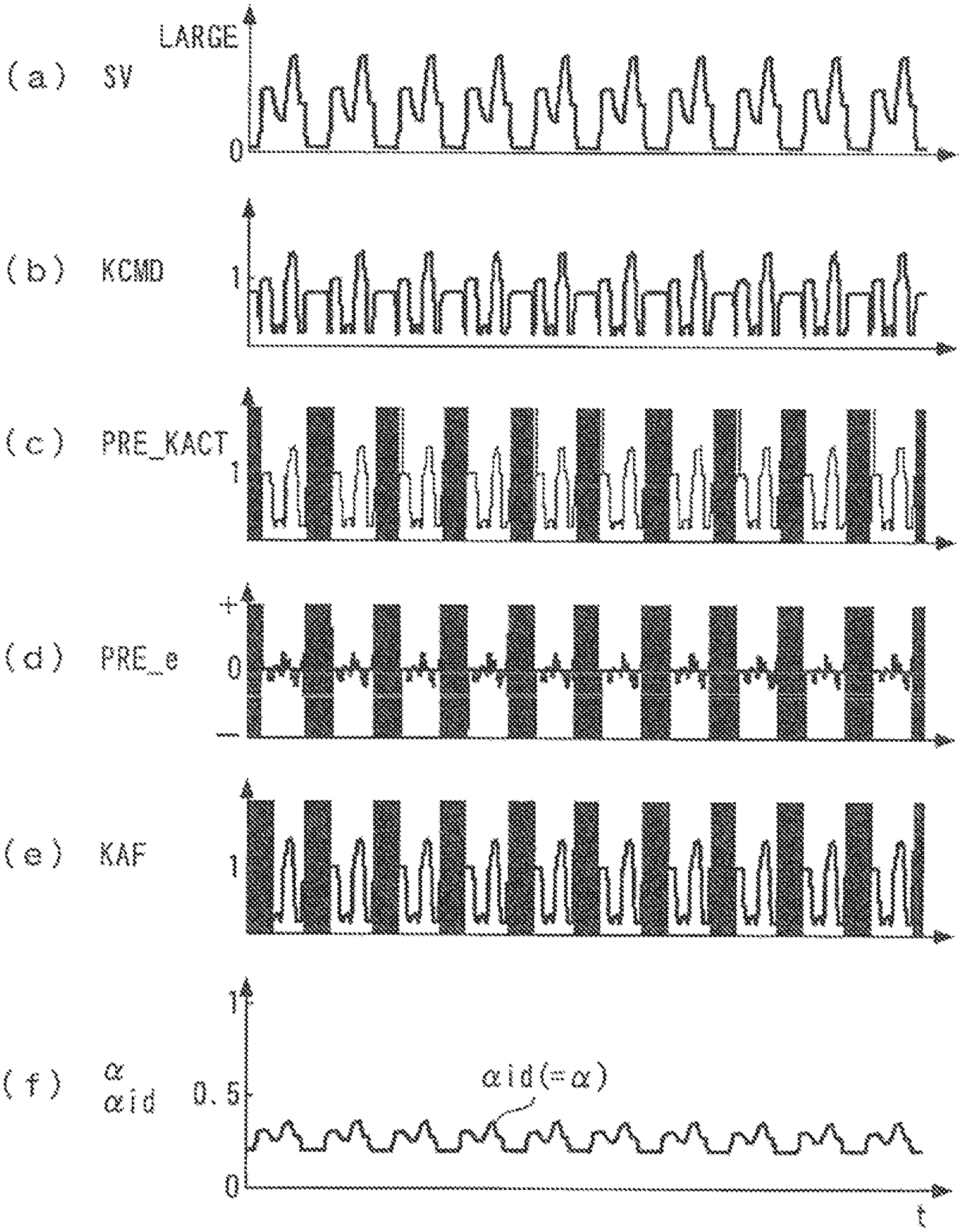
FIG. 22 is a timing diagram, for comparison, of results of a simulation in a case where calculations of an identified value αid and a predicted equivalent ratio PRE_KACT by the control apparatus are stopped under the simulation conditions that there is no modeling error.
Figure 23:
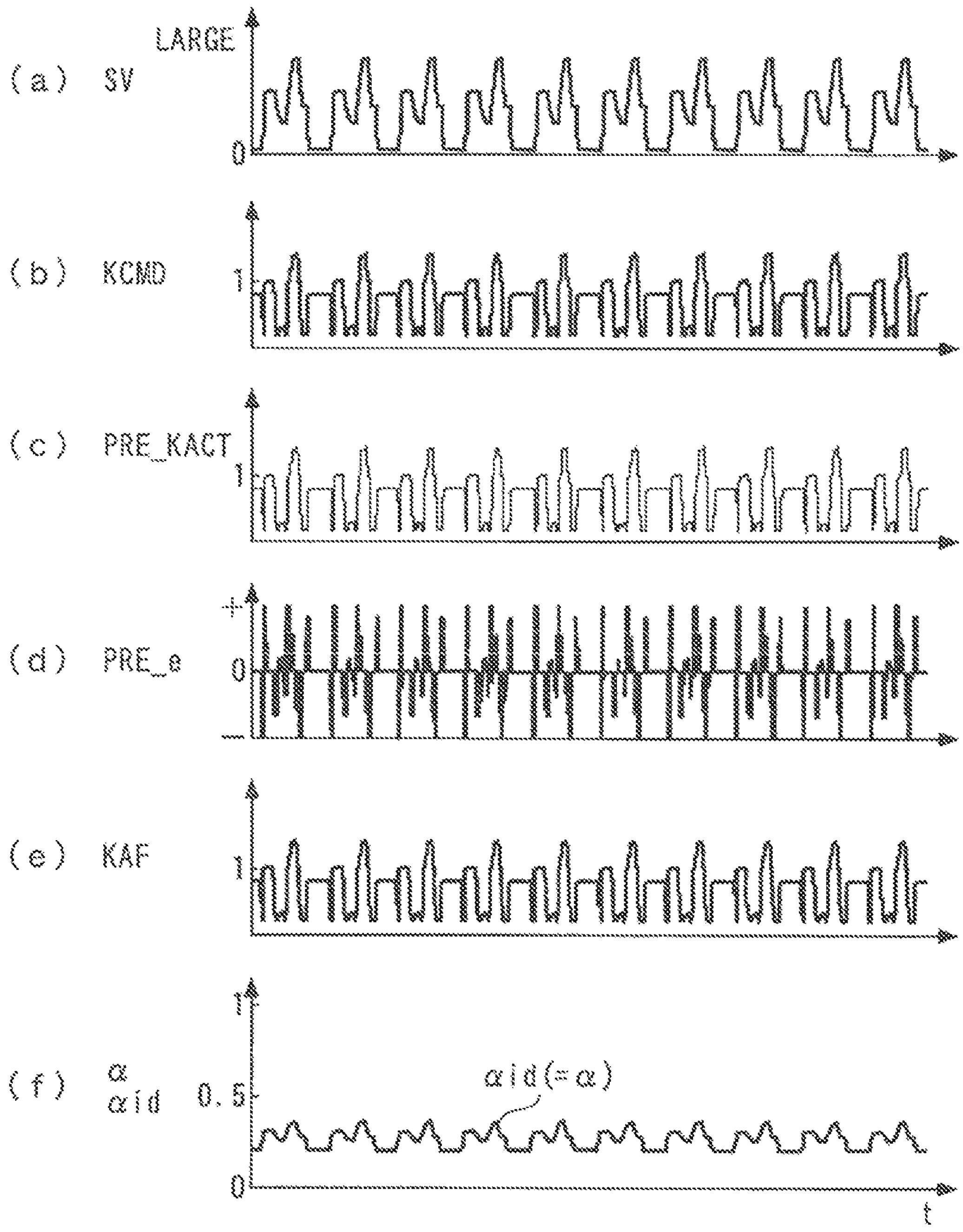
FIG. 23 is a timing diagram, for comparison, of results of a simulation in a case where the calculations of the identified value αid and the predicted equivalent ratio PRE_KACT by the control apparatus are stopped and a value of a sensitivity-setting parameter β is changed, under the simulation conditions that there is no modeling error.

Next, results of simulations of the air-fuel ratio control which is carried out by the control apparatus 1 according to the present embodiment (hereinafter referred to as "control results") will be described with reference to FIGS. 21 to 27. First, a description is given of FIGS. 21 to 23. Each of FIGS. 21 to 23 shows control results in a case where a simulation condition that there is no modeling error in the control target model expressed by the equation (2) (specifically, that $\alpha=\alpha bs$ holds) is set. FIG. 21 shows an example of the results of the control performed by the control apparatus 1 according to the present embodiment.

Further, FIG. 22 shows, for comparison with the FIG. 21 example, an example of the control results in a case where in the control apparatus 1, calculations by the state predictor 40 and the onboard identifier 60 are omitted, specifically, PRE_KACT(k)=KACT(k) and a id(k)=αbs(k) are set, respectively, as simulation conditions (hereinafter referred to as "Comparative Example 1"). Furthermore, FIG. 23 shows, for comparison with the FIG. 21 example, an example of the control results in a case where in the control apparatus 1, calculations by the state predictor 40 and the onboard identifier 60 are omitted, and a value ⅙ times as large as a set value of the present embodiment is used as the sensitivity-setting parameter β (hereinafter referred to as "Comparative Example 2").

First, referring to Comparative Example 1 shown in FIG. 22, it is understood that when the exhaust gas volume Vex is small, the predicted equivalent ratio PRE_KACT, i.e. the detected equivalent ratio KACT diverges, and accordingly the predicted follow-up error PRE_e and the air-fuel ratio correction coefficient KAF also diverge. That is, it is understood that when the controlled object with the dead time is controlled by using only the frequency shaping controller 130, robustness specified by the complementary sensitivity function Td cannot be properly maintained, and particularly, under a condition that the exhaust gas volume Vex is small, which will increase the dead time d, the air-fuel ratio correction coefficient KAF as a control input diverges.

Next, referring to Comparative Example 2 shown in FIG. 23, it is understood that in the case of Comparative Example 2, compared with Comparative Example 1 described above, the stability and control accuracy of the control system are improved. This is because the sensitivity-setting parameter β of the sensitivity function Sd is set to a value ⅙ times as large as the set value of the sensitivity-setting parameter β in Comparative Example 1, to thereby lower the feedback gain, in other words, to thereby reduce the ability of suppressing a disturbance. In this case, the sensitivity-setting parameter β is set to a limit value within which it is possible to maintain the stability of the control system, by try and error. Therefore, it is impossible to realize the object of the present invention that the ability of suppressing a disturbance is directly specified by setting the sensitivity function Sd such that the aforementioned control condition ϕ is satisfied.

On the other hand, in the control results of the present embodiment shown FIG. 21, it is understood that under the condition that there is no modeling error, the stability and control accuracy of the control are improved compared with Comparative Examples 1 and 2, by the algorithms for the state predictor 40, the onboard identifier 60, and the frequency shaping controller 130.

Figure 24:
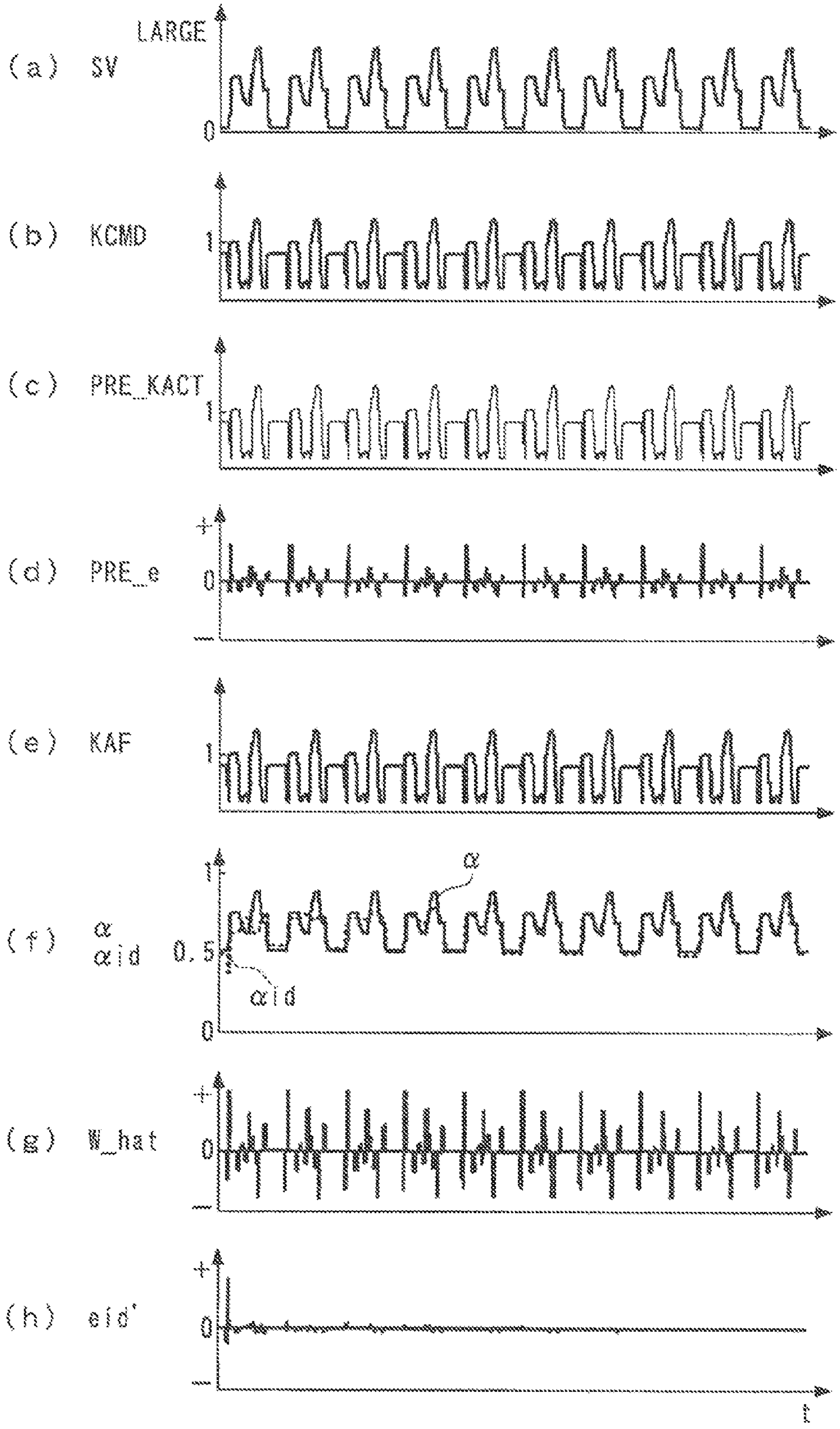
FIG. 24 is a timing diagram of an example of results of a simulation of the air-fuel ratio control performed by the control apparatus according to the first embodiment, under simulation conditions that there is a modeling error.

Next, a description will be given of FIGS. 24 to 27. Each of FIGS. 24 to 27 shows control results in a case where a simulation condition that there is a modeling error in the control target model expressed by the equation (2) (specifically, α=2·αbs is set). FIG. 24 shows an example of the results of the control performed by the control apparatus 1 according to the present embodiment.

Figure 25:
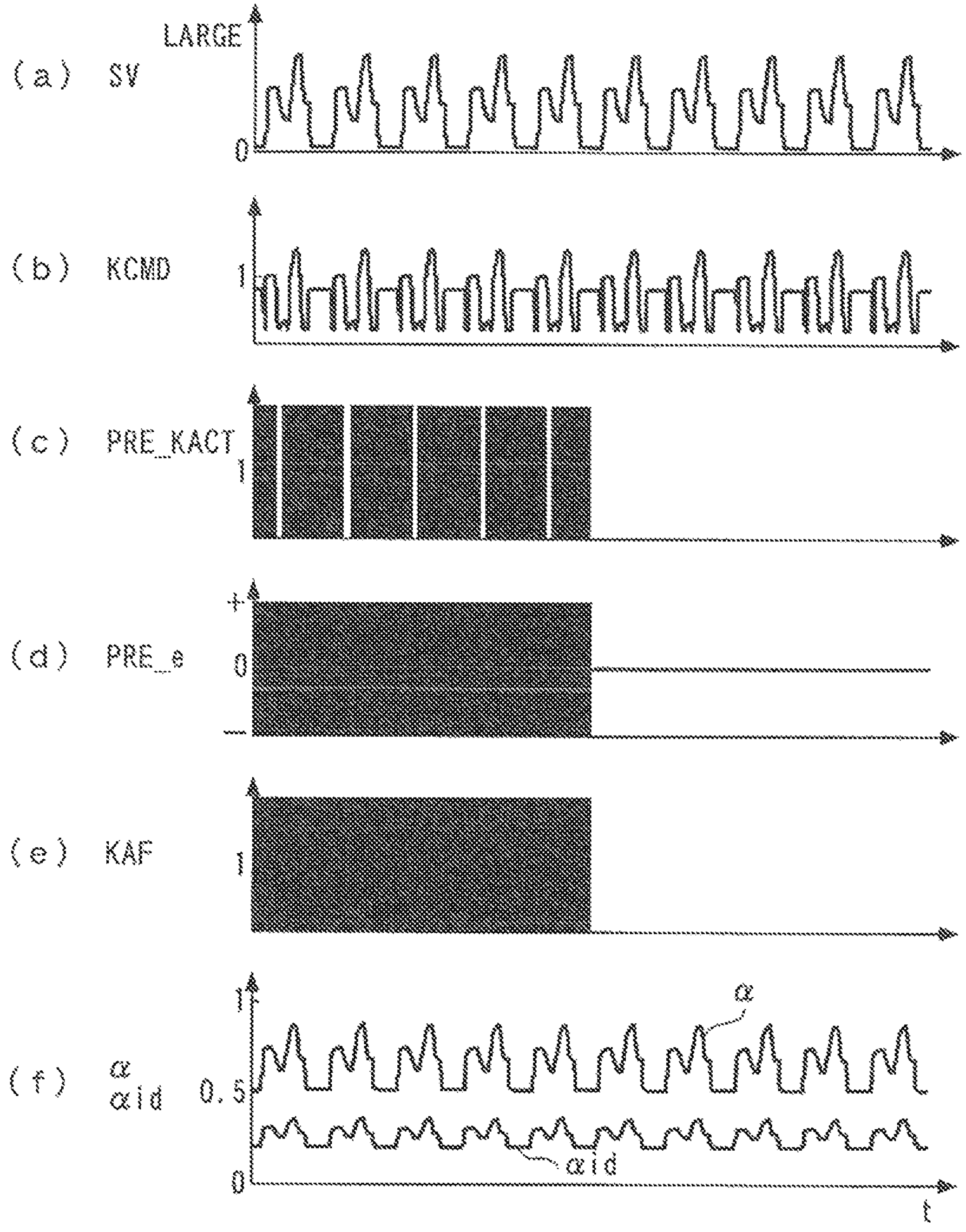
FIG. 25 is a timing diagram, for comparison, of results of a simulation in a case where calculations of the identified value αid and the predicted equivalent ratio PRE_KACT by the control apparatus are stopped under the simulation conditions that there is a modeling error.
Figure 26:
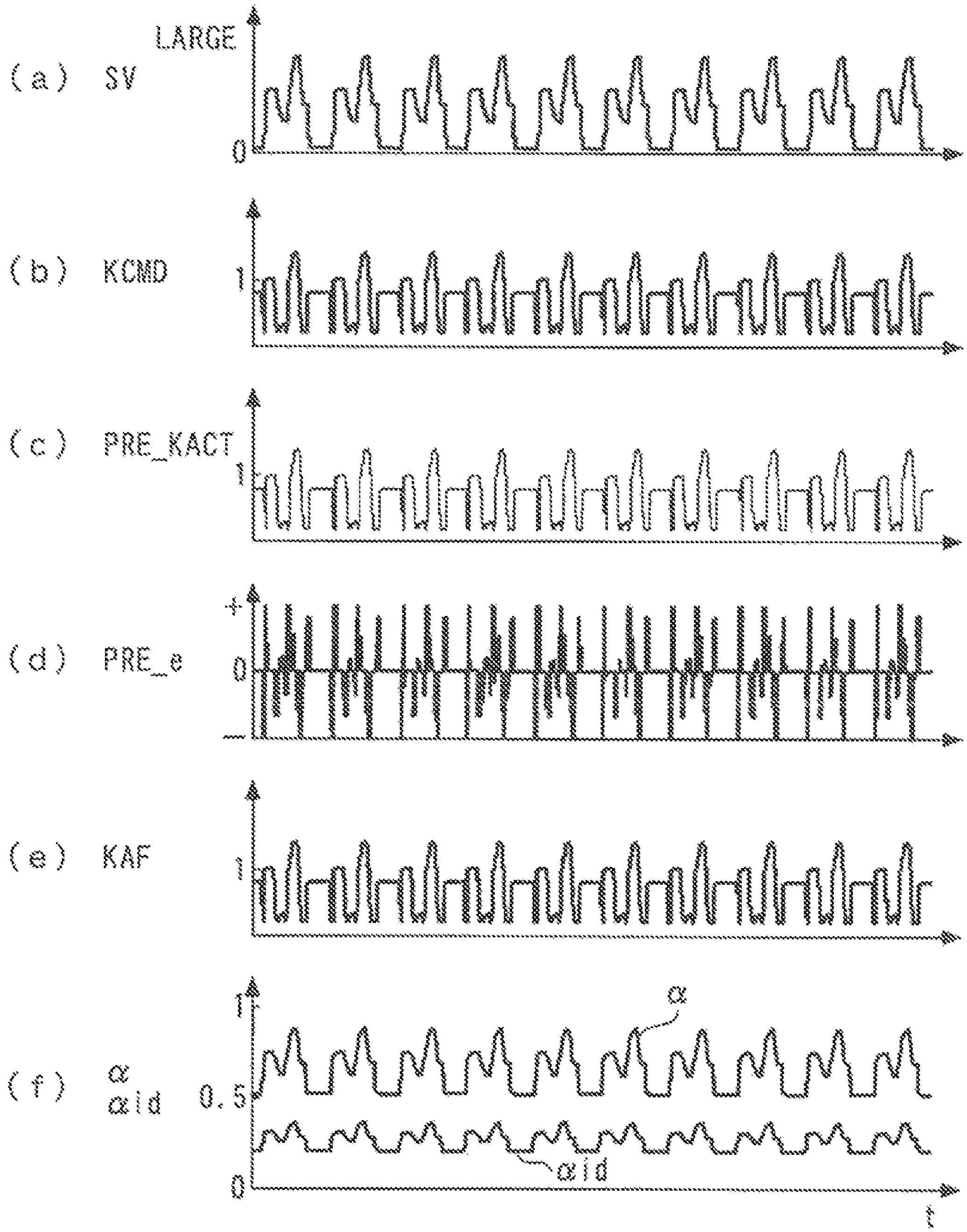
FIG. 26 is a timing diagram, for comparison, of results of a simulation in a case where the calculations of the identified value αid and the predicted equivalent ratio PRE_KACT by the control apparatus are stopped and the value of the sensitivity-setting parameter β is changed, under the simulation conditions that there is a modeling error.

Further, FIG. 25 shows, for comparison with the FIG. 21 example, an example of the control results in a case where in the control apparatus 1, calculations by the state predictor 40 and the onboard identifier 60 are omitted as a simulation condition (hereinafter referred to as "Comparative Example 3"). Furthermore, FIG. 26 shows, for comparison with the FIG. 21 example, an example of the control results in a case where in the control apparatus 1, calculations by the state predictor 40 and the onboard identifier 60 are omitted, and a value ⅙ times as large as the set value of the present embodiment is used as the sensitivity-setting parameter β (hereinafter referred to as "Comparative Example 4"). In addition, FIG. 27 shows, for comparison with the FIG. 21 example, an example of the control results in a case where in the control apparatus 1, only calculation by the onboard identifier 60 is omitted, i.e. αid(k)=αbs(k) is set (hereinafter referred to as "Comparative Example 5").

First, referring to Comparative Example 3 shown in FIG. 25, it is understood that in the case of Comparative Example 3, under the simulation condition that there is a modeling error in the control target model, the stability of the control system is impaired not only by reduction of the margin of the stability of the control system due to the dead time but also by the adverse influence of the modeling error, and all the parameters, including the air-fuel ratio correction coefficient KAF, diverge in a whole range of the exhaust gas volume Vex. That is, it is understood that when the controlled object with the dead time is controlled by using only the frequency shaping controller 130, the control stability and the control accuracy are markedly reduced under the simulation condition that there is a modeling error.

Next, referring to Comparative Example 4 shown in FIG. 26, it is understood that in the case of Comparative Example 4, the diverged states of the parameters as occurring in Comparative Example 3, described above, does not occur, and the stability of the control system is improved compared with Comparative Example 3. This improvement is caused by the set value of the sensitivity-setting parameter 8. In the case of Comparative Example 4, however, it is understood that although the stability of the control system is improved compared with Comparative Example 3, there occurs a state where the value of the predicted follow-up error PRE_e temporarily becomes too large, which results in the degraded control accuracy of the control system. Moreover, as described above, since the sensitivity-setting parameter β is set to the value ⅙ times as large as the set value of the present embodiment, it is impossible to realize the object of the present invention that the ability of suppressing a disturbance is directly specified by setting the sensitivity function Sd such that the control condition ϕ is satisfied.

Figure 27:
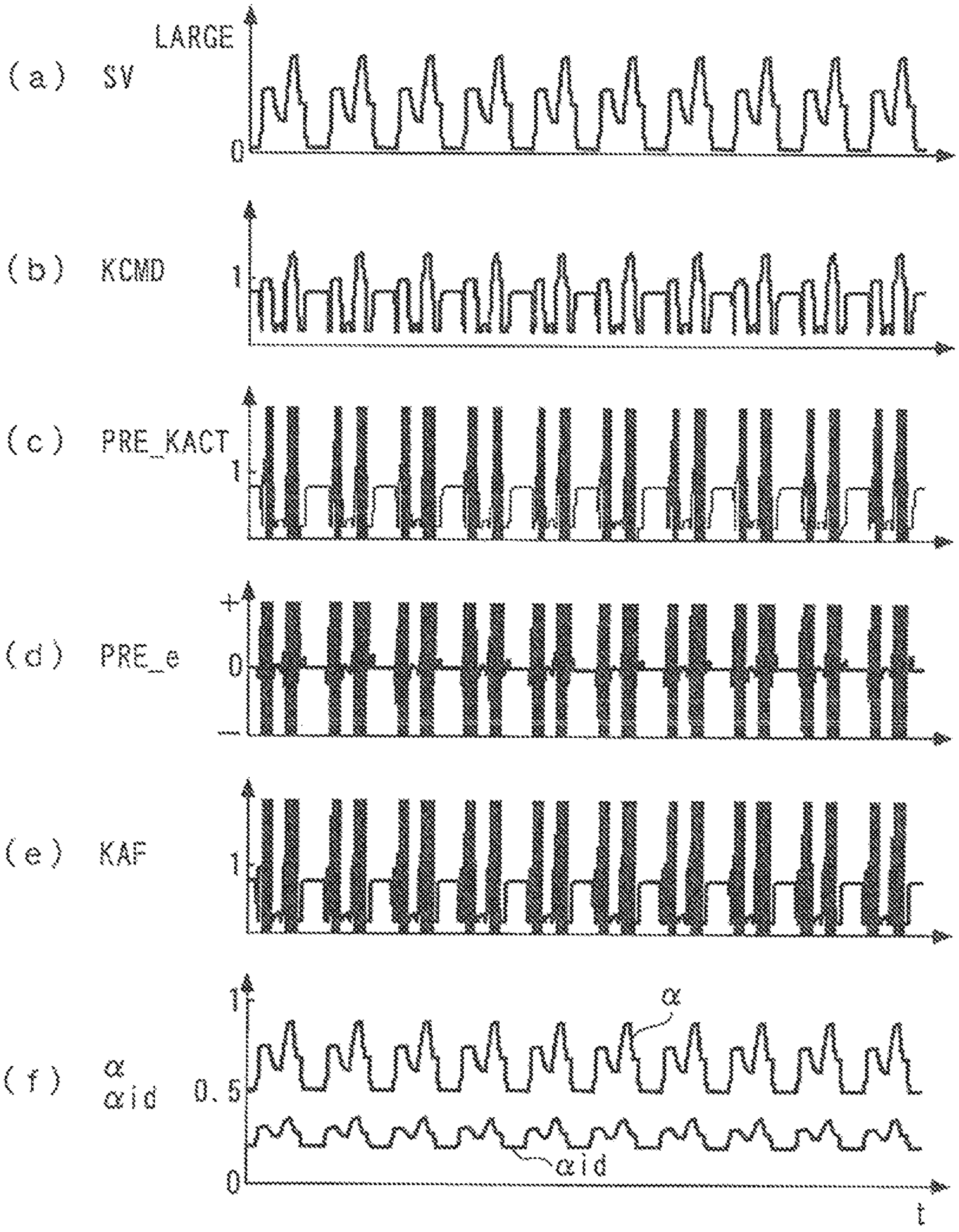
FIG. 27 is a timing diagram, for comparison, of results of a simulation in a case where only the calculation of the identified value αid by the control apparatus is stopped under the simulation conditions that there is a modeling error.

Further, referring to Comparative Example 5 shown in FIG. 27, it is understood that in the case of Comparative Example 5, the stability of the control system is improved compared with Comparative Example 3, described above. This is because even when the dead time d sequentially changes with changes in the exhaust gas volume Vex, the state predictor 40 calculates the predicted equivalent ratio PRE_KACT while causing such a change in the dead time d to be reflected on the predicted equivalent ratio, so that it is possible to properly compensate for the adverse influence of the change in the dead time d, thereby making it possible to improve the stability of the control system. However, it is understood that also in the case of Comparative Example 5, the parameters, such as the air-fuel ratio correction coefficient KAF, diverge due to an increase in the modeling error in a range where the exhaust gas volume Vex is large.

On the other hand, in the case of control results of the present embodiment shown in FIG. 24, it is understood that even under the simulation condition that there is a modeling error, the stability and control accuracy of the control system are improved compared with Comparative Examples 3 to 5, by the algorithms for the state predictor 40, the onboard identifier 60, and the frequency shaping controller 130. For example, it is understood that the predicted follow-up error PRE_e is held small by the prediction algorithm for the state predictor 40, and the identified value αid is caused to converge to the model parameter α with the lapse of time, by the identification algorithm for the onboard identifier 60.

As described above, according to the control apparatus 1 of the present embodiment, in the state predictor 40, the zeroth to third predicted values PRE_KACT__0 to PRE_KACT__3 are calculated as values of the detected equivalent ratio KACT to be detected at respective times when the dead times d=0 to 3 elapse, by using the control target model (equation (2)) defining the relationship between the detected equivalent ratio KACT and the air-fuel ratio correction coefficient KAF, and the four weight function values Wd1 to Wd4 are calculated according to the exhaust gas volume Vex. Then, the predicted equivalent ratio PRE_KACT is calculated as the total sum of the products of the weight function values Wdi and the predicted values PRE_KACT__4−i (i=1 to 4). This makes it possible to calculate the predicted equivalent ratio PRE_KACT as a value obtained by sequentially combining the predicted values PRE_KACT__4−i. Thus, even when the dead time d changes with a change in the exhaust gas volume Vex, it is possible to accurately calculate the predicted equivalent ratio PRE_KACT such that it changes steplessly and smoothly, while compensating for such a change in the dead time d. Particularly even when the dead time d suddenly changes with a sudden change in the exhaust gas volume Vex, it is possible to calculate the predicted equivalent ratio PRE_KACT steplessly and smoothly while properly compensating for the sudden change in the dead time d.

Further, in the onboard identifier 60, the identified value αid is calculated with the aforementioned identification algorithm, and hence it is possible to calculate the identified value αid while satisfying the above-described identification conditions 1 and 2. Specifically, since the identified value αid is calculated such that the combined signal value W_act and the estimated combined signal value W_hat become equal to each other, it is possible to calculate the identified value αid while satisfying the identification condition 1, i.e. the restraint condition. Further, the modified control input KAF_mod is calculated as the total sum of products obtained by multiplying the air-fuel ratio correction coefficients KAF(k), KAF(k−1), KAF(k−2), and KAF(k−3) associated with respective times earlier by the dead times d=0 to 3, by the four weight function values Wd4 to Wd1, respectively, so that even when the dead time d sequentially changes with changes in the exhaust gas volume Vex, it is possible to accurately calculate the modified control input KAF_mod while properly compensating for such changes in the dead time d. Particularly even when the dead time d suddenly changes with a sudden change in the exhaust gas volume Vex, it is possible to calculate the modified control input KAF_mod such that it changes steplessly and smoothly, while properly compensating for the sudden change in the dead time d.

Furthermore, the identified value αid is identified onboard with the identification algorithm expressed by the equations (17) to (29) which are derived using the model of the equation (30) defining the relationship between the modified control input KAF_mod calculated as above and the detected equivalent ratio KACT. More specifically, the identified value a id is calculated using the two types of weight function values WDi and Wai, and hence even when the dead time d and the delay characteristic change according to a change in the exhaust gas volume Vex, it is possible to accurately identify the identified value αid, while suppressing adverse influences of the changes in the dead time d and the delay characteristic. Particularly even when the dead time d and the delay characteristic suddenly change with a sudden change in the exhaust gas volume Vex, it is possible to calculate the identified value αid such that the identified value αid changes steplessly and smoothly, while properly compensating for the sudden changes in the dead time d and the delay characteristic. Then, since the air-fuel ratio correction coefficient KAF is calculated as a control input using the identified value αid calculated as above, it is possible to make dramatic improvements in the controllability of the air-fuel ratio control and the robustness of the air-fuel ratio control against the adverse influences of variation between individual products of the engine and aging.

Moreover, in the frequency shaping controller 130, as described above, the air-fuel ratio correction coefficient KAF is calculated using the equations (34) and (35) derived based on the sensitivity function Sd set such that the predetermined frequency characteristic can be obtained. This makes it possible to calculate the air-fuel ratio correction coefficient KAF while satisfying the above-mentioned control condition ϕ. In addition, since the above-described identified value αid is used as a model parameter of the control target model, it is possible to directly specify (set) the disturbance suppression characteristic and the robustness of the control apparatus 1 on a frequency axis while properly compensating for changes in the dead time d and the delay characteristic. This makes it possible to make a dramatic improvement in the ability of suppressing a disturbance and the robustness in a frequency range within which a change in the detected equivalent ratio KACT due to the disturbance is desired to be suppressed. Further, since a feedback control algorithm based on the difference between the predicted equivalent ratio PRE_KACT and the target equivalent ratio KCMD is used as a calculation algorithm for calculating the air-fuel ratio correction coefficient KAF, it is possible to compensate for the dead time d to thereby maintain a high feedback gain, which makes it possible to cause the detected equivalent ratio KACT to follow up the target equivalent ratio KCMD while ensuring high accuracy and high response.

Although in the first embodiment, as the weight function values, there are used weight function values which are set such that the sum of values of the weight function values Wdi associated with each of the exhaust gas volume Vex in the overlapping ranges becomes equal to the maximum value of 1 of each of the weight function values Wdi, by way of example, the weight function values of the present invention are not limited to these, but they are only required to be set such that the absolute value of the total sum of the weight function values associated with each value of the reference parameter in the overlapping ranges becomes equal to a predetermined value. For example, there may be used weight function values which are set such that the absolute value of the total sum of the weight function values associated with each value of a reference parameter in overlapping ranges thereof becomes equal to the maximum value of the absolute values of the weight function values. More specifically, values arranged line-symmetrically to the set values of the weight function values Wdi in FIG. 6 with respect to the X axis, i.e. negative values set opposite to those set values in FIG. 6, may be used as the weight function values. In this case, values made negative may be used as values to be multiplied by the four weight function values, that is, the four predicted values PRE_KACT__4−i or the four air-fuel ratio correction coefficients KAF(k−4+i).

Further, the onboard identifier 60 according to the first embodiment may be configured such that the identified value αid is calculated with an identification algorithm expressed by the following equations (54) to (67) in place of the identification algorithm expressed by the equations (17) to (29).

$$\text{KAF\_mod}(k)=\sum_{i=1}^{4}Wdi(k)\cdot KAF(k-4+i) \tag{54}$$

$$\text{W\_act}(k)=KACT(k)-KACT(k-1) \tag{55}$$

$$\zeta'(k-1)=\text{KAF\_mod}(k-1)-KACT(k-1) \tag{56}$$

$$\text{W\_hat}(k)-\alpha id(k-1)\cdot\zeta'(k-1) \tag{57}$$

$$eid'(k)=\text{W\_act}(k)-\text{W\_hat}(k) \tag{58}$$

$$P'(k)=\frac{1}{\lambda1}\cdot\left(1-\frac{\lambda2\cdot P'(k-1)\cdot\zeta'(k-1)}{\lambda1+\lambda2\cdot P'(k-1)\cdot\zeta'(k-1)}\right)P'(k-1) \tag{59}$$

$$Kp'(k)=\frac{P'(k)\cdot\zeta'(k-1)}{1+P'(k)\cdot\zeta'(k-1)} \tag{60}$$

$$P'(0)=P0 \tag{61}$$

When $\alpha\_H<\alpha id(k-1)$ holds, (62)
$H(k)=\eta'$

When $\alpha\_L\leqq\alpha id(k-1)\leqq\alpha\_H$ holds, (63)
$H(k)=1$

When $\alpha id(k-1)<\alpha\_L$ holds, (64)
$H(k)=\eta'$ $$\alpha bs'(k)=\alpha bs(k)\cdot K\alpha bs(k) \tag{65}$$

$$d\alpha ijh'(k)=H(k)\cdot d\alpha ijh'(k-1)+Wai(k)\cdot Wanj(k)\cdot Waah(k)\cdot Kp'(k)\cdot eid'(k)\quad(i=1\sim4,\ j=1\sim4,\ h=1\sim4) \tag{66}$$

$$\alpha id(k)=\alpha bs'(k)+\sum_{i=1}^{4}\sum_{j=1}^{4}\sum_{h=1}^{4}Wai(k)\cdot Wanj(k)\cdot Waah(k)\cdot d\alpha ijh'(k) \tag{67}$$

As is clear from the comparison between the above equations (54) to (67) and the aforementioned equations (17) to (29), the equations (54) to (64) are the same as the equations (17) to (27), and only the equations (65) to (67) are different. Therefore, the following description will be given only of the equations (65) to (67). First, the above-described equation (65) is used for calculating a reference model parameter αbs'. That is, the reference model parameter αbs' is calculated by correcting the above-mentioned reference model parameter αbs with a correction coefficient Kαbs.

Figure 28:
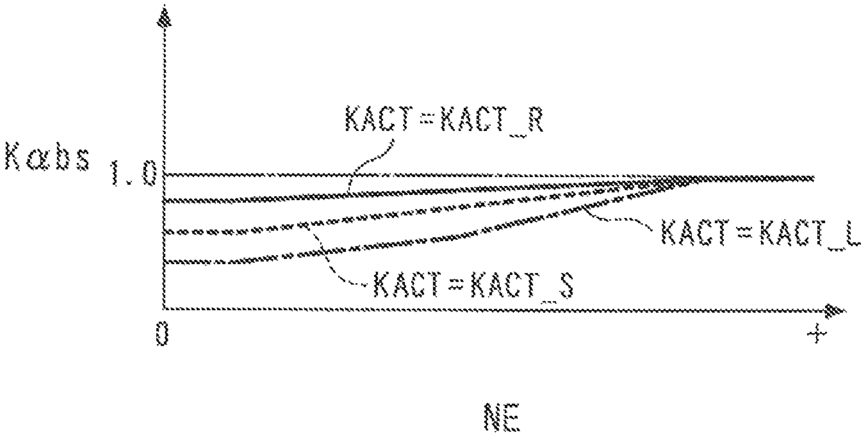
FIG. 28 is a diagram showing an example of a map for use in calculating a correction coefficient Kαbs.

The correction coefficient Kαbs is calculated by searching a map shown in FIG. 28 according to the engine speed NE and the detected equivalent ratio KACT. In FIG. 28, three values KACT_R, KACT_S, and KACT_L are all predetermined values of the detected equivalent ratio KACT, and are set such that KACT_S=1 and KACT_L<KACT_S<KACT_R hold.

In this map, the correction coefficient Kαbs is set to a value not larger than 1, and is set to a smaller value as the engine speed NE is lower. This is because in a low-rotational speed region, even when the exhaust gas volume Vex is the same, a periodic fluctuation in exhaust gas components becomes larger as an execution time period for one combustion cycle becomes longer, and this increases response delay between the air-fuel ratio correction coefficient KAF and the detected equivalent ratio KACT, and to cope with this, the correction coefficient Kαbs is configured as mentioned above.

Further, the correction coefficient Kαbs is set to a larger value as the detected equivalent ratio KACT becomes richer. This is because when the detected equivalent ratio KACT is larger and the concentration of exhaust gases is higher, the amount of unburned components of exhaust gases becomes larger and the response of a detection element of the LAF sensor 23 becomes higher, whereby the response delay between the air-fuel ratio correction coefficient KAF and the detected equivalent ratio KACT becomes smaller, and to cope with this, the correction coefficient Kαbs is configured as mentioned above.

Figure 29:
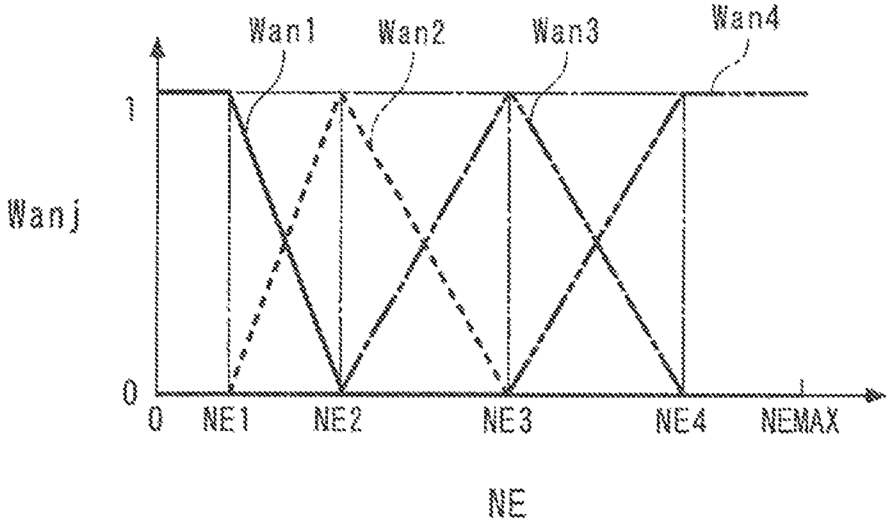
FIG. 29 is a diagram showing an example of a map for use in calculating a weight function value Wanj.

Next, a modification terms dαijh' is calculated by the aforementioned equation (66), and then the identified value αid is finally calculated by the aforementioned equation (67). In the equation (66), Wanj and Waah represent weight function values. The weight function values Wanj (j=1 to 4) are calculated by searching a map shown in FIG. 29 according to the engine speed NE. In FIG. 29, NE1 to NE4 and NEMAX represent predetermined values of the engine speed NE, and are set such that 0<NE1<NE2<NE3<NE4<NEMAX holds. The predetermined value NEMAX is set to a maximum allowable engine speed.

As shown in FIG. 29, when a range within which the engine speed NE can change is divided into four ranges of 0≤NE≤NE2, NE1≤NE≤NE3, NE2≤NE≤NE4, and NE3≤NE≤NEMAX, the four weight function values Wan1 to Wan4 are set such that they are associated with the above four ranges, respectively, and are set to positive values not larger than 1 in the ranges associated therewith, whereas in ranges other than the associated ranges, they are set to 0.

Specifically, the weight function value Wan1 is set, in the range associated therewith (0≤NE≤NE2), to a smaller positive value as the engine speed NE is larger with a maximum value of 1 when NE≤NE1 holds, while in the other ranges, it is set to 0. The weight function value Wan2 is set, in the range associated therewith (NE1≤NE≤NE3), to such a value as changes along the inclined sides of a triangle with a maximum value of 1 when NE=NE2 holds, while in the other ranges, it is set to 0.

The weight function value Wan3 is set, in the range associated therewith (NE2≤NE≤NE4), to such a value as changes along the inclined sides of a triangle with a maximum value of 1 when NE=NE3 holds, while in the other ranges, it is set to 0. The weight function value Wan4 is set, in the range associated therewith (NE3≤NE≤NEMAX), to a larger positive value as the engine speed NE is larger with a maximum value of 1 when NE4≤NE holds, while in the other ranges, it is set to 0.

The four ranges with which the respective four weight function values Wanj (j=1 to 4) are associated are set such that adjacent ones thereof overlap each other, as described above, and the sum of values of the weight function values Wanj associated with each value of the engine speed NE in the overlapping ranges becomes equal to the maximum value of 1 of each of the weight function values Wani. As described above, the weight function values Wanj calculated according to the engine speed NE is used for the same reason given in the description of the calculation of the correction coefficient Kαbs.

Figure 30:
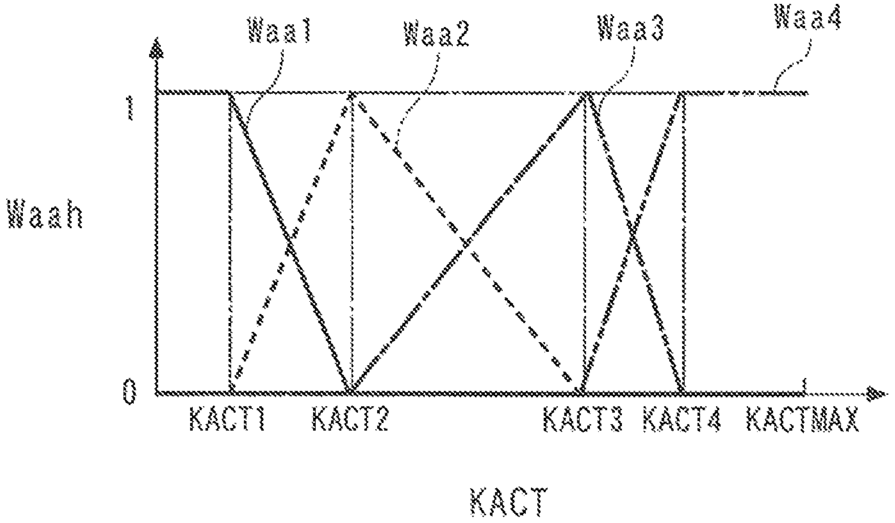
FIG. 30 is a diagram showing an example of a map for use in calculating a weight function value Waah.

Further, the weight function values Waah (h=1 to 4) expressed by the aforementioned equation (66) are each calculated by searching a map shown in FIG. 30 according to the detected equivalent ratio KACT. In FIG. 30, KACT1 to KACT4 and KACTMAX represent predetermined values of the detected equivalent ratio KACT, and are set such that 0<KACT1<KACT2<KACT3<KACT4<KACTMAX holds. Furthermore, the predetermined value KACTMAX is set to the maximum value of the detected equivalent ratio KACT in a range within which the detected equivalent ratio KACT can change during operation of the engine 3. In other words, the detected equivalent ratio KACT has a characteristic that it changes in the area of 0 to KACTMAX during operation of the engine 3.

As shown in FIG. 30, when the range within which the detected equivalent ratio KACT can change is divided into four ranges of KACT≤KACT2, KACT1≤KACT≤KACT3, KACT2≤KACT≤KACT4, and KACT3≤KACT≤KACTMAX, the four weight function values Waa1 to Waa4 are set such that they are associated with the above four ranges, respectively, and are set to positive values not larger than 1 in the ranges associated therewith, whereas in ranges other than the associated ranges, they are set to 0.

Specifically, the weight function value Waa1 is set, in the range associated therewith (KACT≤KACT2), to a smaller positive value as the detected equivalent ratio KACT is larger with a maximum value of 1 when KACT≤KACT1 holds, while in the other ranges, it is set to 0. The weight function value Waa1 is set, in the range associated therewith (KACT1≤KACT≤KACT3), to such a value as changes along the inclined sides of a triangle with a maximum value of 1 when KACT=KACT2 holds, while in the other ranges, it is set to 0.

The weight function value Waa3 is set, in the range associated therewith (KACT2≤KACT≤KACT4), to such a value as changes along the inclined sides of a triangle with a maximum value of 1 when KACT=KACT3 holds, while in the other ranges, it is set to 0. The weight function value Waa4 is set, in the range associated therewith (KACT3≤KACT≤KACTMAX), to a larger positive value as the detected equivalent ratio KACT is larger with a maximum value of 1 when KACT4≤KACT holds, while in the other ranges, it is set to 0.

The four ranges with which the respective four weight function values Waah (h=1 to 4) are associated are set such that adjacent ones thereof overlap each other, as described above, and the sum of the values of the weight function values Waah associated with each value of the detected equivalent ratio KACT in the overlapping ranges becomes equal to the maximum value of 1 of each of the weight function values Waah. As described above, the weight function values Waah calculated according to the detected equivalent ratio KACT is used for the same reason given in the description of the calculation of the correction coefficient Kαbs.

When the identified value αid is calculated with the above-described identification algorithm, it is possible to calculate the identified value αid while causing the changes in the dead time d and the delay characteristic occurring not only with the change in the exhaust gas volume Vex but also with the changes in the engine speed NE and the detected equivalent ratio KACT to be reflected thereon. More specifically, it is possible to calculate the identified value αid while compensating for the changes in the dead time d and the delay characteristic caused by the changes in the three parameters Vex, NE and KACT, thereby making it possible to further improve the accuracy of identification (i.e. calculation) of the identified value αid. This makes it possible to further improve the controllability and the robustness of the air-fuel ratio control than when the onboard identifier 60 according to the first embodiment is used.

Next, a control apparatus 1A according to a second embodiment of the present invention will be described with reference to FIG. 31. Similarly to the above-described control apparatus 1, the control apparatus 1A controls the air-fuel ratio by calculating the air-fuel ratio correction coefficient KAF, etc. In the second embodiment, in place of the equation (2) used in the first embodiment, the following equation (68) is used as a control target model.

$$KACT(k+1)=\delta\cdot KACT(k)+\alpha\cdot KAF(k-d) \tag{68}$$

In the above equation (68), δ represents a model parameter. This equation (68) is obtained by replacing "1−α" of the equation (2) with "δ", and corresponds to an equation obtained by removing the restraint condition between the two model parameters 1−α and α.

Figure 31:
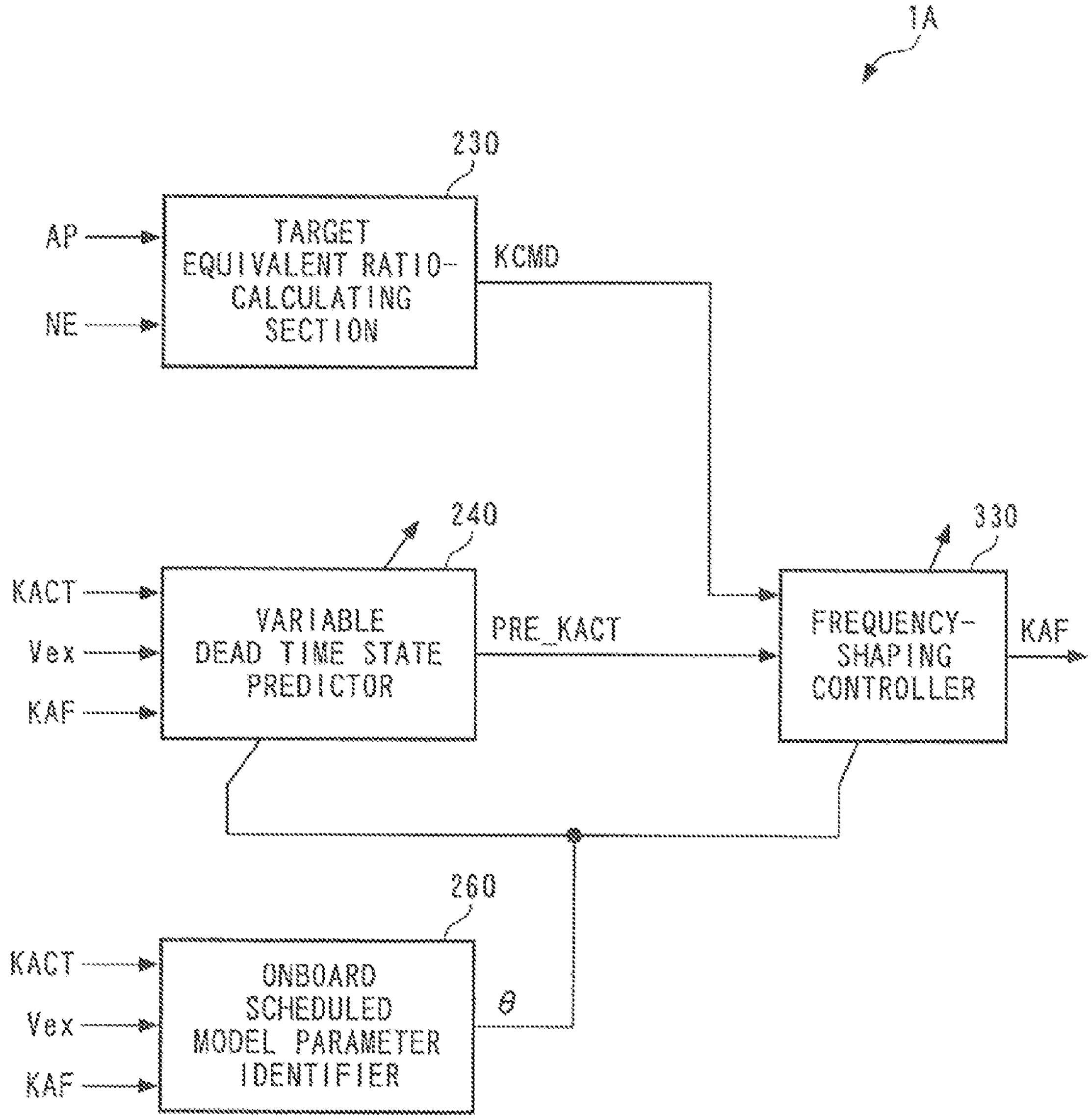
FIG. 31 is a block diagram of a control apparatus according to a second embodiment of the invention.

As shown in FIG. 31, the control apparatus 1A includes a target equivalent ratio-calculating section 230, a variable dead time state predictor (hereinafter referred to as the "state predictor") 240, an onboard scheduled model parameter identifier (hereinafter referred to as the "onboard identifier") 260, and a frequency shaping controller 330, all of which are implemented by the ECU 2.

The target equivalent ratio-calculating section 230 calculates a target equivalent ratio KCMD by the same method as used by the target equivalent ratio-calculating section 30. Further, the state predictor 240 calculates a predicted equivalent ratio PRE_KACT with a prediction algorithm, described hereinafter, and the onboard identifier 260 calculates a model parameter vector θ composed of the elements of the two model parameters δ and α a with an identification algorithm, described hereinafter. Furthermore, the frequency shaping controller 330 calculates an air-fuel ratio correction coefficient KAF as a control input with a control algorithm, described hereinafter.

In the present embodiment, the target equivalent ratio-calculating section 230 corresponds to the target controlled variable-setting means, and the target equivalent ratio KCMD corresponds to the target controlled variable. Further, the state predictor 240 corresponds to the predicted value-calculating means, the weight function value-calculating means, and the predicted controlled variable-setting means, and the predicted equivalent ratio PRE_KACT corresponds to the predicted controlled variable. Furthermore, the onboard identifier 260 corresponds to the modified control input-setting means, the identification means, and the weight function value-calculating means, and the frequency shaping controller 330 corresponds to the control input-calculating means.

Figure 32:
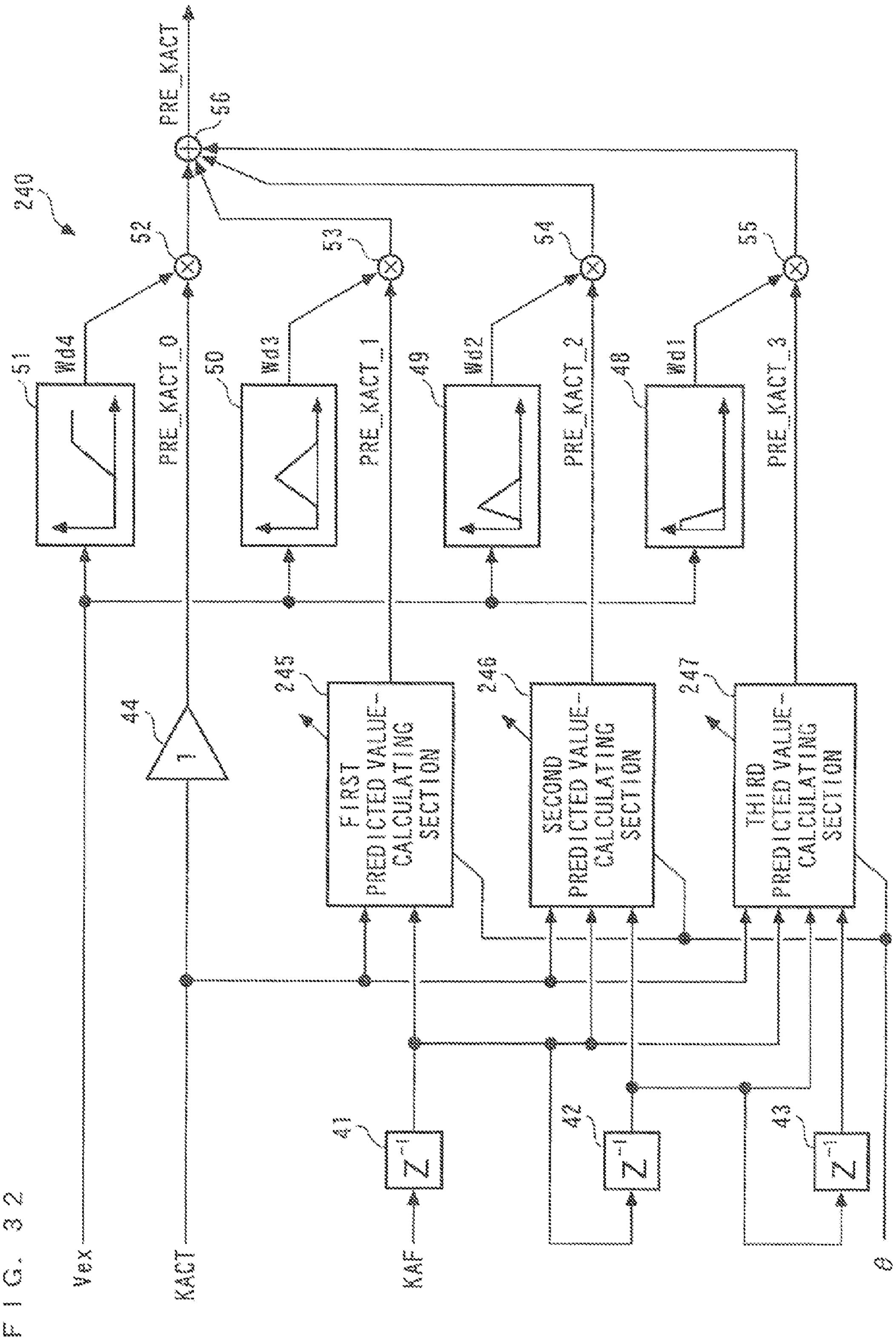
FIG. 32 is a block diagram of a variable dead time state predictor according to the second embodiment.

Next, the above-described state predictor 240 will be described with reference to FIG. 32. As shown in FIG. 32, the state predictor 240 is distinguished from the FIG. 5 state predictor 40 only in that it is provided with first to third predicted value-calculating sections 245 to 247 in place of the first to third predicted value-calculating sections 45 to 47, and in the other respects, the state predictor 240 has the same construction as the state predictor 40. Therefore, the following description will be given mainly of the different points, while component elements of the state predictor 240, identical to those of the state predictor 40, are denoted by identical reference numerals, and detailed description thereof is omitted as deemed appropriate.

First, the amplifier 44 calculates a predicted equivalent ratio PRE_KACT0 by the aforementioned equation (3) and the following equation (69):

$$PRE\_KACT\_0(k)=KACT(k) \tag{69}$$

Further, the first predicted value-calculating section 245 calculates a first predicted value PRE_KACT__1 using the value KAF(k−1) of the air-fuel ratio correction coefficient, delayed by one control cycle by the delay element 41, by the following equation (70). In this equation (70), the model parameters δ and α are identified by the onboard identifier 260.

$$PRE\_KACT\_1(k)=\delta(k)\cdot KACT(k)+\alpha(k)\cdot KAF(k-1) \tag{70}$$

The second predicted value-calculating section 246 calculates a second predicted value PRE_KACT__2 using the values KAF(k−1) and KAF(k−2) of the air-fuel ratio correction coefficient, delayed by one and two control cycles by the respective two delay elements 41 and 42, by the following equation (71):

$$PRE\_KACT\_\_2(k)=\delta(k)\cdot KACT(k)+\alpha(k)\cdot\alpha(k)\cdot KAF(k-2)+\alpha(k)\cdot KAF(k-1) \tag{71}$$

The third predicted value-calculating section 247 calculates a third predicted value PRE_KACT__3 using the values KAF(k−1), KAF(k−2) and KAF(k−3) of the air-fuel ratio correction coefficient, delayed by one to three control cycles by the respective three delay elements 41 to 43, by the following equation (72):

$$PRE\_KACT\_\_3(k)=\delta(k)^3\cdot KACT(k)+\delta(k)^2\cdot\alpha(k)\cdot KAF(k-3)+\delta(k)\cdot\alpha(k)\cdot KAF(k-2)+\alpha(k)\cdot KAF(k-1) \tag{72}$$

Note that the above equations (70) to (72) are derived based on the above-mentioned equation (68) of the control target model by the same method as used for deriving the aforementioned equations (4) to (6).

Further, the four weight function value-calculating sections 48 to 51 calculate the four weight function values Wd1 to Wd4, respectively, and the four multipliers 52 to 55 calculate the four products Wd4·PRE_KACT__0, Wd3·PRE_KACT__1, Wd2·PRE_KACT__2 and Wd1·PRE_KACT__3, respectively.

Then, the adder 56 calculates a predicted equivalent ratio PRE_KACT by the following equation (73) which is the same as the aforementioned equation (7).

$$\text{PRE\_KACT}(k)=\sum_{i=1}^{4} Wdi(k)\cdot\text{PRE\_KACT\_4}-i(k) \tag{73}$$

Also when the predicted equivalent ratio PRE_KACT is calculated by the above-described method, it is possible to obtain the same advantageous effects as provided by the state predictor 40. More specifically, even when the dead time d sequentially changes between 0 and 3 according to changes in the exhaust gas volume Vex, it is possible to calculate the predicted equivalent ratio PRE_KACT while properly causing such a change in the dead time d to be reflected on the predicted equivalent ratio PRE_KACT.

Next, a description will be given of the above-mentioned onboard identifier 260. The onboard identifier 260 calculates a model parameter vector θ with a scheduled modification-type identification algorithm, described hereinafter. This identification algorithm is derived based on a modified model obtained by replacing the value KAF(k−d) on the right side of the aforementioned equation (68) with the modified control input KAF_mod(k).

Figure 33:
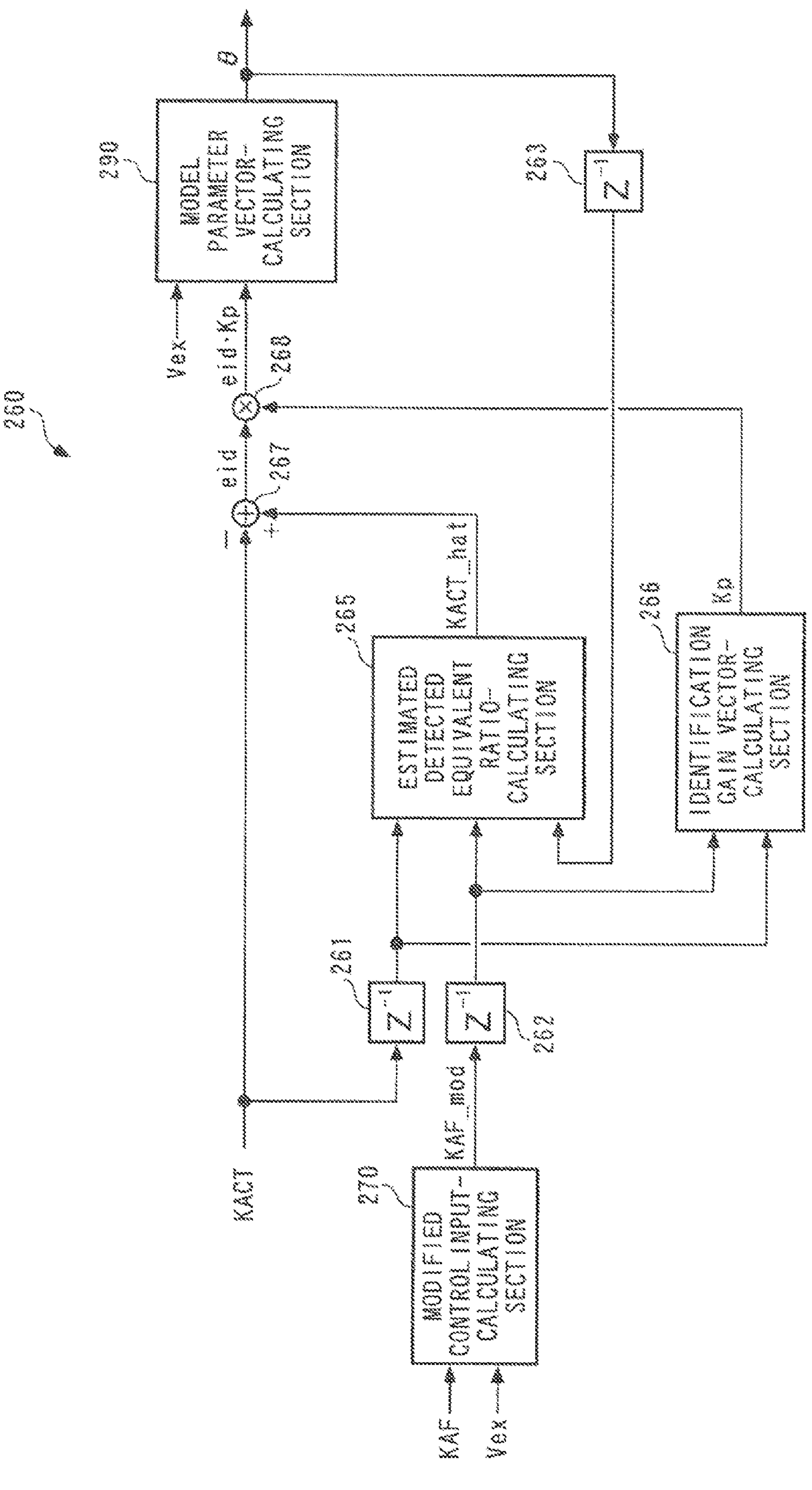
FIG. 33 is a block diagram of an onboard scheduled model parameter identifier according to the second embodiment.

As shown in FIG. 33, the onboard identifier 260 includes a modified control input-calculating section 270, three delay elements 261 to 263, an estimated detected equivalent ratio-calculating section 265, an identification gain vector-calculating section 266, a subtractor 267, a multiplier 268, and a model parameter vector-calculating section 290.

First, the modified control input-calculating section 270 calculates the modified control input KAF_mod by the same method as used by the above-mentioned modified control input-calculating section 70.

Further, the estimated detected equivalent ratio-calculating section 265 calculates an estimated detected equivalent ratio KACT_hat using three values KACT(k−1), KAF_mod(k−1) and θ(k−1) delayed by one control cycle by the three delay elements 261 to 263, respectively, by the following equations (74) to (76):

$$\theta(k-1)=[\delta(k-1)\alpha(k-1)]^T \tag{74}$$

$$\zeta(k-1)=[KACT(k-1)KAF\_\mathrm{mod}(k-1)]^T \tag{75}$$

$$KACT\_hat(k)=\theta(k-1)^T\cdot\zeta(k-1) \tag{76}$$

This equation (76) is derived by replacing KACT on the left side and KAF on the right side of an equation obtained by shifting the parameters of the aforementioned equation (68) toward the past by one control cycle by KACT_hat and KAF_mod, respectively.

The subtractor 267 calculates an identification error eid by the following equation (77):

$$eid(k)=KACT(k)-KACT\_hat(k) \tag{77}$$

The identification gain vector-calculating section 266 calculates an identification gain vector Kp by the following equations (78) and (79). The identification gain vector Kp defines a direction (positive or negative) and amount of medication of the elements δ and α in a model parameter vector θ.

$$P(k)=\frac{1}{\lambda 1}\cdot\left(I-\frac{\lambda 2\cdot P(k-1)\cdot\zeta(k-1)\cdot\zeta(k-1)^T}{\lambda 1+\lambda 2\cdot\zeta(k-1)^T\cdot P(k-1)\cdot\zeta(k-1)}\right)P(k-1) \tag{78}$$

$$Kp(k)=\frac{P(k)\cdot\zeta(k-1)}{1+\zeta(k-1)^T\cdot P(k)\cdot\zeta(k-1)} \tag{79}$$

In the above equation (78), I represents a unit matrix of order 2, and P represents a square matrix of order 2 an initial value of which is defined by the following equation (80).

$$P(0)=\begin{bmatrix} P0 & 0 \\ 0 & P0 \end{bmatrix} \tag{80}$$

Further, in the above equation (78), as described hereinabove, by setting weight parameters represented by λ1 and λ2 as described below, it is possible to select one of the following three algorithms as an identification algorithm.

λ1=1, λ2=0: fixed gain algorithm;

λ1=1, λ2=1: least-squares method algorithm; and

λ1=1, λ2=1: weighted least-squares method algorithm, wherein λ represents a predetermined value set such that $0<\lambda<1$ holds. In the present embodiment, the weighted least-squares method algorithm is employed so as to properly secure identification accuracy and control accuracy.

Furthermore, the multiplier 268 calculates a product eid·Kp of the identification error eid and the identification gain vector Kp.

Figure 34:
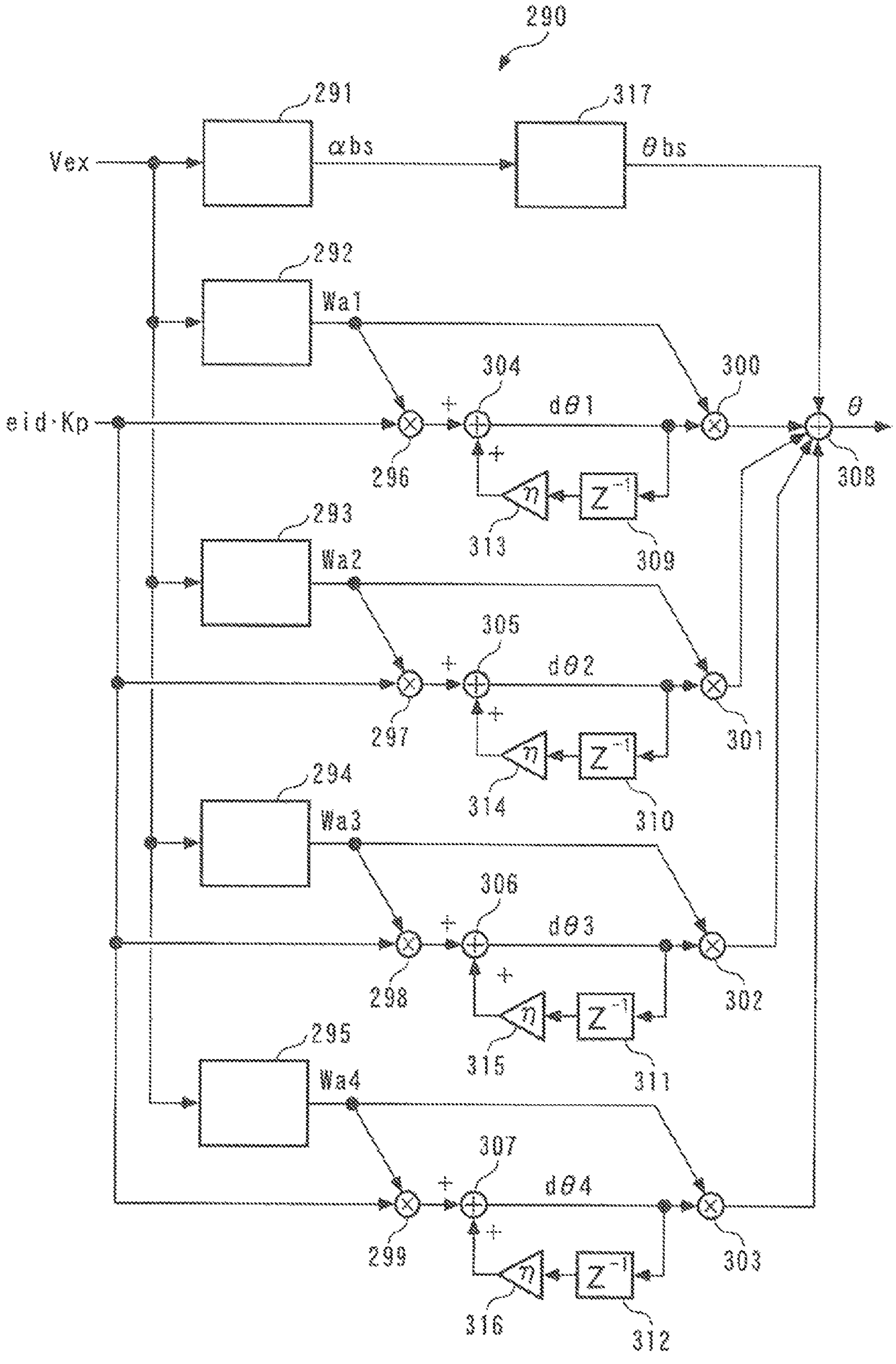
FIG. 34 is a block diagram of a model parameter vector-calculating section.

Then, the model parameter vector-calculating section 290 calculates the model parameter vector θ using the above-mentioned product eid·Kp and the exhaust gas volume Vex, as described hereinafter. As shown in FIG. 34, the model parameter vector-calculating section 290 includes a reference model parameter-calculating section 291, a reference model parameter vector-calculating section 317, four weight function value-calculating sections 292 to 295, eight multipliers 296 to 303, five adders 304 to 308, four delay elements 309 to 312, and four amplifiers 313 to 316.

First, the reference model parameter-calculating section 291 calculates a reference model parameter αbs by the same method as employed by aforementioned reference model parameter-calculating section 91 shown in FIG. 9. Next, the reference model parameter vector-calculating section 317 calculates a reference model parameter δbs by the following equation (81), and then calculates a reference model parameter vector θbs by the following equation (82):

$$\delta bs(k)=1-\alpha bs(k) \tag{81}$$

$$\theta bs(k)=[(\delta bs(k)\alpha bs(k)]^T \tag{82}$$

The four weight function value-calculating sections 292 to 295 calculate four weight function values Wa1 to Wa4 by the same method as employed by the above-mentioned weight function value-calculating sections 92 to 95 shown in FIG. 9, respectively. The multiplier 296 calculates a product Wa1·Kp·eid by multiplying the weight function value Wa1 by a value Kp·eid. The amplifier 313 calculates a value of η·dθ1 (*k*−1) by multiplying a modification term vector dθ1(*k*−1) delayed by one cycle by the delay element 309, by a forgetting matrix n. The forgetting matrix n will be described hereinafter. Then, the adder 304 adds the value of η·dθ1(k−1) to the product Wal·Kp·eid to thereby calculate a modification term vector dθ1. The modification term vector dθ1 is composed of the elements of two modification terms dδ1 and dα1, as shown in an equation (84), referred to hereinafter.

Furthermore, the multiplier 297 calculates a product Wa2·Kp·eid by multiplying the weight function value Wa2 by the value Kp·eid, and the amplifier 314 calculates a value of η·dθ2(k−1) by multiplying a modification term vector dθ2 (k−1) delayed by the delay element 310, by the forgetting matrix η. Then, the adder 305 adds the value of η·dθ2(k−1) to the product Wa2·Kp·eid to thereby calculate a modification term vector dα2. This modification term vector d82 is composed of the elements of two modification terms dδ2 and dα2, as shown in the equation (84), referred to hereinafter.

The multiplier 298 calculates a product Wa3·Kp·eid by multiplying the weight function value Wa3 by the value Kp·eid, and the amplifier 315 calculates a value of η·dθ3(k−1) by multiplying a modification term vector dθ3(k−1) delayed by the delay element 311, by the forgetting matrix η. Then, the adder 306 adds the value of η·dθ3(k−1) to the product Wa3·Kp·eid to thereby calculate a modification term vector dθ3. This modification term vector dθ3 is composed of the elements of three modification terms dδ3 and dα3, as shown in the equation (84), referred to hereinafter.

The multiplier 299 calculates a product Wa4·Kp·eid by multiplying the weight function value Wa4 by the value Kp·eid, and the amplifier 316 calculates a value of η·dθ4(*k*−1) by multiplying a modification term vector dθ4(*k*−1) delayed by the delay element 312, by the forgetting matrix η. Then, the adder 307 adds the value of η·dθ4(*k*−1) to the product Wa4·Kp·eid to thereby calculate a modification term vector dθ4. This modification term vector dθ4 is composed of the elements of four modification terms dδ4 and dα4, as shown in the equation (84), referred to hereinafter.

The forgetting matrix n used by the amplifiers 313 to 316 is defined by the following equation (83):

$$\eta=\begin{bmatrix}\eta 1 & 0\\ 0 & \eta 2\end{bmatrix} \tag{83}$$

In the above equation (83), η1 and η2 represent forgetting coefficients, and are set such that 0<η1≤1 and 0<η2≤1 hold. The forgetting matrix η is used for calculating the modification term vectors dδi (i=1 to 4) because when the steady operating condition of the engine 3 continues for a long time period, there is a fear that the modification term vectors dδi increase and becomes improper. To avoid this inconvenience, the forgetting matrix η is used. Further, when one of the two forgetting coefficients η1 and η2 of the forgetting matrix η is set to 1, it is possible to suppress the identification error eid from constantly occurring and ensure the stability of the control system in a compatible manner.

Further, computing equations used by the four adders 304 to 307 are expressed by the following equations (84) and (85):

$$d\theta i(k)=[d\delta i(k)d\alpha i(k)]^T \tag{84}$$

$$d\theta i(k)=\eta\cdot d\theta i(k-1)+Wai(k)\cdot Kp(k)\cdot eid(k) \tag{85}$$

Furthermore, the multipliers 300 to 303 calculate four vectors Wai·dθi by multiplying the four modification term vectors dθi by associated ones of the four weight function values Wai, respectively.

Then, the adder 308 finally calculates the model parameter vector θ by the following equation (86):

$$\theta(k)=\theta bs(k)+\sum_{i=1}^{4}Wai(k)\cdot d\theta i(k) \tag{86}$$

The onboard identifier 260 uses the above identification algorithm in order to satisfy the above-described identification conditions 1 and 2. More specifically, as described heretofore, when a general identification algorithm, such as the least-squares method, is directly employed, it is difficult to satisfy the identification condition 1. Therefore, to identify the model parameters while satisfying the identification condition 1, the onboard identifier 260 employs, for computation for identifying the model parameters δ and α of the equation (68) of the control target model, a method of calculating the reference values (reference model parameters) ohm and αbs of the two model parameters while setting a restraint condition (δbs=1−αbs) therebetween and calculating the modification term vectors dθi with a general sequential least-squares method algorithm. Further, to satisfy the identification condition 2, similarly to the above-mentioned onboard identifier 60, the onboard identifier 260 employs a method of calculating the modification term vectors dθi and the model parameter vector θ using the weight function values Wai.

Next, a description will be given of the frequency shaping controller 330. The frequency shaping controller 330 calculates the air-fuel ratio correction coefficient KAF such that the predicted equivalent ratio PRE_KACT converges to the target equivalent ratio KCMD, in other words, the detected equivalent ratio KACT converges to the target equivalent ratio KCMD. First, the frequency shaping controller 330 calculates a predicted follow-up error PRE_e by the following equation (87), which is the same as the aforementioned equation (34).

$$PRE\_e(k)=PRE\_KACT(k)\cdot KCMD(k) \tag{87}$$

Then, the frequency shaping controller 330 calculates the air-fuel ratio correction coefficient KAF as a control input by the following equation (88):

$$KAF(k)=\frac{1}{\alpha(k)}\cdot\{\beta\cdot \mathrm{PRE\_e}(k)-\delta(k)\cdot\beta\cdot \mathrm{PRE\_e}(k-1)-\alpha(k)\cdot KAF(k-1)\} \tag{88}$$

The above control algorithm for the frequency shaping controller 330 is derived by the same method as the method of deriving the control algorithm for the above-mentioned frequency shaping controller 130.

According the control apparatus 1A of the second embodiment, configured as described above, by using the same state predictor 40 as employed in the control apparatus 1 according to the first embodiment, it is possible to accurately calculate the predicted equivalent ratio PRE_KACT while properly compensating for the change in the dead time d. Further, by using the frequency shaping controller 330, similarly to the above-described frequency shaping controller 130, it is possible to calculate the air-fuel ratio correction coefficient KAF while satisfying the control condition $\phi$ and at the same time properly compensating for the change in the dead time d. More specifically, it is possible to directly specify (set) the disturbance suppression characteristic and the robustness of the control apparatus 1A on a frequency axis while properly compensating for the change in the dead time d, whereby it is possible to make a dramatic improvement in the ability of suppressing a disturbance and the robustness in a frequency range within which a change in the detected equivalent ratio KACT due to the disturbance is desired to be prevented.

Further, as described hereinabove, the onboard identifier 260 identifies the two model parameters $\delta$ and a with the identification algorithm using the modified control input KAF_mod and the weight function values Wai, so that it is possible to calculate the model parameters $\delta$ and $\alpha$ while satisfying the above-described identification condition 2. In addition to this, the model parameters $\delta$ and $\alpha$ can be identified as values in the vicinity of a value satisfying the identification condition 1, since the reference model parameters $\delta$bs and $\alpha$bs are set such that they satisfy the identification condition 1 (restraint condition), and the model parameter vector $\theta$ composed of the model parameters $\delta$ and $\alpha$ as elements thereof is calculated by modifying the reference model parameter vector $\theta$bs composed of the reference model parameters $\theta$bs and $\alpha$bs as elements thereof by the total sum of the products of the weight function values Wai and the modification term vectors d$\theta$i.

When a comparison is made between the above-described identification algorithm for the onboard identifier 260 and the identification algorithm for the onboard identifier 60, the identification algorithm for the onboard identifier 60 enables the identified value $\alpha$id to be calculated such that the identification condition 1 is completely satisfied, and hence the identification algorithm for the onboard identifier 60 is more excellent from the viewpoint of identifying the model parameters such that the identification condition 1 is satisfied.

Figure 35:
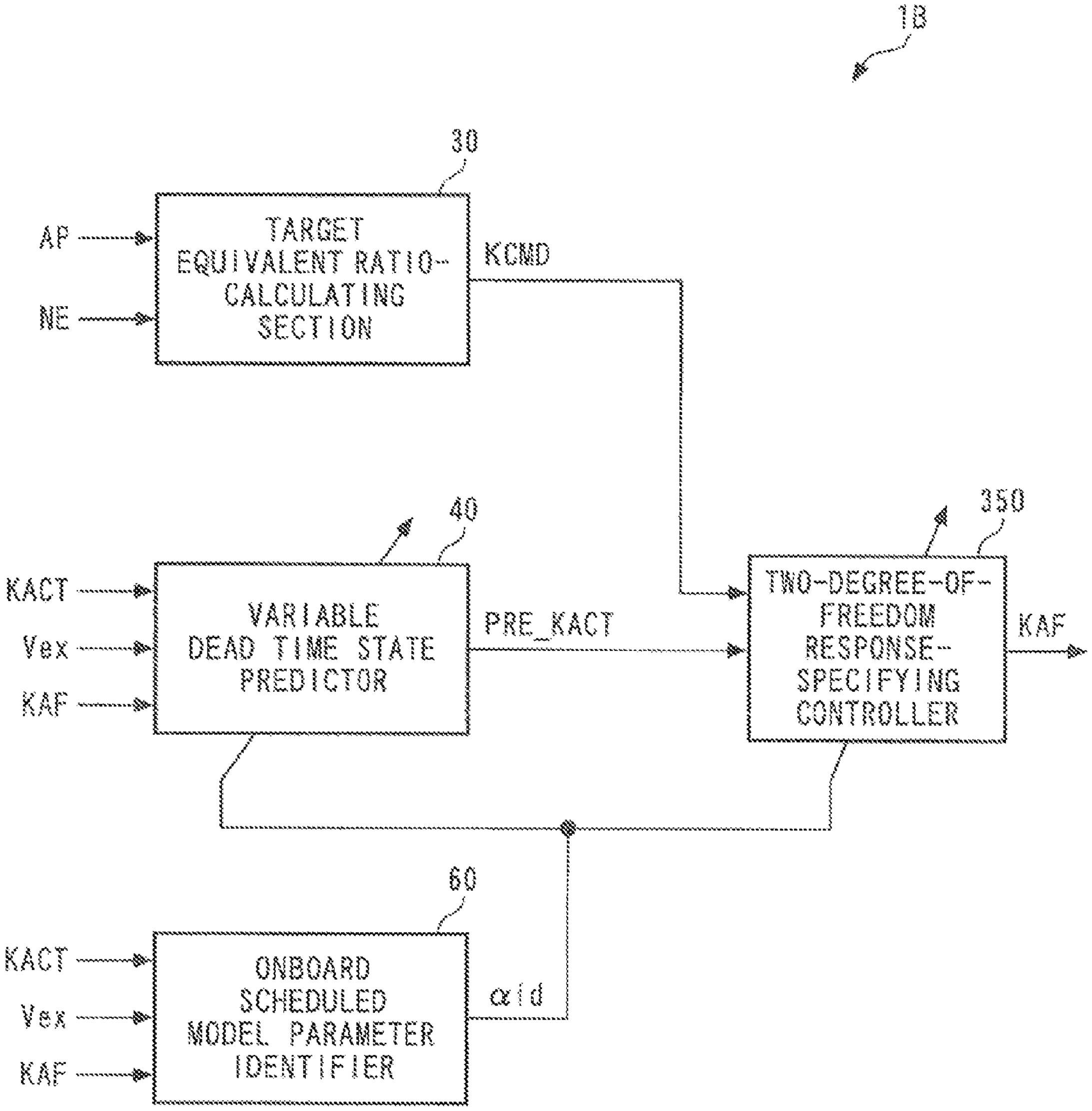
FIG. 35 is a block diagram of a control apparatus according to a third embodiment of the present invention.

Next, a control apparatus 1B according to a third embodiment of the present invention will be described with reference to FIG. 35. As shown in FIG. 35, the control apparatus 1B is distinguished from the FIG. 3 control apparatus 1 according to the first embodiment only in that it is provided with a two-degree-of-freedom response-specifying controller 350 in place of the above-mentioned frequency shaping controller 130, and in the other respects, the control apparatus 1B has the same construction as the control apparatus 1. Therefore, the following description will be given only of the two-degree-of-freedom response-specifying controller 350 (control input-calculating means).

The two-degree-of-freedom response-specifying controller 350 calculates an air-fuel ratio correction coefficient KAF with the following two-degree-of-freedom response-specifying control algorithm. Specifically, first, a filtering value KCMD_f of the target equivalent ratio is calculated by the following equation (89):

$$KCMD\_f(k) = -POLE\_f \cdot KCMD\_f(k-1) + (1 + POLE\_f) \cdot FCMD(k) \tag{89}$$

wherein POLE_f represents a target value filter-setting parameter, and is set such that the relationship of $-1<POLE\_f<0$ holds.

Then, a predicted follow-up error PRE_e_f is calculated by the following equation (90):

$$PRE\_e\_f(k) = PRE\_KACT(k) - KCMD\_f(k-1) \tag{90}$$

Subsequently, a switching function σ_f is calculated by the following equation (91):

$$\sigma\_f(k) = PRE\_e\_f(k) + POLE \cdot PRE\_e\_f(k-1) \tag{91}$$

Wherein POLE represents a switching function-setting parameter, and is set such that the relationship of $-1<POLE<0$ holds.

Then, an equivalent control input Ueq_f is calculated by the following equation (92):

$$\begin{aligned} \mathrm{Ueq\_f}(k) = \frac{1}{\alpha id(k)} \cdot \{ & (\alpha id(k) - \mathrm{POLE}) \cdot \mathrm{PRE\_KACT}(k) + \\ & \mathrm{POLE} \cdot \mathrm{PRE\_KACT}(k-1) + \mathrm{KCMD\_f}(k) + \\ & (\mathrm{POLE}-1) \cdot \mathrm{KCMD\_f}(k-1) - \mathrm{POLE} \cdot \mathrm{KCMD\_f}(k-2) \} \end{aligned} \tag{92}$$

Further, a reaching law input Urch_f is calculated by the following equation (93):

$$\mathrm{Urch\_f}(k) = \frac{Krch}{\alpha id(k)} \cdot \sigma\_f(k) \tag{93}$$

wherein, Krch represents a predetermined feedback gain.

Furthermore, an adaptive law input Uadp_f is calculated by the following equation (94):

$$\mathrm{Uadp\_f}(k) = \frac{Kadp}{\alpha id(k)} \cdot \sum_{i=0}^{k} \sigma\_f(i) \tag{94}$$

wherein, Kadp represents a predetermined feedback gain.

Then, finally, the air-fuel ratio correction coefficient KAF is calculated by the following equation (95):

$$KAF(k) = Ueq\_f(k) + Urch\_f(k) + Uadp\_f(k) \tag{95}$$

A two-degree-of-freedom response-specifying algorithm expressed by the above equations (89) to (95) is derived based on a model obtained by replacing KACT of the aforementioned equation (53) with PRE_KACT.

The above-described control apparatus 1B according to the third embodiment is provided with the same state predictor 40 and onboard identifier 60 as provided in the control apparatus 1 according to the first embodiment, whereby it is possible to obtain the same advantageous effects as provided by the control apparatus 1 of the first embodiment. Further, the two-degree-of-freedom response-specifying controller 350 calculates the air-fuel ratio correction coefficient KAF with the above-described control algorithm, so that it is possible to separately and directly specify a behavior of time series convergence to 0 of the disturbance-caused difference between the target equivalent ratio KCMD and the detected equivalent ratio KACT, and a follow-up characteristic of the detected equivalent ratio KACT with respect to a change in the target equivalent ratio KCMD.

Figure 36:
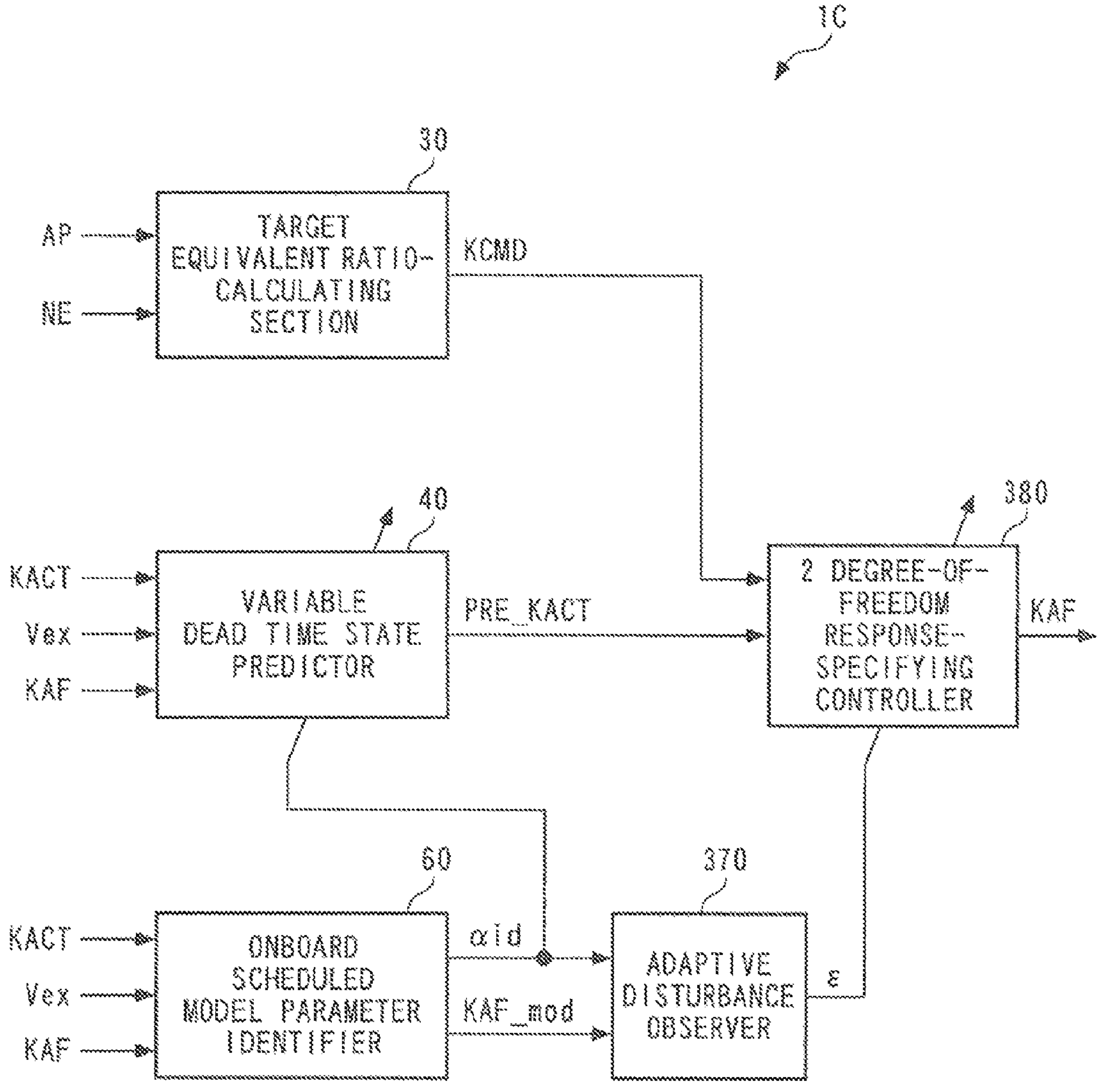
FIG. 36 is a block diagram of a control apparatus according to a fourth embodiment of the present invention.

Next, a control apparatus 1C according to a fourth embodiment of the present invention will be described with reference to FIG. 36. As shown in FIG. 36, the control apparatus 1C is distinguished from the FIG. 3 control apparatus 1 according to the first embodiment only in that it is provided with an adaptive disturbance observer 370 (disturbance estimated value-calculating means), and a two-degree-of-freedom response-specifying controller 380 (control input-calculating means) in place of the above-described frequency shaping controller 130. Therefore, the following description will be given only of these different points.

The adaptive disturbance observer 370 calculates a disturbance estimated value E with a control algorithm, described hereinafter. First, an estimated detected equivalent ratio KACT_adv for estimating a disturbance is calculated by the following equation (96):

$$KACT\_adv(k)=(1-\alpha id(k))\cdot KACT(k)+\alpha id(k)\cdot KAF\_mod(k)+\epsilon(k-1) \quad (96)$$

This equation (96) corresponds to an equation obtained by replacing KAF($k$+1), α, and KAF(k−d) of the aforementioned equation (2) with KACT_adv(k), αid(k), and KAF_mod, respectively, and adding the disturbance estimated value ε to the right side of the equation (2), that is, a disturbance estimation model.

Then, a follow-up error e_adv for estimating a disturbance is calculated by the following equation (97):

$$e\_adv(k)=KACT\_adv(k)-KACT(k) \quad (97)$$

Then, finally, the disturbance estimated value ε is calculated by the following equation (97):

$$\varepsilon(k)=\varepsilon(k-1)+\frac{\pi}{1+\pi}\cdot \mathrm{e\_adv}(k) \quad (98)$$

In this equation (98), π represents a disturbance estimation gain, and is set such that π>0.

Next, a description will be given of the two-degree-of-freedom response-specifying controller 380. This two-degree-of-freedom response-specifying controller 380 calculates the air-fuel ratio correction coefficient KAF with a target value filter-type two-degree-of-freedom response-specifying control algorithm expressed by the following equations (99) to (104):

$$\mathrm{KCMD\_f}(k)=-\mathrm{POLE\_f}\cdot\mathrm{KCMD\_f}(k-1)+(1+\mathrm{POLE\_f})\cdot KCMD(k) \quad (99)$$

$$\mathrm{PRE\_e\_f}(k)=\mathrm{PRE\_KACT}(k)-\mathrm{KCMD\_f}(k-1) \quad (100)$$

$$\sigma\_\mathrm{f}(k)=\mathrm{PRE\_e\_f}(k)+\mathrm{POLE}\cdot\mathrm{PRE\_e\_f}(k-1) \quad (101)$$

$$\mathrm{Ueq\_f}(k)=\frac{1}{\alpha id(k)}\cdot\{(\alpha id(k)-\mathrm{POLE})\cdot\mathrm{PRE\_KACT}(k)+\mathrm{POLE}\cdot\mathrm{PRE\_KACT}(k-1)-\varepsilon(k)+\mathrm{KCMD\_f}(k)+(\mathrm{POLE}-1)\cdot KCMD\mathrm{\_f}(k-1)-\mathrm{POLE}\cdot\mathrm{KCMD\_f}(k-2)\} \quad (102)$$

$$\mathrm{Urch\_f}(k)=\frac{Krch}{\alpha id(k)}\cdot\sigma\_\mathrm{f}(k) \quad (103)$$

$$KAF(k)=\mathrm{Ueq\_f}(k)+\mathrm{Urch\_f}(k) \quad (104)$$

The above equations (99) to (104) correspond to equations obtained by adding the disturbance estimated value ε to equations of the above-described equations (89) to (95) for calculating the equivalent control input Ueq, and omitting the adaptive law input Uadp from the equations (89) to (95).

The above-described control apparatus 1C according to the fourth embodiment is provided with the same state predictor 40 and onboard identifier 60 as provided in the control apparatus 1 according to the first embodiment, whereby it is possible to obtain the same advantageous effects as provided by the control apparatus 1 of the first embodiment. Further, the adaptive disturbance observer 370 calculates the disturbance estimated value ε with the above-mentioned control algorithm, and the two-degree-of-freedom response-specifying controller 380 calculates the air-fuel ratio correction coefficient KAF using the disturbance estimated value ε, so that it is possible to enhance the ability of suppressing a disturbance, i.e. the robustness, of the air-fuel ratio control.

Further, since the control apparatus 1C is provided with the adaptive disturbance observer 370, it is possible to improve the stability of control by setting the disturbance estimation gain such that it π>P0 holds and reducing the identification speed of the onboard identifier 60. Furthermore, for the same reason, to prevent the resonance of the control system or to prevent the gain characteristic of the control target model to which the computation result of the identified value αid is applied, from becoming too small, it is possible to filter input and output data used for the identified value αid and the identification algorithm, thereby making it possible to ensure higher controllability.

Next, a control apparatus 1D according to a fifth embodiment of the present invention will be described with reference to FIG. 37. In the following description, component elements of the control apparatus 1D, identical to those of the control apparatus 1 according to the first embodiment, are denoted by identical reference numerals, and detailed description thereof is omitted. This control apparatus 10 controls e.g. the engagement and disengagement operations of a clutch 410 of an automatic transmission 400 in a vehicle drive system, with a control algorithm, described hereinafter.

The engine 3 is mechanically connected to drive wheels WH and WH via the automatic transmission 400 and a differential gear mechanism 460, whereby torque of the engine 3 is transmitted to the drive wheels WH and WH while having the speed thereof changed by the automatic transmission 400 and the differential gear mechanism 460.

Figure 37:
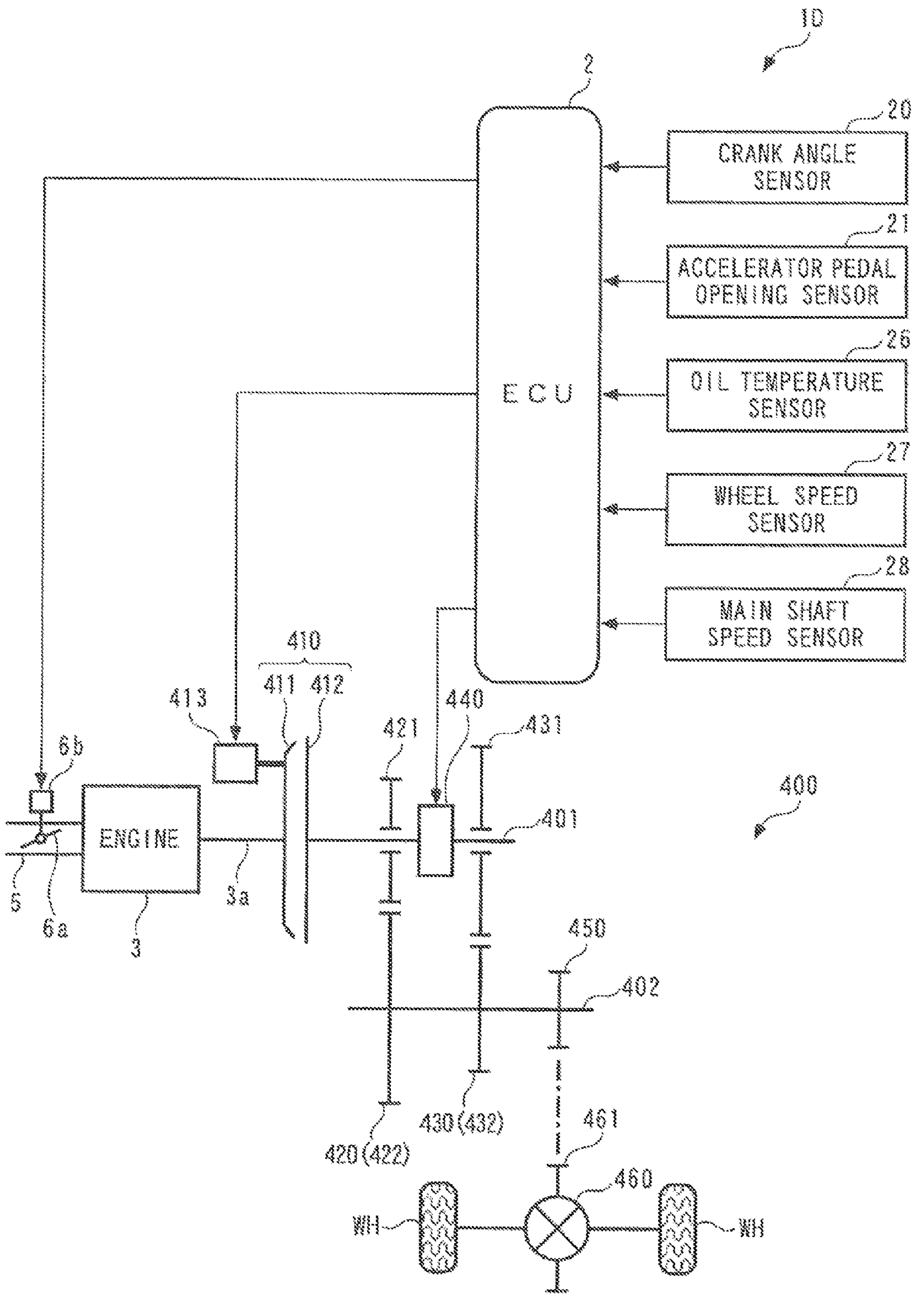
FIG. 37 is a schematic diagram of a control apparatus according to a fifth embodiment of the present invention, and a drive system for an internal combustion engine to which is applied the control apparatus.

As shown in FIG. 37, the automatic transmission 400 includes the clutch 410, a main shaft 401, an auxiliary shaft 402, first-speed and second-speed forward gear trains 420 and 430, a first speed-second speed synchronous meshing mechanism 440, a drive gear 450, and so forth. In FIG. 37, gear trains and synchronous meshing mechanisms other than the first-speed and second-speed forward gear trains 420 and 430 and the first speed-second speed synchronous meshing mechanism 440 are omitted.

The clutch 410 (transmission torque-regulating mechanism) is a dry clutch type, and comprises a clutch plate 411 connected to a crankshaft 3*a* of the engine 3, a clutch plate 412 which is a counterpart plate of the clutch plate 411 and is connected to the main shaft 401, a diaphragm spring (not shown) for urging the clutch plate 411 toward the engine 3, and a clutch actuator 413 for driving the clutch plate 411 toward the clutch plate 412.

The clutch actuator 413 is a hydraulic drive type, and is formed by combining a clutch solenoid valve, a hydraulic actuator, and so forth. The clutch solenoid valve is electrically connected to the ECU 2, and changes an oil pressure supplied to the hydraulic actuator in response to a control input signal supplied from the ECU 2. This changes a state of actuating the clutch plate 411 toward the clutch plate 412 by the clutch actuator 413, to thereby change the engaged and disengaged state of the clutch 410.

The first-speed and second-speed forward gear trains 420 and 430 respectively comprise first and second-speed main shaft gears 421 and 431 pivotally arranged on the main shaft 401, and first and second speed auxiliary shaft gears 422 and 432 which are fixed to the auxiliary shaft 402 and are always in mesh with the first and second-speed main shaft gears 421 and 431, respectively.

Further, the first speed-second speed synchronous meshing mechanism 440 is disposed between the first and second-speed main shaft gears 421 and 431. The first speed-second speed synchronous meshing mechanism 440 is a hydraulic drive type, and is formed by combining a synchronous solenoid valve, a hydraulic actuator, and so forth. The synchronous solenoid valve is electrically connected to the ECU 2, and changes an oil pressure supplied to the hydraulic actuator in response to a control input signal supplied from the ECU 2. Thus, the first speed-second speed synchronous meshing mechanism 440 engages between the first-speed main shaft gear 421 or the second-speed main shaft gear 431 and the main shaft 401 by the meshing of gears while synchronizing the first-speed main shaft gear 421 or the second-speed main shaft gear 431 with the main shaft 401, whereby a speed change operation for changing the speed position to a first-speed forward gear position or a second-speed forward gear position is executed.

On the other hand, the drive gear 450 is always in mesh with a driven gear 461 of the differential gear mechanism 460, whereby the drive wheels WH and WH are driven via the differential gear mechanism 460 along with rotation of the auxiliary shaft 402.

Further, the control apparatus 1D includes the ECU 2 to which are electrically connected not only the aforementioned crank angle sensor 20 and accelerator pedal opening sensor 21 but also an oil temperature sensor 26, four wheel speed sensors 27 (only one of which is shown), and a main shaft speed sensor 28.

The oil temperature sensor 26 is implemented e.g. by a thermistor, and detects an oil temperature Toil, which is the temperature of working fluid supplied e.g. to the above-described oil pressure actuator, to deliver a signal indicative of the detected oil temperature Toil to the ECU 2. The ECU 2 calculates the oil temperature Toil based on the detection signal from the oil temperature sensor 26. In the present embodiment, the oil temperature sensor 26 corresponds to the reference parameter-detecting means, and the oil temperature Toil corresponds to the reference parameter.

Further, each of the four wheel speed sensors 27 detects the rotational speed of associated one of the wheels, and delivers a signal indicative of the detected rotational speed to the ECU 2. The ECU 2 calculates a vehicle speed VP and the like based on the detection signal from the wheel speed sensor 27

Similarly to the crank angle sensor 20, the main shaft speed sensor 28 is formed by a magnet rotor and an MRE pickup, and delivers a pulse signal indicative of the rotational speed of the main shaft 401 to the ECU 2 along with rotation of the main shaft 401. The ECU 2 calculates a rotational speed NM of the main shaft 401 (hereinafter referred to as the "main shaft speed NM") based on the detection signal from the main shaft speed sensor 28. In the present embodiment, the main shaft speed NM corresponds to the control variable and an output rotational speed.

Next, a description will be given of the principle of clutch control performed by the control apparatus 1D according to the present embodiment. In the case of the clutch 410 according to the present embodiment, the relationship between control input Uact to the clutch actuator 413 and the main shaft speed NM can be modeled as a control target model of a first-order lag system, as expressed by the following equation (105):

$$NM(k+1)=(1-\alpha'')\cdot NM(k)+\alpha''\cdot Uact(k-d'') \tag{105}$$

In this equation (105), α" represents a model parameter, and d" represents dead time.

Further, the clutch 410 has characteristics that torque transmitted to the drive wheels WH and WH is determined by a slip ratio of the clutch 410 (rotational difference between the crankshaft 3*a* and the main shaft 401), and that the slip ratio is adjusted by the state of the clutch plate 411 being driven by the clutch actuator 413.

The clutch actuator 413 is a hydraulic drive type, as mentioned above, and it has a characteristic that response thereof varies with a change in oil temperature Toil. Therefore, the slip ratio of the clutch 410 has a characteristic that the slip ratio, i.e. a torque transmission characteristic of the clutch 410, is susceptible to a change in the temperature of the working fluid. Further, the slip ratio of the clutch 410 also has a characteristic that it is susceptible to changes in the surface temperatures of the clutch plates 411 and 112 and aging of component parts.

Figure 38:
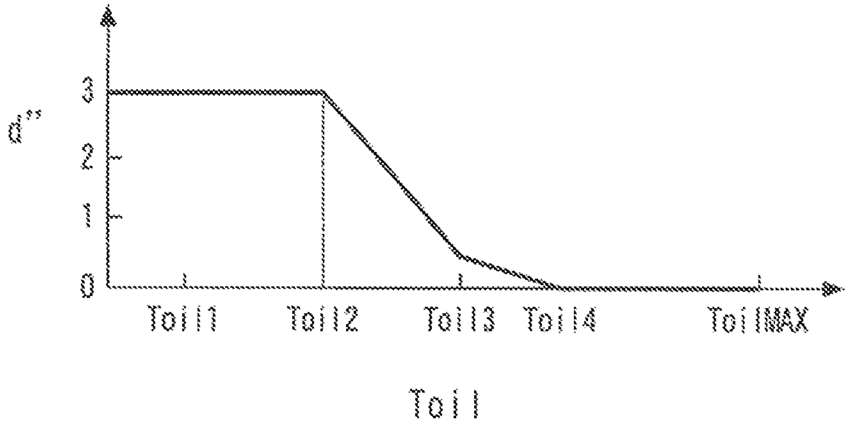
FIG. 38 is a diagram obtained by modeling the relationship between dead time d" and an oil temperature Toil.

For the above reason, the dead time d" expressed by the above-mentioned equation (105) is susceptible to changes in the oil temperature Toil and the surface temperatures of the clutch plates 411 and 412, and aging of the component parts. Therefore, it is necessary to ensure robustness of the clutch control against these. When the relationship between the dead time d" and the oil temperature Toil is modeled, a model (map) shown in FIG. 38 is obtained. In FIG. 38, Toil1 to Toil4, and ToilMAX represent predetermined values of the oil temperature Toil, and are set such that 0<Toil1<Toil2<Toil3<Toil4<ToilMAX holds. Further, the predetermined value ToilMAX is set to the maximum value of the oil temperature Toil in a range within which the oil temperature Toil can change during operation of the engine 3. In other words, the oil temperature Toil has a characteristic that it varies within the range of 0 to ToilMAX during operation of the engine 3, so that to ensure the above-mentioned robustness, it is necessary to calculate the control input Uact while causing a change in the dead time d" caused by a change in the oil temperature Toil to be reflected on the control input Uact.

In general, a high-frequency vibration behavior called "judder" is liable to occur during operation of the clutch, and if the judder occurs, a driving force oscillatingly changes, whereby operability of the clutch is degraded. Such a problem is more markedly liable to occur in a dry clutch, such as the clutch 410 according to the present embodiment, and to solve this problem, it is necessary to use a control algorithm that satisfies the aforementioned control condition $\phi$.

For the above reason, in the present embodiment, the control input Uact is calculated using the control target model expressed by the aforementioned equation (105) including the dead time d", with the same control algorithm as the above-described control algorithm used by the frequency shaping controller 130.

Hereinafter, a description will be given of the configuration of the control apparatus 1D according to the present embodiment and the control algorithm. The control algorithm, described hereafter, is used when the gear position is set to the first-speed forward gear position and at the same time during low-speed traveling of the vehicle, or when the gear position is set to the first-speed forward gear position and at the same time during standing start of the vehicle. In the following description, such conditions of setting of the gear positions and traveling conditions of the vehicle are collectively referred to as the "clutch control conditions".

Figure 39:
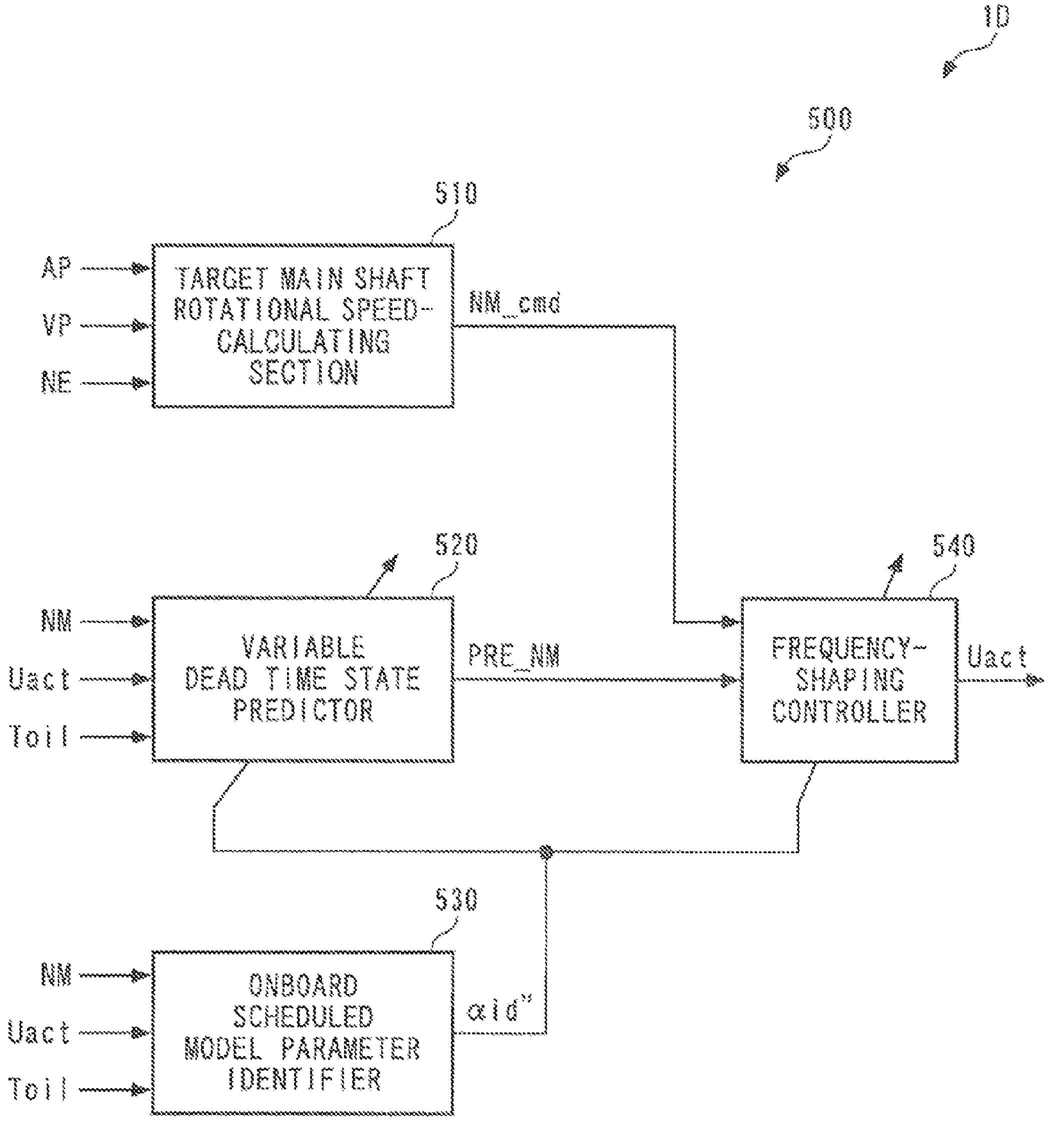
FIG. 39 is a block diagram of a clutch controller.
Figure 44:
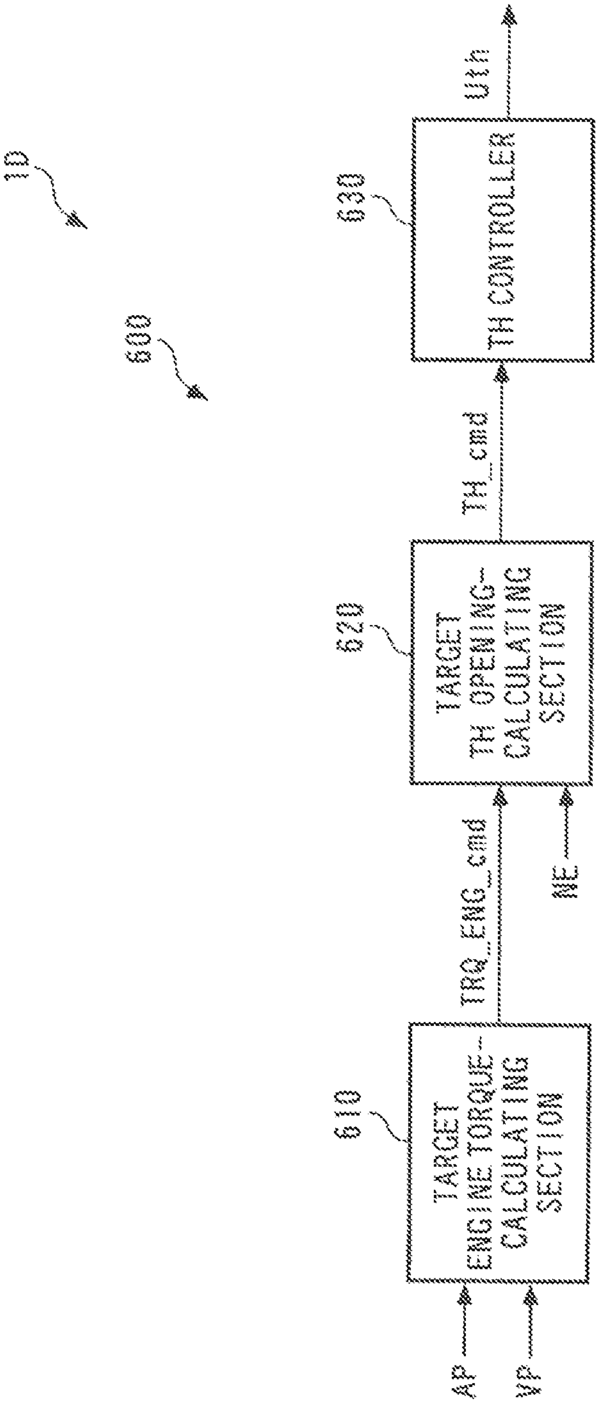
FIG. 44 is a block diagram of a throttle valve controller.

The control apparatus 1D includes a clutch controller 500 shown in FIG. 39, and a throttle valve controller 600 shown in FIG. 44. Each of the controllers 500 and 600 is specifically implemented by the ECU 2.

First, the clutch controller 500 will be described with reference to FIG. 39. The clutch controller 500 controls the engagement and disengagement of the clutch 410 when the above-described clutch control conditions are satisfied. As shown in FIG. 39, the clutch controller 500 includes a target main shaft rotational speed-calculating section 510, a variable dead time state predictor (hereinafter referred to as the "state predictor") 520, an onboard scheduled model parameter identifier (hereinafter referred to as the "onboard identifier") 530, and a frequency shaping controller 540.

Figure 40:
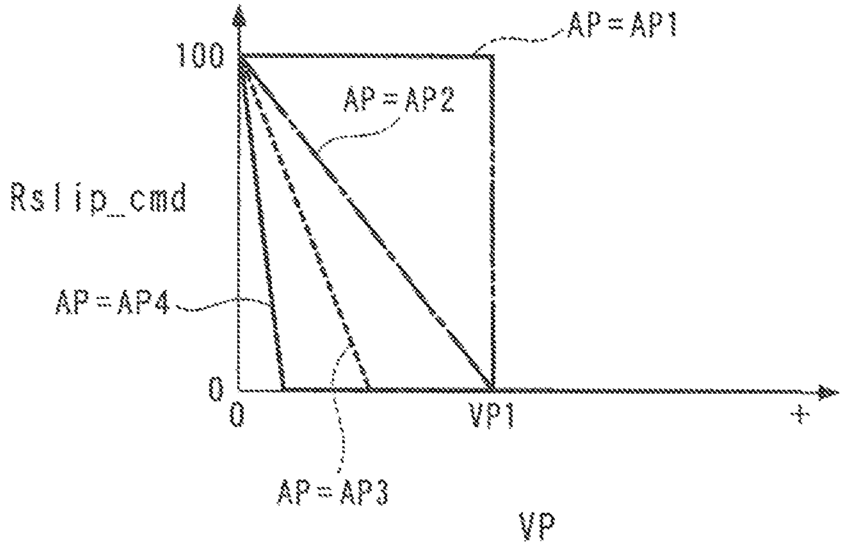
FIG. 40 is a diagram showing an example of a map for use in calculating a target clutch slip ratio Rslip_cmd.

The target main shaft rotational speed-calculating section 510 calculates a target main shaft rotational speed NM_cmd by a method, described hereinafter. First, the target main shaft rotational speed-calculating section 510 calculates a target clutch slip ratio Rslip_cmd by searching a map shown in FIG. 40 according to the accelerator pedal opening AP and the vehicle speed VP. This target clutch slip ratio Rslip_cmd is a value which serves as the target of the clutch slip ratio (NE/NM: ratio between an input-side rotational speed and an output-side rotational speed of the clutch 410). In FIG. 40, AP1 to AP4 represent predetermined values of the accelerator pedal opening AP, and are set such that AP1<AP2<AP3<AP4 holds. Particularly, AP1 is set to a value to be assumed when the accelerator pedal is fully closed, and AP4 is set to a value to be assumed when the accelerator pedal is fully open. Further, In FIG. 40, VP1 represents a predetermined vehicle speed.

As shown in FIG. 40, in a region of VP≤VP1 and AP>AP1, the target clutch slip ratio Rslip_cmd is set to a smaller value as the accelerator pedal opening AP is larger or the vehicle speed VP is higher. This is because as the accelerator pedal opening AP is larger or the vehicle speed VP is higher, it is necessary to increase the torque transmission efficiency of the clutch 410.

Next, the target main shaft rotational speed NM_cmd is calculated using the target clutch slip ratio Rslip_cmd calculated as described above by the following equation (106):

$$NM\_cmd(k)=Rslip\_cmd(k)\cdot NE(k) \tag{106}$$

In the present embodiment, the target main shaft rotational speed-calculating section 510 corresponds to the target controlled variable-setting means, and the target main shaft rotational speed NM_cmd corresponds to the target controlled variable.

Next, a description will be given of the above-mentioned state predictor 520. This state predictor 520 takes into account the characteristic of the dead time d" described with reference to FIG. 38, and calculates a predicted main shaft rotational speed PRE_NM with the same prediction algorithm as employed in the aforementioned state predictor 40 of the first embodiment. In the present embodiment, the state predictor 520 corresponds to the predicted value-calculating means, the weight function value-calculating means, and the predicted controlled variable-setting means, and the predicted main shaft rotational speed PRE_NM corresponds to the predicted controlled variable.

The predicted main shaft rotational speed PRE_NM corresponds to a value which the main shaft rotational speed NM is predicted to assume at a time when the dead time d" elapses. Specifically, it is calculated by a prediction algorithm expressed by the following equations (107) to (111). Further, this prediction algorithm is derived by the same method as the method used for deriving the prediction algorithm for the state predictor 40 of the first embodiment.

First, a zeroth predicted value PRE_NM_0 is calculated by the following equation (107):

$$PRE\_NM\_0(k)=NM(k) \tag{107}$$

Further, a first predicted value PRE_NM_1 is calculated by the following equation (108):

$$PRE\_NM\_1(k)=(1-\alpha id''(k))\cdot NM(k)+\alpha id''(k)\cdot Uact(k-1) \tag{108}$$

In this equation (108), αid" represents an identified value of the model parameter α", and is calculated by the onboard identifier 530.

Further, a second predicted value PRE_NM_2 is calculated by the following equation (109):

$$PRE\_NM\_2(k)=(1-\alpha id''(k))^2\cdot NM(k)+(1-\alpha id''(k))\cdot \alpha id''(k)\cdot Uact(k-2)+\alpha id''(k)\cdot Uact(k-1) \tag{109}$$

Then, a third predicted value PRE_NM_3 is calculated by the following equation (110):

$$PRE\_NM\_3(k)=(1-\alpha id''(k))^3\cdot NM(k)+(1-\alpha id''(k))^2\cdot \alpha id''(k)\cdot NM(k-3)+(1-\alpha id''(k))\cdot \alpha id''(k)\cdot Uact(k-2)+\alpha id''(k)\cdot Uact(k-1) \tag{110}$$

Finally, the predicted main shaft rotational speed PRE_NM is calculated by the following equation (111):

$$\mathrm{PRE\_NM}(k)=\sum_{i=1}^{4} Wdi''(k)\cdot \mathrm{PRE\_NM\_4}-i(k) \tag{111}$$

Figure 41:
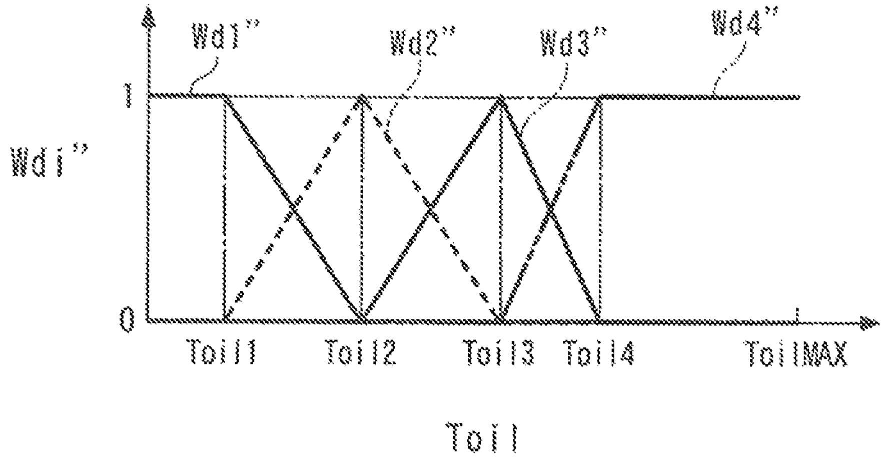
FIG. 41 is a diagram showing an example of a map for use in calculating a weight function value Wdi"

In the above equation (111), Wdi" (i=1 to 4) represents a weight function value, and is calculated by searching a map shown in FIG. 41 according to the oil temperature Toil. As shown in FIG. 41, when a range within which the oil temperature Toil can change is divided into four ranges of Toil≤Toil2, Toil1≤Toil≤Toil3, Toil2≤Toil≤Toil4, and Toil3≤Toil≤ToilMAX, four weight function values Wd1" to Wd4" are set such that they are associated with the above four ranges, respectively, and are set to positive values not larger than 1 in the ranges associated therewith, whereas in ranges other than the associated ranges, they are set to 0.

Specifically, the weight function value Wd1" is set, in the range associated therewith (Toil≤Toil2), to a smaller positive value as the oil temperature Toil is higher with a maximum value of 1 when Toil≤Toil1 holds, while in the other ranges, it is set to 0. The weight function value Wd2" is set, in the range associated therewith (Toil1≤Toil≤Toil3), to such a value as changes along the inclined sides of a triangle with a maximum value of 1 when Toil=Toil2 holds, while in the other ranges, it is set to 0.

The weight function value Wd3" is set, in the range associated therewith (Toil2≤Toil≤Toil4), to such a value as changes along the inclined sides of a triangle with a maximum value of 1 when Toil=Toil3 holds, while in the other ranges, it is set to 0. The weight function value Wd4" is set, in the range associated therewith (Toil3≤Toil≤ToilMAX), to a larger positive value as the oil temperature Toil is higher with a maximum value of 1 when Toil4≤Toil holds, while in the other ranges, it is set to 0.

Further to the above, the four ranges with which the respective four weight function values Wdi" (i=1 to 4) are associated are set such that adjacent ones thereof overlap each other, as described above, and the sum of the values of the weight function values Wdi" associated with each value of the oil temperature Toil in the overlapping ranges is set such that it becomes equal to the maximum value of 1 of each of the weight function values Wdi".

Further, as is clear from a comparison between FIG. 41 and FIG. 38, referred to hereinabove, the three ranges overlapping each other are set such that they correspond to three ranges, respectively, within which the slope of the dead time d" is held constant. In addition to this, the weight function values Wd1", WD2", WD3", and Wd4" are set such that the weights thereof are maximized for the dead time d"=3, the dead time d"=2, the dead time d"=1, and the dead time d"=0, respectively.

Therefore, the predicted main shaft rotational speed PRE_NM is calculated as the total sum of products obtained by multiplying the four predicted values PRE_NM_4−i by the four weight function values Wdi" set as above, respectively, and hence even when the dead time d" sequentially changes between 0 to 3, as shown in FIG. 38, according to changes in the oil temperature Toil, it is possible to calculate the predicted main shaft rotational speed PRE_NM as such a value that smoothly changes, while properly causing such changes in the dead time d" to be reflected thereon.

Next, a description will be given of the above-mentioned onboard identifier 530. In the present embodiment, the onboard identifier 530 corresponds to the modified control input-setting means, the identification means, and the weight function value-calculating means. This onboard identifier 530 calculates the identified value αid" with a scheduled modification type identification algorithm with a restraint condition, expressed by the following equations (112) to (124). This identification algorithm is derived by the same method as the method used for deriving the identification algorithm for the above-described onboard identifier 60.

First, a modified control input Uact_mod is calculated by the following equation (112):

$$\text{Uact\_mod}(k) = \sum_{i=1}^{4} Wdi''(k) \cdot Uact(k-4+i) \tag{112}$$

Next, a combined signal value W_act" is calculated by the following equation (113):

$$W\_act''(k)=NM(k)-NM(k-1) \tag{113}$$

Further, an estimated combined signal value W_hat" is calculated by the following equations (114) and (115):

$$\zeta''(k-1)=Uact\_\text{mod}(k-1)-NM(k-1) \tag{114}$$

$$W\_hat''(k)=\alpha id''(k-1)\cdot\zeta''(k-1) \tag{115}$$

Next, an identification error eid" is calculated by the following equation (116):

$$eid''(k)=W\_act''(k)-W\_hat''(k) \tag{116}$$

Further, an identification gain Kp" is calculated by the following equations (117) and (118):

$$P''(k) = \frac{1}{\lambda 1}\cdot\left(1-\frac{\lambda 2\cdot P''(k-1)\cdot\zeta''(k-1)}{\lambda 1+\lambda 2\cdot P''(k-1)\cdot\zeta''(k-1)}\right)P''(k-1) \tag{117}$$

$$Kp''(k) = \frac{P''(k)\cdot\zeta''(k-1)}{1+P''(k)\cdot\zeta''(k-1)} \tag{118}$$

In the above equation (117), an initial value P" of the gain P" is defined by the following equation (119):

$$P''(0)=P0'' \tag{119}$$

wherein PO" is set to a predetermined value.

Further, in the above equation (117), λ1 and λ2 represent weight parameters. As described hereinbefore, by setting these values λ1 and λ2 as described below, it is possible to select one of the following three algorithms as an identification algorithm.

λ1=1, λ2=0: fixed gain algorithm;

λ1=1, λ2=1: least-squares method algorithm; and

λ1=λ, λ2=1: weighted least-squares method algorithm, wherein λ represents a predetermined value set such that 0<λ<1 holds. In the present embodiment, the weighted least-squares method algorithm is employed so as to properly secure identification accuracy and control accuracy.

Then, a gain coefficient H" is calculated by the following equations (120) to (122):

When α_H"<αid"(k−1) holds, $$H''(k)=\eta'' \tag{120}$$

When α_L"≤αid"(k−1)≤α_H" holds, $$H''(k)=1 \tag{121}$$

When αid" (k−1)<α_L" holds, $$H''(k)=\eta'' \tag{122}$$

In the above equations (120) to (122), α_L" represents a predetermined lower limit value, and α_H" represents a predetermined higher limit value. Further, η" represents a forgetting coefficient, and is set such that 0<η"≤1 holds. The forgetting coefficient η" is used for calculating the identified value αid" because when the steady operating condition of the engine 3 continues for a long time period, there is a fear that the identified value αid" increases and becomes improper. To avoid this inconvenience, the forgetting coefficient η" is used.

Further, four modification terms dαi" (i=1 to 4) are calculated by the following equation (123):

$$d\alpha i''(k)=H''(k)\cdot d\alpha i''(k-1)+Wai''(k)\cdot Kp''(k)\cdot eid''(k) \tag{123}$$

Figure 42:
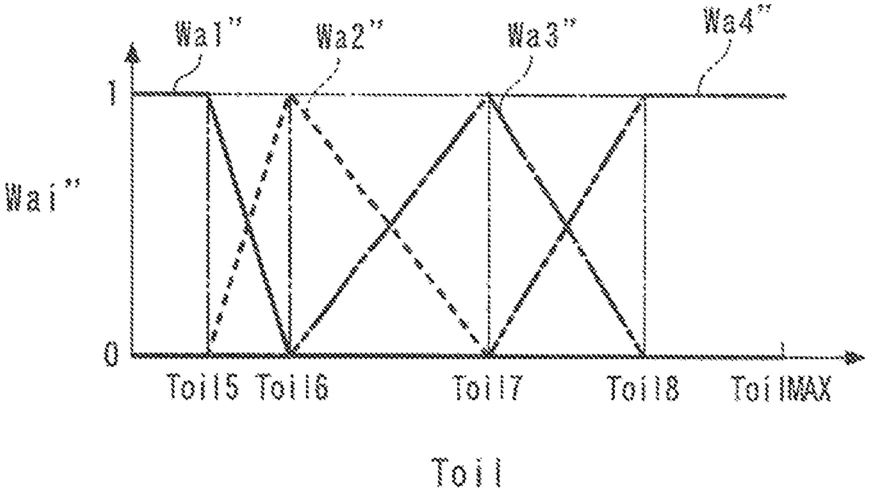
FIG. 42 is a diagram showing an example of a map for use in calculating a weight function value Wai"

In the above equation (123), Wai" represents a weight function value, and is calculated by searching a map shown in FIG. 42 according to the oil temperature Toil. In FIG. 42, Toil5 to Toil8 represent predetermined values of the oil temperature Toil, and are set such that Toil5≤Toil6≤Toil7≤Toil8≤ToilMAX holds. As shown in FIG. 42, when a range within which the oil temperature Toil can change is divided into four ranges of Toil≤Toil6, Toil5≤Toil≤Toil7, Toil6≤Toil≤Toil8, and Toil7≤Toil≤ToilMAX, the four weight function values Wa1" to Wa4" are set such that they are associated with the above four ranges, respectively, and are set to positive values not larger than 1 in the ranges associated therewith, whereas in ranges other than the associated ranges, they are set to 0.

The weight function value Wa1" is set, in the range associated therewith (Toil≤Toil6), to a smaller positive value as the oil temperature Toil is higher with a maximum value of 1 when Toil≤Toil5 holds, while in the other ranges, it is set to 0. The weight function value Wa2" is set, in the range associated therewith (Toil5≤Toil≤Toil7), to such a value as changes along the inclined sides of a triangle with a maximum value of 1 when Toil=Toil6 holds, while in the other ranges, it is set to 0.

The weight function value Wa3" is set, in the range associated therewith (Toil6≤Toil≤Toil8), to such a value as changes along the inclined sides of a triangle with a maximum value of 1 when Toil=Toil7 holds, while in the other ranges, it is set to 0. The weight function value Wa4" is set, in the range associated therewith (Toil7≤Toil≤ToilMAX), to a larger positive value as the oil temperature Toil is higher with a maximum value of 1 when Toil8≤Toil holds, while in the other ranges, it is set to 0.

Further to the above, the four ranges with which the respective four weight function values Wai" (i=1 to 4) are associated are set such that adjacent ones thereof overlap each other, as described above, and the sum of the values of the weight function values Wai" associated with the each value of the oil temperature Toil in the overlapping ranges is set such that it becomes equal to the maximum value of 1 of each of the weight function values Wai". Further, as is clear from a comparison between FIG. 42 and FIG. 43, referred to hereinafter, the three ranges overlapping each other are set such that they correspond to three ranges, respectively, within which the slope of the reference model parameter αbs" is held constant.

Then, the identified value αid" is finally calculated by the following equation (124):

$$\alpha id''(k) = \alpha bs''(k) + \sum_{i=1}^{4} Wai''(k) \cdot d\alpha i''(k) \tag{124}$$

Figure 43:
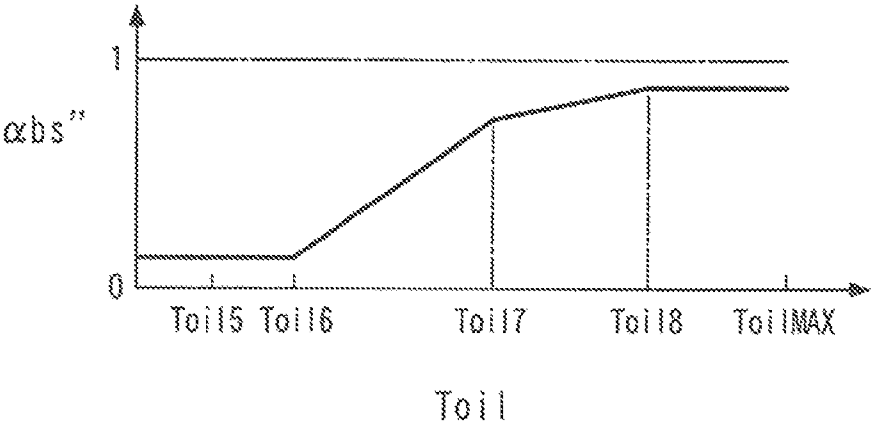
FIG. 43 is a diagram showing an example of a map for use in calculating a reference model parameter αbs"

In the above equation (124), αbs" represents a reference model parameter, and is calculated by searching a map shown in FIG. 43 according to the oil temperature Toil. In this map, the reference model parameter αbs" is set to a larger value as the oil temperature Toil is higher. This is because as the oil temperature Toil becomes higher, the response of the clutch actuator becomes higher to make the response delay smaller, whereby the degree of influence of the control input Uact on the main shaft rotational speed NM becomes larger, and to cope with this, the reference model parameter αbs" is configured as mentioned above.

Next, a description will be given of the above-mentioned frequency shaping controller 540 (control input-calculating means). This frequency shaping controller 540 calculates the control input Uact using the target main shaft rotational speed NM_cmd, the predicted main shaft rotational speed PRE_NM, and the identified value αid", by the following equations (125) and (126). A control algorithm expressed by the equations (125) and (126) is derived by the same principle as that of the control algorithm for the above-described frequency shaping controller 130.

$$\mathrm{PRE\_e}''(k) = \mathrm{PRE\_NM}(k) - \mathrm{NM\_cmd}(k) \tag{125}$$

$$Uact(k) = \frac{1}{\alpha id''(k)} \cdot \{\beta'' \cdot \mathrm{PRE\_e}''(k) - (1 - \alpha id''(k)) \cdot \beta'' \cdot \mathrm{PRE\_e}'(k-1) - \alpha id''(k) \cdot Uact(k-1)\} \tag{126}$$

In the above equation (125), PRE_e" represents a predicted follow-up error. In the above equation (126), β" represents a sensitivity-setting parameter, and is configured to satisfy the above-mentioned control condition ϕ.

The frequency shaping controller 540 calculates the control input Uact, as described above. Then, the ECU 2 supplies a control input signal corresponding to the control input Uact to the clutch actuator 413, whereby the main shaft rotational speed NM is feedback-controlled such that it converges to the target main shaft rotational speed NM_cmd.

Next, the above-mentioned throttle valve controller 600 will be described with reference to FIG. 44. This throttle valve controller 600 controls the degree of opening of the throttle valve 6*a*, and as shown in FIG. 44, includes a target engine torque-calculating section 610, a target TH opening-calculating section 620, and a TH controller 630.

Figure 45:
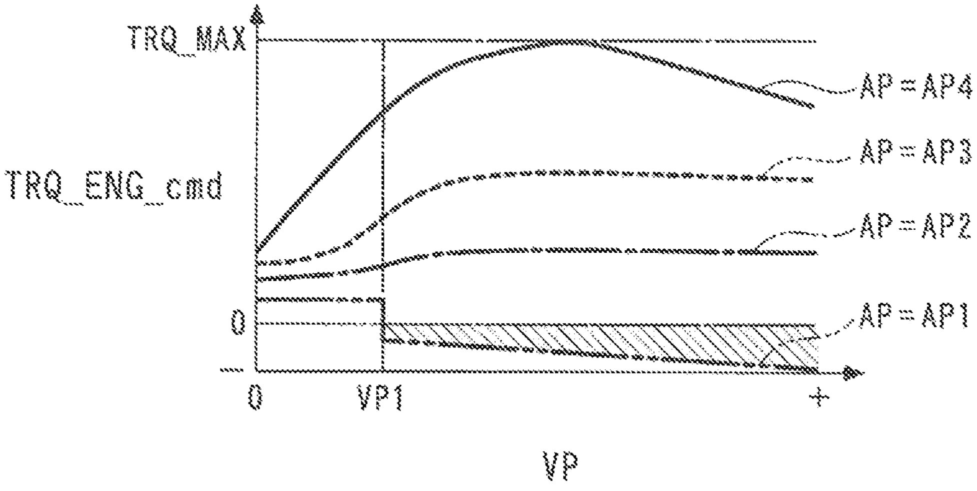
FIG. 45 is a diagram showing an example of a map for use in calculating a target engine torque TRQ_ENG_cmd.

The target engine torque-calculating section 610 calculates a target engine torque TRQ_ENG_cmd by searching a map shown in FIG. 45 according to the accelerator pedal opening AP and the vehicle speed VP. In FIG. 45, TRQ_MAX represents the maximum value of the torque that can be generated by the engine 3. Further, an area indicated by hatching in FIG. 45 represents an area in which a fuel cut operation should be performed since the accelerator pedal is fully closed (AP=AP1) and at the same time the vehicle is traveling (VP>VP1). Therefore, the target engine torque TRQ_ENG_cmd is set to a negative value in this area.

Figure 46:
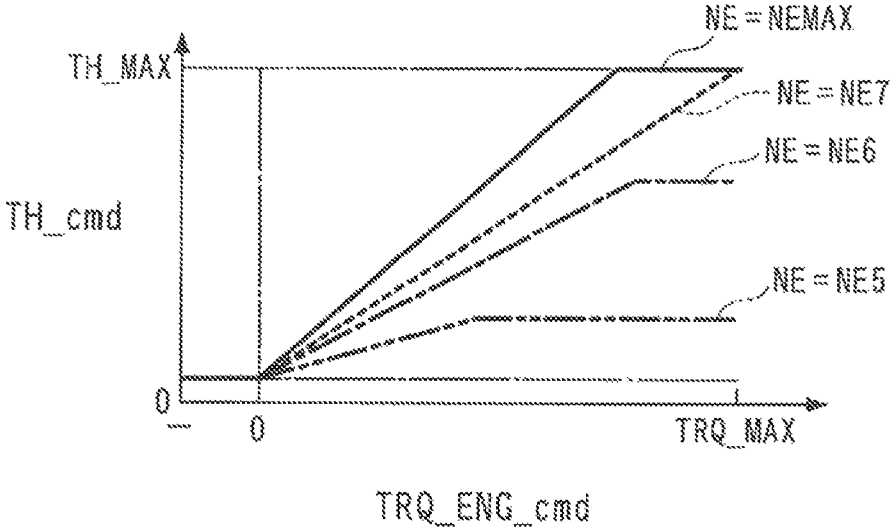
FIG. 46 is a diagram showing an example of a map for use in calculating a target TH opening TH_cmd.

Further, the target TH opening-calculating section 620 calculates a target TN opening TH_cmd by searching a map shown in FIG. 46 according to the target engine torque TRQ_ENG_cmd and the engine speed NE. In FIG. 46, NE5 to NE7 represent predetermined values of the engine speed NE, and are set such that 0<NE5<NE6<NE7<NEMAX holds. In this map, in a high-engine speed range, the target TH opening TH_cmd is set to a larger value as the target engine torque TRQ_ENG_cmd is larger, so as to ensure an intake air amount which can realize the large target engine torque TRQ_ENG_cmd. Further, the target TH opening TH_cmd is set to a larger value as the engine speed NE is higher, so as to ensure an intake air amount which can realize the high engine speed NE.

Next, the TH controller 630 calculates a control input Uth by searching a map, not shown, according to the target TH opening TH_cmd. Then, a control input signal corresponding to the control input Uth is supplied to the TH actuator 6*b* by the ECU 2, whereby the degree of opening of the throttle valve 6*a* is feedback-controlled such that it converges to the target TH opening TH_cmd.

Figure 47:
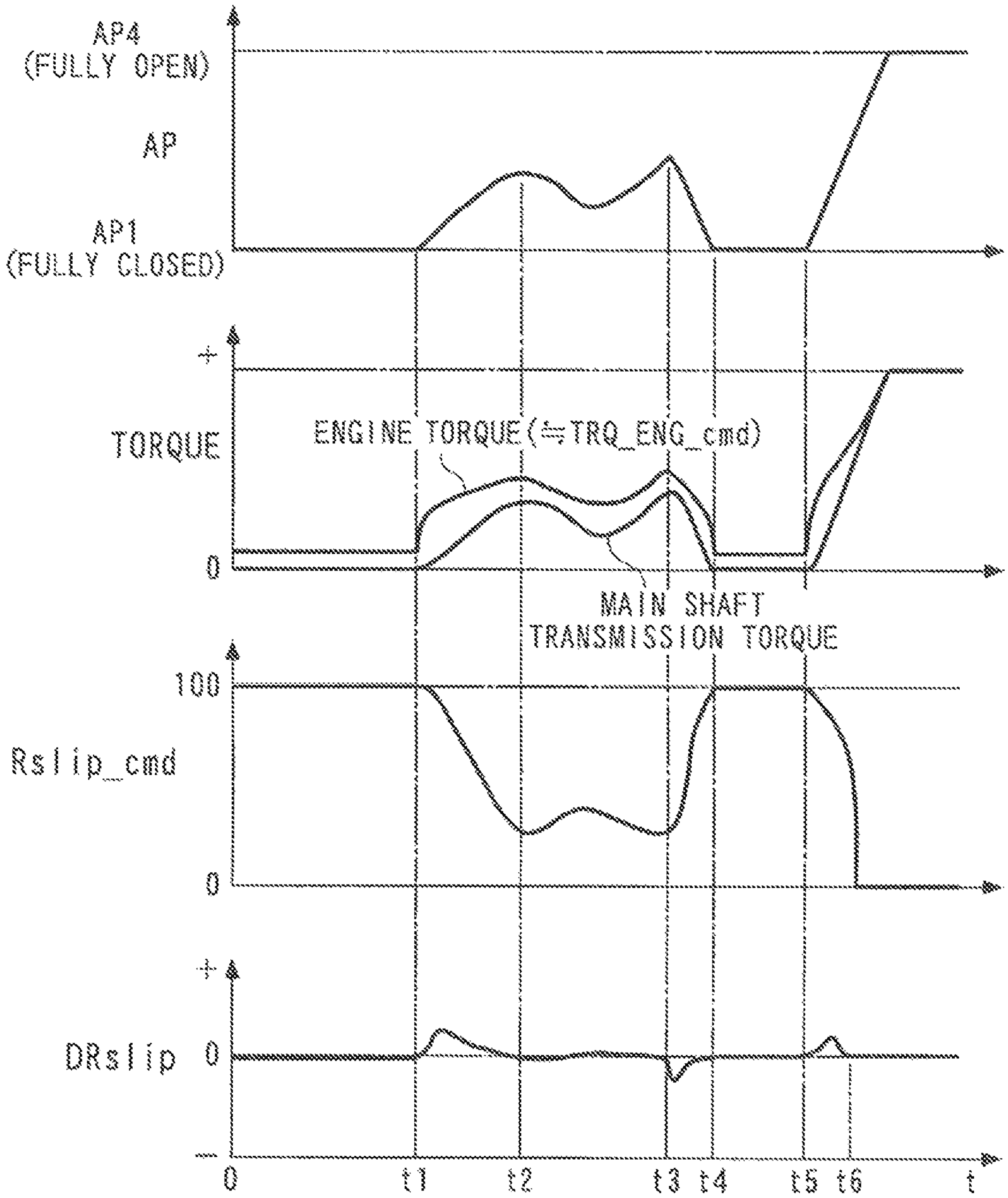
FIG. 47 is a timing diagram of an example of results of a simulation of clutch control performed by the control apparatus according to the fifth embodiment.

Next, results of a simulation of the clutch control performed by the control apparatus 1D according to the fifth embodiment (hereinafter referred to as "control results") will be described with reference to FIG. 47. In FIG. 47, Dslip represents a slip ratio difference representative of the difference between an actual clutch slip ratio Rslip (=NE/NM) and the target clutch slip ratio Rslip_cmd (=Rslip−Rslip_cmd).

As shown in FIG. 47, the accelerator pedal is stepped on to increase the accelerator pedal opening AP from AP1 (=0) at a time point t1, and immediately thereafter, the actual clutch slip ratio Rslip overshoots the target clutch slip ratio Rslip_cmd, so that the slip ratio difference Dslip suddenly and temporarily increases. However, as the control proceeds, the slip ratio difference Dslip decreases, and between time points t2 and t3, the slip ratio difference Dslip is held at a value close to 0. From the above it is understood that high control accuracy is ensured.

After the accelerator pedal is released at a time point t3, the actual clutch slip ratio Rslip undershoots the target clutch slip ratio Rslip_cmd, so that the slip ratio difference Dslip suddenly and temporarily decreases. However, as the control proceeds, the slip ratio difference Dslip increases toward 0, and between time points t4 and t5, the slip ratio difference Dslip is held at a value close to 0. From the above, it is understood that high control accuracy is ensured.

Then, at a time point t5, the accelerator pedal is stepped on again, and immediately thereafter, the actual clutch slip ratio Rslip overshoots the target clutch slip ratio Rslip_cmd, so that the slip ratio difference Dslip temporarily increases. After that, as the control proceeds, the slip ratio difference Dslip decreases, and after a time point t6, the clutch 410 is directly engaged, so that the slip ratio difference Dslip is held at 0.

As described hereinabove, according to the control apparatus 1D according to the fifth embodiment, in the state predictor 520, the zeroth to third predicted values PRE_NM_0 to PRE_NM_3 is calculated using the controlled object model (equation (105)) defining the relationship between the main shaft rotational speed NM and the control input Uact, as the main shaft rotational speeds NM associated with respective times when the dead times d"=0 to 3 elapse, respectively, and the four weight function values Wd1" to Wd4" is calculated according to the oil temperature Toil. Then, the predicted main shaft rotational speed PRE_NM is calculated as the total sum of the products of the weight function values Wdi" and the predicted values PRE_NM_4−i (i=1 to 4), so that it is possible to calculate the predicted main shaft rotational speed PRE_NM as a value obtained by sequentially combining the predicted values PRE_NM_4−i. Thus, even when the dead time d" changes with a change in the oil temperature Toil, it is possible to accurately calculate the predicted main shaft rotational speed PRE_NM while compensating for such a change in the dead time d".

Further, in the onboard identifier 530, the identified value αid" is calculated with the aforementioned identification algorithm, and hence it is possible to calculate the identified value αid" while satisfying the above-described identification conditions 1 and 2. Specifically, since the identified value αid" is calculated such that the combined signal value W_act" and the estimated combined signal value W_hat" become equal to each other, it is possible to calculate the identified value αid" while satisfying the identification condition 1, i.e. the restraint condition. Further, the modified control input Uact_mod is calculated as the total sum of products obtained by multiplying the control inputs Uact(k), Uact(k−1), Uact (k−2), and Uact(k−3) associated with respective times earlier by the dead times d"=0 to 3, respectively, by the four weight function values Wd4" to Wd1", so that even when the dead time d" sequentially changes with changes in the oil temperature Toil, it is possible to accurately calculate the modified control input Uact_mod while properly compensating for such changes in the dead time d".

Furthermore, the identified value αid" is identified onboard with the identification algorithm expressed by the equations (17) to (29) using the modified control input Uact_mod calculated as above, and hence even when the dead time d" changes with a change in the oil temperature Toil, it is possible to accurately identify the identified value αid" while suppressing adverse influence of the change in the dead time d". Particularly, even when the dead time d" suddenly changes with a sudden change in the oil temperature Toil, it is possible to calculate the identified value αid" such that the identified value α id" changes steplessly and smoothly, while properly compensating for the sudden change in the dead time d". Then, the control input Uact is calculated using the identified value αid" calculated as above, and hence it is possible to make a dramatic improvement in the controllability of the clutch control, and the robustness of the clutch control against the adverse influence of variation between individual products of the engine and aging of the same.

In addition to this, in the frequency shaping controller 540, the control input Uact is calculated using the equations (125) and (126) derived by the same method as used by the frequency shaping controller 130 according to the first embodiment, and hence it is possible to calculate the control input Uact while satisfying the above-mentioned control condition ϕ. Further, since the above-described identified value a id" is used as the model parameter of the controlled object model, it is possible to directly specify (set) the disturbance suppression characteristic and the robustness of the control apparatus 1D on the frequency axis while properly compensating for changes in the dead time d". This makes it possible to make a dramatic improvement in the ability of suppressing a disturbance and the robustness in a frequency range within which a fluctuation in the main shaft rotational speed NM due to the disturbance is desired to be prevented. Further, since a feedback control algorithm is used as a calculation algorithm for calculating the control input Uact, it is possible to maintain a high feedback gain, which makes it possible to cause the main shaft rotational speed NM to follow up the target main shaft rotational speed NM_cmd while ensuring high accuracy and high response.

Although in the fifth embodiment, as the weight function values, there are used weight function values which are set such that the sum of the weight function values Wdi" associated with each value of the oil temperature Toil in the overlapping ranges becomes equal to the maximum value of 1 of each of the weight function values Wdi", by way of example, the weight function values of the present invention are not limited to these, but they are only required to be set such that the absolute value of the total sum of the weight function values associated with each value of the reference parameter in the overlapping ranges becomes equal to a predetermined value. For example, there may be used weight function values which are set such that the absolute value of the total sum of the weight function values associated with each value of a reference parameter in overlapping ranges thereof becomes equal to the maximum value of the absolute values of the weight function values. More specifically, values arranged line-symmetrically to the set values of the weight function values Wdi" in FIG. 41 with respect to the X axis, i.e. negative values set opposite to those set values in FIG. 41, may be used as the weight function values. In this case, values made negative may be used as values to be multiplied by the four weight function values, that is, the four predicted values PRE_NM_4−i or the control inputs Uact(k−4+i).

Next, a control apparatus 1E according to a sixth embodiment of the present invention will be described with reference to FIG. 48. Similarly to the control apparatus 1D according to the fifth embodiment, the control apparatus 1E controls e.g. the engagement and disengagement operations of a clutch of the automatic transmission 400. The control apparatus 1E according to the sixth embodiment has the same mechanical configuration as that of the control apparatus 1D according to the fifth embodiment, except that a wet clutch (not shown) is used in place of the dry clutch 410, so that in the following description, component elements of the control apparatus 1E, identical to those of the control apparatus 1D according to the fifth embodiment, are denoted by identical reference numerals, and detailed description thereof is omitted.

In general, the wet clutch has a characteristic that it is more difficult to develop a judder than the dry clutch, because of its structure. Therefore, it is only required to control the wet clutch such that the rotational difference between the rotational speed NE on the upstream side of the clutch and the rotational speed NM on the downstream side of the clutch smoothly converges to 0 in a time series manner, without taking the aforementioned control condition ϕ into account. For the above reason, the control apparatus 1E according to the present embodiment calculates the control input Uact with a control algorithm, described hereinafter.

Figure 48:
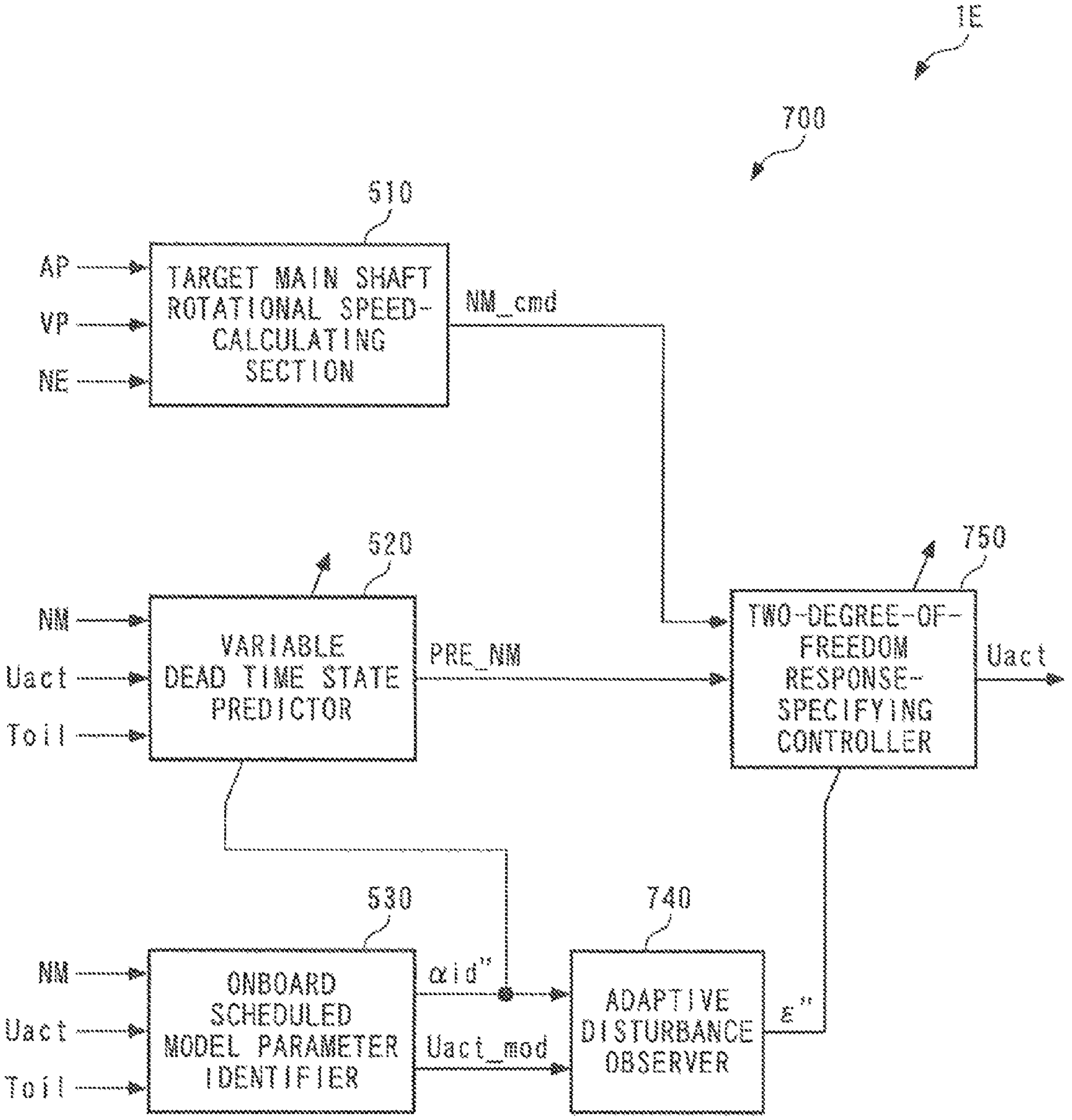
FIG. 48 is a block diagram of a control apparatus according to a sixth embodiment of the present invention.

As shown in FIG. 48, the control apparatus 1E includes a clutch controller 700. This clutch controller 700 is distinguished from the above-described FIG. 39 clutch controller 500 only in that it is provided with an adaptive disturbance observer 740 (disturbance estimated value-calculating means), and that a two-degree-of-freedom response-specifying controller 750 (control input-calculating means) replaces the above-described frequency shaping controller 540. Therefore, the following description will be given only of the different points.

First, a description will be given of the adaptive disturbance observer 740. The adaptive disturbance observer 740 calculates a disturbance estimated value $\epsilon''$ with a control algorithm, described hereinafter. First, an estimated main shaft rotational speed NM_adv for estimating a disturbance (estimated controlled variable) is calculated by the following equation (127):

$$NM\_adv(k)=(1-\alpha id''(k))\cdot NM(k)+\alpha id''(k)\cdot Uact\_\mathrm{mod}(k)+\epsilon''(k-1) \tag{127}$$

This equation (127) corresponds to an equation obtained by replacing NM($k$+1), α", and Uact(k−d") of the aforementioned equation (105) with NM_adv(k), αid"(k) and Uact_mod(k), respectively, and adding the disturbance estimated value $\epsilon''$ to the right side of the equation (105).

Then, a follow-up error e_adv" is calculated by the following equation (128):

$$e\_adv''(k)=NM\_adv(k)-NM(k) \tag{128}$$

Finally, the disturbance estimated value $\epsilon''$ is calculated by the following equation (129):

$$\varepsilon''(k)=\varepsilon''(k-1)+\frac{\pi''}{1+\pi''}\cdot \mathrm{e\_adv}''(k) \tag{129}$$

In this equation (129), π" represents a disturbance estimated gain, and is set such that π">0 holds.

Next, a description will be given of the above-mentioned two-degree-of-freedom response-specifying controller 750. This two-degree-of-freedom response-specifying controller 750 calculates the control input Uact with a response-specifying control algorithm which additionally takes into account the above-mentioned disturbance estimated value $\epsilon''$, as will be described hereinafter.

Specifically, first, a filtering value NM_cmd_f of the target main shaft rotational speed is calculated by the following equation (130):

$$NM\_cmd\_f(k)=-POLE\_f''\cdot NM\_cmd\_f(k-1)+(1+POLE\_f'')\cdot NM\_cmd(k) \tag{130}$$

wherein POLE_f" represents a target value filter-setting parameter, and is set such that the relationship of −1<POLE_f"<0 holds.

Then, a predicted follow-up error PRE_e_f" is calculated by the following equation (131):

$$PRE\_e\_f''(k)=PRE\_NM(k)-NM\_cmd\_f(k-1) \tag{131}$$

Further, a switching function σ_f" is calculated by the following equation (132):

$$\sigma\_f''(k)=PRE\_e\_f''(k)+POLE''\cdot PRE\_e\_f''(k-1) \tag{132}$$

wherein POLE" represents a switching function-setting parameter, and is set such that the relationship of −1<POLE"<0 holds.

Then, an equivalent control input Ueq_f" is calculated by the following equation (133):

$$\mathrm{Ueq\_f}''(k)=\frac{1}{\alpha id''(k)}\cdot\{(\alpha id''(k)-\mathrm{POLE}'')\cdot \mathrm{PRE\_NM}(k)+\mathrm{POLE}''\cdot \mathrm{PRE\_NM}(k-1)-\varepsilon''(k)+\mathrm{NM\_cmd\_f}(k)+(\mathrm{POLE}''-1)\cdot \mathrm{NM\_cmd\_f}(k-1)-\mathrm{POLE}''\cdot \mathrm{NM\_cmd\_f}(k-2)\} \tag{133}$$

Further, a reaching law input Urch_f" is calculated by the following equation (134):

$$\mathrm{Urch\_f}''(k)=\frac{Krch''}{\alpha id''(k)}\cdot\sigma\_f''(k) \tag{134}$$

wherein, Krch" represents a predetermined feedback gain.

Then, finally, the control input Uact is calculated by the following equation (135):

$$Uact(k)=Ueq\_f''(k)+Urch\_f''(k) \tag{135}$$

The above-described control apparatus 1E according to the sixth embodiment is provided with the same state predictor 520 and onboard identifier 530 as provided in the control apparatus 1D according to the fifth embodiment, whereby it is possible to obtain the same advantageous effects as provided by the control apparatus 1D of the fifth embodiment. Further, the adaptive disturbance observer 740 calculates the disturbance estimated value $\epsilon''$ with the above-described control algorithm, and the two-degree-of-freedom response-specifying controller 750 calculates the control input Uact using the disturbance estimated value $\epsilon''$. This makes it possible to enhance the ability of suppressing a disturbance, i.e. the robustness, of the clutch control.

Further, since the control apparatus 1E is provided with the adaptive disturbance observer 740, it is possible to improve the stability of control by setting the disturbance estimation gain such that π">P0" holds and reducing the identification speed of the onboard identifier 530. Furthermore, for the same reason, to prevent the resonance of the control system, or to prevent the gain characteristic of the controlled object model to which the computation result of the identified value αid" is applied, from becoming too small, it is possible to filter input and output data used for the identified value αid" and the identification algorithm, thereby making it possible to ensure higher controllability.

Although in the first to fourth embodiments, the present invention is applied to the control apparatuses for controlling the air-fuel ratio of the engine 3 as a controlled object, and in the fifth and sixth embodiments, the present invention is applied to the control apparatuses for controlling the clutch 410 as a controlled object, by way of example, this is not limitative, the present invention may be applied to any suitable control apparatus insofar as it controls a controlled object having a characteristic that dynamic characteristics thereof including dead time change according to reference parameters. For example, the present invention may be applied to a control apparatus for controlling operation of a robot as a controlled object.

Further, although in the above-described embodiments, the control apparatus according to the present invention is applied to the controlled objects each having a characteristic that dead time varies between four integer values (0 to 3), by way of example, this is not limitative, it can be applied to a controlled object having a characteristic that dead time varies between M integer values. For example, the control apparatus according to the present invention may be applied to a controlled object having a characteristic that dead time varies between integer values not larger than 3 or not smaller than 5.

It is further understood by those skilled in the art that the foregoing are preferred embodiments of the invention, and that various changes and modifications may be made without departing from the spirit and scope thereof.

What is claimed is:

1. A control apparatus for controlling a controlled variable of a controlled object by a control input, the controlled object having characteristics that dynamic characteristics including dead time change under a predetermined condition, and being modeled such that the dead time sequentially changes between M integer values (M represents an integer not smaller than 2) including a maximum value and a minimum value thereof as a reference parameter changes within a predetermined range, comprising:

target controlled variable-setting means for setting a target controlled variable which serves as a target of the controlled variable;

reference parameter-detecting means for detecting the reference parameter;

predicted value-calculating means for calculating M predicted values of the controlled variable in association with respective times when M dead times elapse, using a controlled object model defining a relationship between the controlled variable and the control input;

weight function value-calculating means for calculating, based on the detected reference parameter, M weight function values associated with the reference parameter;

predicted controlled variable-setting means for calculating M first products by multiplying the calculated M predicted values by the calculated M weight function values, respectively, and setting a total sum of the M first products as a predicted controlled variable which is a predicted value of the controlled variable; and control input-calculating means for calculating the control input such that the predicted controlled variable becomes equal to the target controlled variable, wherein the M weight function values are associated with M regions within the predetermined range of the reference parameter, respectively, the M weight function values each being set to values other than 0 in an associated region and set to 0 in regions other than the associated region, wherein adjacent ones of the M regions overlap each other, and wherein the M weight function values are set such that an absolute value of a total sum of weight function values associated with each value of the reference parameter in an overlapping region becomes equal to a predetermined value.

2. The control apparatus as claimed in claim 1, further comprising:

modified control input-setting means for calculating M second products by multiplying M values of the control input associated with respective times earlier by the M dead times, by the M weight function values, respectively, and setting a total sum of the M second products as a modified control input; and identification means for identifying onboard a model parameter of a modified model with a predetermined identification algorithm that is derived using the modified model defining a relationship between the controlled variable and the modified control input, wherein said predicted value-calculating means uses the identified model parameter as a model parameter of the controlled object model.

3. The control apparatus as claimed in claim 2, wherein said control input-calculating means calculates the control input using a control algorithm derived based on one of a sensitivity function, a complementary sensitivity function, and a transfer function that are set such that a predetermined frequency characteristic can be obtained.

4. The control apparatus as claimed in claim 3, wherein the controlled variable is a value indicative of an air-fuel ratio of an air-fuel mixture of an internal combustion engine, and the control input is a correction coefficient for correcting an amount of fuel to be supplied to the engine.

5. The control apparatus as claimed in claim 3, wherein the controlled variable is a value indicative of an output rotational speed of a transmission torque-regulating mechanism of an automatic transmission, and the control input is an input to an actuator of the transmission torque-regulating mechanism.

6. The control apparatus as claimed in claim 1, wherein said control input-calculating means calculates the control input using a control algorithm derived based on one of a sensitivity function, a complementary sensitivity function, and a transfer function that are set such that a predetermined frequency characteristic can be obtained.

7. The control apparatus as claimed in claim 6, wherein the controlled variable is a value indicative of an air-fuel ratio of an air-fuel mixture of an internal combustion engine, and the control input is a correction coefficient for correcting an amount of fuel to be supplied to the engine.

8. The control apparatus as claimed in claim 6, wherein the controlled variable is a value indicative of an output rotational speed of a transmission torque-regulating mechanism of an automatic transmission, and the control input is an input to an actuator of the transmission torque-regulating mechanism.

9. The control apparatus as claimed in claim 1, wherein the controlled variable is a value indicative of an air-fuel ratio of an air-fuel mixture of an internal combustion engine, and the control input is a correction coefficient for correcting an amount of fuel to be supplied to the engine.

10. The control apparatus as claimed in claim 1, wherein the controlled variable is a value indicative of an output rotational speed of a transmission torque-regulating mechanism of an automatic transmission, and the control input is an input to an actuator of the transmission torque-regulating mechanism.

11. The control apparatus as claimed in claim 2, wherein the controlled variable is a value indicative of an air-fuel ratio of an air-fuel mixture of an internal combustion engine, and the control input is a correction coefficient for correcting an amount of fuel to be supplied to the engine.

12. The control apparatus as claimed in claim 2, wherein the controlled variable is a value indicative of an output rotational speed of a transmission torque-regulating mechanism of an automatic transmission, and the control input is an input to an actuator of the transmission torque-regulating mechanism.

13. A control apparatus for controlling a controlled variable of a controlled object by a control input, the controlled object having characteristics that dynamic characteristics including dead time change under a predetermined condition, and being modeled such that the dead time sequentially changes between M integer values (M represents an integer not smaller than 2) including a maximum value and a minimum value thereof as a reference parameter changes within a predetermined range, comprising:

reference parameter-detecting means for detecting the reference parameter;

weight function value-calculating means for calculating, based on the detected reference parameter, M weight function values associated with the reference parameter;

modified control input-setting means for calculating M products by multiplying M values of the control input associated with respective times earlier by the M dead times, by the calculated M weight function values, respectively, and setting a total sum of the M products as a modified control input;

identification means for identifying onboard a model parameter of a modified model with a predetermined identification algorithm that is derived using the modified model defining a relationship between the controlled variable and the modified control input; and control input-calculating means for calculating the control input using a predetermined control algorithm and a control target model, said control input-calculating means using the identified model parameter as a model parameter of the control target model, wherein the M weight function values are associated with M regions within the predetermined range of the reference parameter, respectively, the M weight function values each being set to values other than 0 in an associated region and set to 0 in regions other than the associated region, wherein adjacent ones of the M regions overlap each other, and wherein the M weight function values are set such that an absolute value of a total sum of weight function values associated with each value of the reference parameter in an overlapping region becomes equal to a predetermined value.

14. The control apparatus as claimed in claim 13, wherein the predetermined control algorithm is an algorithm derived based on one of a sensitivity function, a complementary sensitivity function, and a transfer function that are set such that a predetermined frequency characteristic can be obtained.

15. The control apparatus as claimed in claim 14, wherein the controlled variable is a value indicative of an air-fuel ratio of an air-fuel mixture of an internal combustion engine, and the control input is a correction coefficient for correcting an amount of fuel to be supplied to the engine.

16. The control apparatus as claimed in claim 14, wherein the controlled variable is a value indicative of an output rotational speed of a transmission torque-regulating mechanism of an automatic transmission, and the control input is an input to an actuator of the transmission torque-regulating mechanism.

17. A control apparatus for controlling a controlled variable of a controlled object by a control input, the controlled object having characteristics that dynamic characteristics including dead time change under a predetermined condition, and being modeled such that the dead time sequentially changes between M integer values (M represents an integer not smaller than 2) including a maximum value and a minimum value thereof as a reference parameter changes within a predetermined range, comprising:

target controlled variable-setting means for setting a target controlled variable which serves as a target of the controlled variable;

reference parameter-detecting means for detecting the reference parameter;

weight function value-calculating means for calculating, based on the detected reference parameter, M weight function values associated with the reference parameter;

modified control input-setting means for calculating M products by multiplying M values of the control input associated with respective times earlier by the M dead times, by the calculated M weight function values, respectively, and setting a total sum of the M products as a modified control input;

disturbance estimated value-calculating means for calculating a disturbance estimated value using the modified control input and the controlled variable; and control input-calculating means for calculating the control input, using the calculated disturbance estimated value, such that the controlled variable becomes equal to the target controlled variable, wherein the M weight function values are associated with M regions within the predetermined range of the reference parameter, respectively, the M weight function values each being set to values other than 0 in an associated region and set to 0 in regions other than the associated region, wherein adjacent ones of the M regions overlap each other, and wherein the M weight function values are set such that an absolute value of a total sum of weight function values associated with each value of the reference parameter in an overlapping region becomes equal to a predetermined value.

18. The control apparatus as claimed in claim 17, wherein said disturbance estimated value-calculating means calculates an estimated controlled variable, which is an estimated value of the controlled variable, using a model defining a relationship between the estimated controlled variable, the modified control input, the disturbance estimated value, and the controlled variable, and calculating the disturbance estimated value such that a difference between the estimated controlled variable and the controlled variable is minimized.

19. The control apparatus as claimed in claim 18, wherein the controlled variable is a value indicative of an air-fuel ratio of an air-fuel mixture of an internal combustion engine, and the control input is a correction coefficient for correcting an amount of fuel to be supplied to the engine.

20. The control apparatus as claimed in claim 18, wherein the controlled variable is a value indicative of an output rotational speed of a transmission torque-regulating mechanism of an automatic transmission, and the control input is an input to an actuator of the transmission torque-regulating mechanism.

* * * * *